United States Patent
Inoue et al.

(10) Patent No.: US 9,598,129 B2
(45) Date of Patent: Mar. 21, 2017

(54) STRADDLED VEHICLE

(71) Applicant: YAMAHA HATSUDOKI KABUSHIKI KAISHA, Iwata-shi, Shizuoka-ken (JP)

(72) Inventors: Takehiro Inoue, Iwata (JP); Yutaka Kubo, Iwata (JP); Takeshi Ikeda, Iwata (JP)

(73) Assignee: YAMAHA HATSUDOKI KABUSHIKI KAISHA, Iwata-Shi, Shizuoka (JP)

(*) Notice: Subject to any disclaimer, the term of this patent is extended or adjusted under 35 U.S.C. 154(b) by 0 days.

(21) Appl. No.: 14/896,373

(22) PCT Filed: Jun. 11, 2015

(86) PCT No.: PCT/JP2015/002948
§ 371 (c)(1),
(2) Date: Dec. 4, 2015

(87) PCT Pub. No.: WO2015/190113
PCT Pub. Date: Dec. 17, 2015

(65) Prior Publication Data
US 2016/0194044 A1    Jul. 7, 2016

(30) Foreign Application Priority Data

Jun. 11, 2014  (JP) ................................ 2014-120235
Jun. 11, 2014  (JP) ................................ 2014-120236
Dec. 18, 2014  (JP) ................................ 2014-256382

(51) Int. Cl.
*B62J 6/02*         (2006.01)
*B62K 21/02*    (2006.01)
(Continued)

(52) U.S. Cl.
CPC .............. *B62J 6/02* (2013.01); *B60Q 1/0035* (2013.01); *B60Q 1/0041* (2013.01); *B60Q 1/04* (2013.01);
(Continued)

(58) Field of Classification Search
CPC ........ B62J 6/02; B60Q 1/0035; B60Q 1/0041; B60Q 1/04
(Continued)

(56) References Cited

U.S. PATENT DOCUMENTS 6,764,206 B1 * 7/2004 Felty ........................ B62J 11/00
362/476
2003/0142502 A1 * 7/2003 Kawai ........................ B62J 6/02
362/475

(Continued)

FOREIGN PATENT DOCUMENTS

DE    102007013309 A1 *   9/2007    ........... B60Q 1/0041
EP    2607219 A2    6/2013
(Continued)

OTHER PUBLICATIONS

European Search Report received in corresponding European Patent Application No. 15796997.3 on Jun. 27, 2016.

*Primary Examiner* — Andrew Coughlin
*Assistant Examiner* — Colin Cattanach
(74) *Attorney, Agent, or Firm* — Rabin & Berdo, P.C.

(57) ABSTRACT

An increase in the size of a body portion of a straddled vehicle forward of a steering shaft in a left-right direction and a front-rear direction of a body frame is suppressed to secure a space forward of the steering shaft. Each top end of left optical lens body 35L and right optical lens body 35R is located below top edge B1 of an upper bracket in an up-down direction of the body frame. Each bottom end of left optical lens body 35L and right optical lens body 35R is
(Continued)

located above bottom edge B2 of a lower bracket in the up-down direction of the body frame. The left end of left optical lens body 35L is located on the right of left edge B3 of a left front-wheel support unit in the left-right direction of the body frame. The right end of left optical lens body 35L is located on the right of right edge B5 of the left front-wheel support unit in the left-right direction of the body frame. The left end of right optical lens body 35R is located on the left of left edge B4 of a right front-wheel support unit in the left-right direction of the body frame. The right end of right optical lens body 35R is located on the left of right edge B6 of the right front-wheel support unit in the left-right direction of the body frame.

19 Claims, 41 Drawing Sheets

(51) Int. Cl.
 *B62K 25/08* (2006.01)
 *F21S 8/10* (2006.01)
 *B60Q 1/00* (2006.01)
 *B60Q 1/04* (2006.01)

(52) U.S. Cl.
 CPC .............. *B62K 21/02* (2013.01); *B62K 25/08* (2013.01); *F21S 48/1154* (2013.01); *F21S 48/1216* (2013.01); *F21S 48/1258* (2013.01); *F21S 48/1747* (2013.01)

(58) Field of Classification Search
 USPC ......................................................... 362/476
 See application file for complete search history.

(56) References Cited

U.S. PATENT DOCUMENTS

| | | | | |
|---|---|---|---|---|
| 2010/0096829 | A1* | 4/2010 | Nagao | B62K 25/08 280/279 |
| 2013/0163263 | A1* | 6/2013 | Kouchi | B62J 6/02 362/476 |
| 2014/0313762 | A1* | 10/2014 | Owada | B60Q 1/0088 362/538 |

FOREIGN PATENT DOCUMENTS

| | | | | |
|---|---|---|---|---|
| JP | EP001905678 A1 * | 4/2008 | ........... | B60Q 1/0433 |
| JP | 2008-105500 A | 5/2008 | | |
| JP | 2013-129282 A | 7/2013 | | |
| JP | 2013-151179 A | 8/2013 | | |
| WO | WO-2012/086626 A1 | 6/2012 | | |

\* cited by examiner

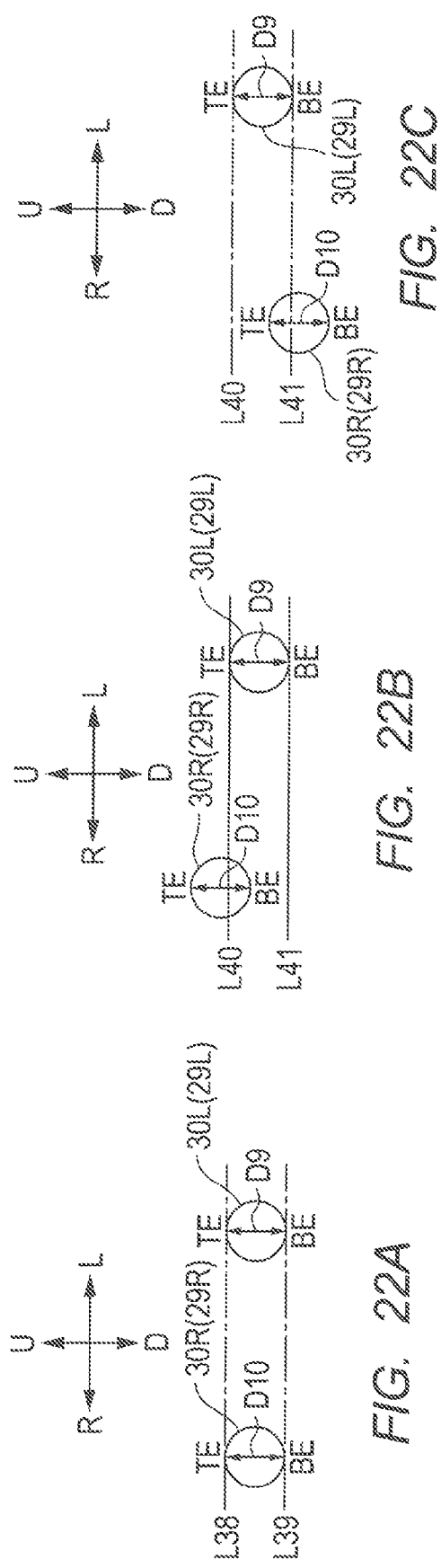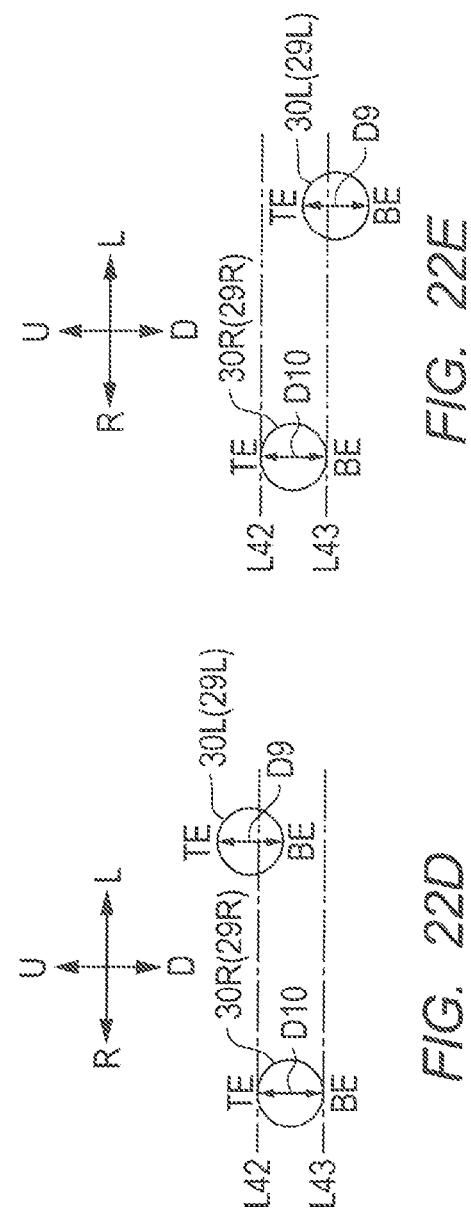
FIG. 22A  FIG. 22B  FIG. 22C  FIG. 22D  FIG. 22E

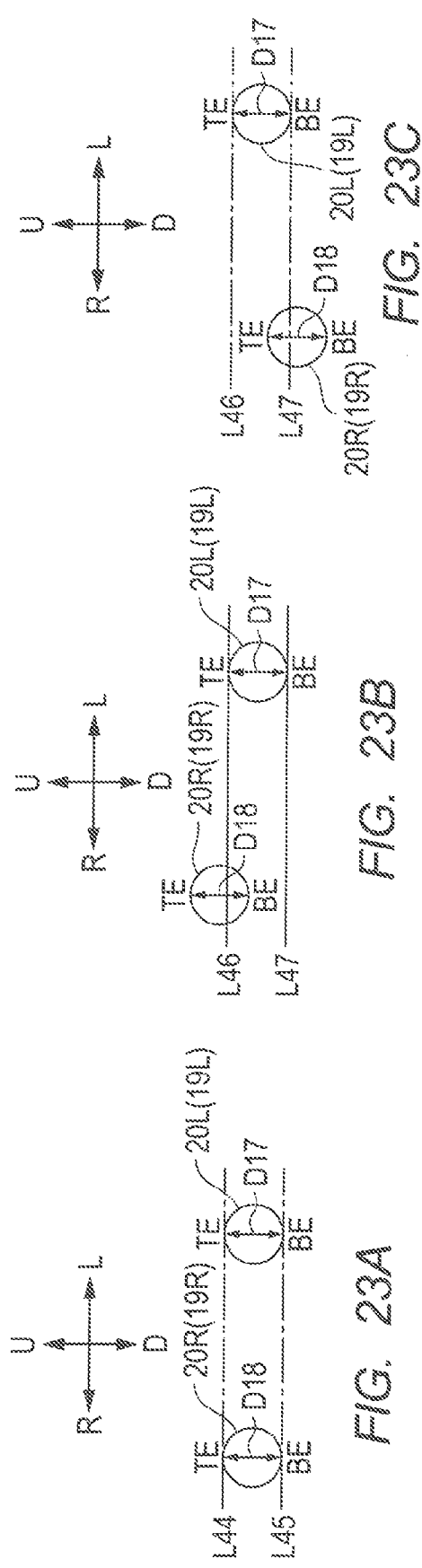

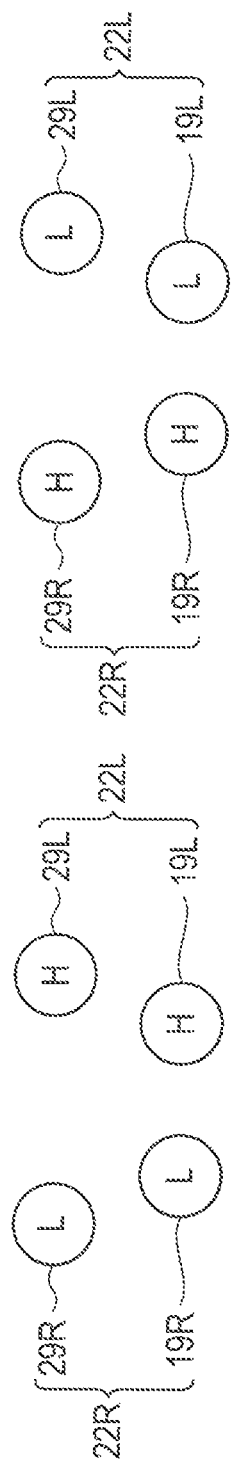
FIG. 27A
FIG. 27C
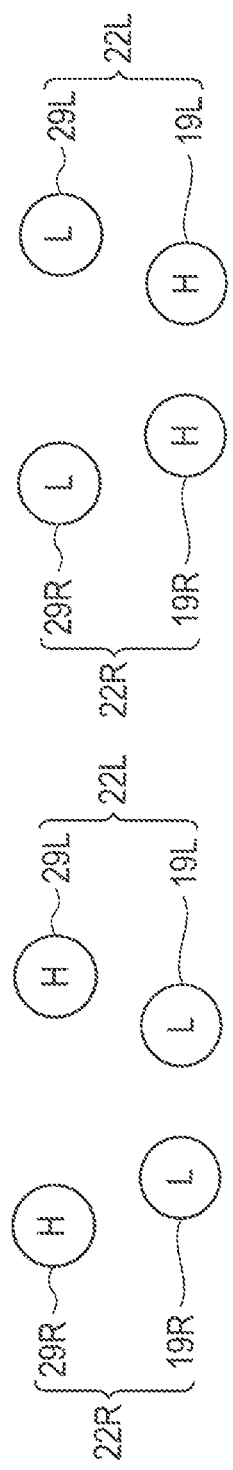
FIG. 27B
FIG. 27D

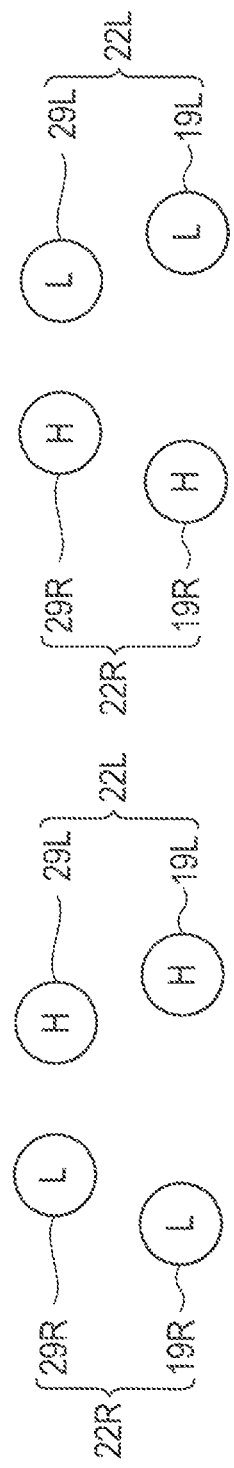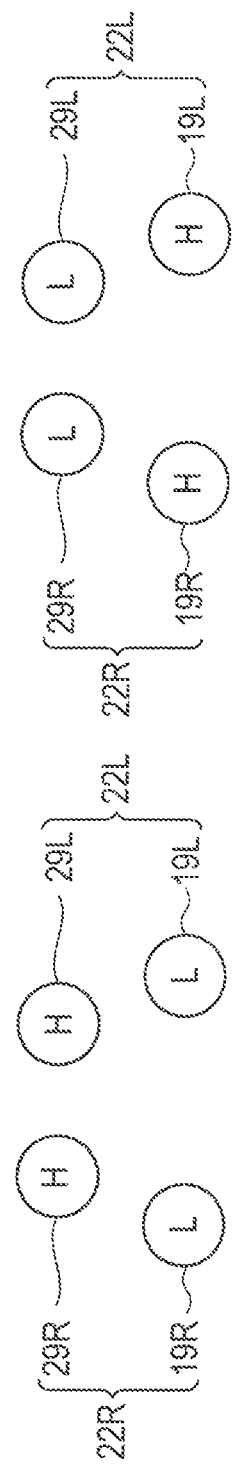

STRADDLED VEHICLE

TECHNICAL FIELD

The present invention relates to a straddled vehicle.

BACKGROUND ART

Patent literature (hereinafter referred to as "PTL") 1 discloses a straddled vehicle including: two highly-directional light units disposed on the left of a center of a body frame; and two highly-directional light units disposed on the right of the center of the body frame as viewed from a front in a front-rear direction of the body frame.

The highly-directional light units each include a light-emitting section that emits highly-directional light and an optical lens section that refracts the light from the light-emitting section and generates light distribution. The light distribution formed by the optical lens section constitutes at least part of a light distribution of a main beam or dipped beam of the straddled vehicle. Such a highly-directional light unit is attached to a casing to form a lamp unit.

The straddled vehicle disclosed in PTL 1 includes a body frame, a left front-wheel support unit, a right front-wheel support unit, an upper bracket, and a lower bracket. The left front-wheel support unit includes: a left upper member supported by the body frame; and a left lower member that supports the front wheel and is displaceable with respect to the left upper member in the up-down direction, while the left front-wheel support unit is located on the left of the steering shaft in the left-right direction of the body frame. The right front-wheel support unit includes a right upper member supported by the body frame and a bottom right member that supports the front wheel and is displaceable with respect to right upper member in the up-down direction, while the right front-wheel support unit is located on the right of the steering shaft in the left-right direction of the body frame. The lamp unit including four highly-directional light units is disposed within a range surrounded by the left front-wheel support unit, the right front-wheel support unit, the upper bracket and the lower bracket as viewed from the front of the body frame in the front-rear direction.

CITATION LIST

Patent Literature

PTL 1
Japanese Patent Application Laid-Open No. 2013-129282

SUMMARY OF INVENTION

Technical Problem

In the straddled vehicle disclosed in PTL 1, the lamp unit including the four highly-directional light units is disposed forward of the steering shaft. The lamp unit is disposed within a range surrounded by the left front-wheel support unit, the right front-wheel support unit, the upper bracket, and lower bracket as viewed from the front of the body frame in the front-rear direction. This provides a very compact configuration in the left-right direction of the body frame.

However, the straddled vehicle includes several parts such as a brake hose and wire harness disposed between the steering shaft and the lamp unit.

For this reason, in the straddled vehicle disclosed in PTL 1, the lamp unit is provided at a position forward of and spaced apart from the steering shaft in the front-rear direction of the body frame. As a result, the body portion of the straddled vehicle forward of the steering shaft increases in size in the front-rear direction of the body frame.

An object of the present invention is to provide a straddled vehicle capable of securing space forward of the steering shaft while limiting an increase in the size of the body portion of the straddled vehicle forward of the steering shaft in the left-right direction and the front-rear direction of the body frame.

Solution to Problem

A straddled vehicle according to an aspect of the present invention (hereinafter, referred to as "straddled vehicle of a first aspect") includes: a body frame; a front wheel portion; a steering shaft turnably supported by the body frame; an upper bracket having a central portion that is disposed at an upper portion of the steering shaft; a lower bracket having a central portion that is disposed at a lower portion of the steering shaft; a left front-wheel support unit disposed on the left of the steering shaft in a left-right direction of the body frame, the left front-wheel support unit including: a left upper member supported by a left portion of the upper bracket and a left portion of the lower bracket; and a left lower member that supports the front wheel portion and that is displaceable in an up-down direction with respect to the left upper member, the left front-wheel support unit turning integrally with the steering shaft; a right front-wheel support unit disposed on the right of the steering shaft in the left-right direction of the body frame, the right front-wheel support unit including: a right upper member supported by a right portion of the upper bracket and a right portion of the lower bracket; and a right lower member that supports the front wheel portion and that is displaceable in an up-down direction with respect to the right upper member, the right front-wheel support unit turning integrally with the steering shaft; a left light group that includes at least two or more highly-directional light units each including: a light-emitting section that emits highly-directional light; and an optical lens section that refracts light of the light-emitting section and forms at least part of a light distribution of a main beam or a dipped beam, the left light group being disposed on the left of the steering shaft in the left-right direction of the body frame; and a right light group that includes at least two or more highly-directional light units, the right light group being disposed on the right of the steering shaft in the left-right direction of the body frame, in the left light group, a top end portion of a left optical lens body composed of the optical lens sections of the highly-directional light units included in the left light group is disposed below a top edge of the upper bracket in the up-down direction of the body frame as viewed from a front of the body frame in a front-rear direction, a bottom end portion of the left optical lens body is disposed above a bottom edge of the lower bracket in the up-down direction of the body frame as viewed from the front of the body frame in the front-rear direction, a left end portion of the left optical lens body is disposed on the right of a left edge of the left front-wheel support unit in the left-right direction of the body frame as viewed from the front of the body frame in the front-rear direction, a right end portion of the left optical lens body is disposed on the right of a right edge of the left front-wheel support unit in the left-right direction of the body frame as viewed from the front of the body frame in the front-rear direction, the plurality of optical lens sections of the left light group are disposed at positions overlapping in the up-down direction of the body frame as viewed from the front of the body frame in the front-rear direction, the plurality of highly-directional light units of the left light group are disposed at positions overlapping in the up-down direction of the body frame as viewed from the left of the left-right direction of the body frame, in the right light group, a top end portion of a right optical lens body composed of the optical lens sections of the highly-directional light units included in the right light group is disposed below a top edge of the upper bracket in the up-down direction of the body frame as viewed from the front of the body frame in the front-rear direction, a bottom end portion of the right optical lens body is disposed above a bottom edge of the lower bracket in the up-down direction of the body frame as viewed from the front of the body frame in the front-rear direction, a right end portion of the right optical lens body is disposed on the left of a right edge of the right front-wheel support unit in the left-right direction of the body frame as viewed from the front of the body frame in the front-rear direction, a left end portion of the right optical lens body is disposed on the left of a left edge of the right front-wheel support unit in the left-right direction of the body frame as viewed from the front of the body frame in the front-rear direction, the plurality of optical lens sections of the right light group are disposed at positions overlapping in the up-down direction of the body frame as viewed from the front of the body frame in the front-rear direction, the plurality of highly-directional light units of the right light group are disposed at positions overlapping in the up-down direction of the body frame as viewed from the right of the left-right direction of the body frame, in which the left light group and the right light group are further formed so that a length between the right end portion of the left optical lens body and the left end portion of the right optical lens body in the left-right direction of the body frame is greater than a length of an overlapping portion of the optical lens sections neighboring in an up-down direction in the left light group, the overlapping portion being where the neighboring optical sections overlapping each other in the left-right direction, and a length of an overlapping portion of the optical lens sections neighboring in the up-down direction in the right light group, the overlapping portion being where the neighboring optical sections overlap each other in the left-right direction.

The present inventor has first examined in detail a structure of the body portion of the straddled vehicle forward of the steering shaft. The steering shaft, the left front-wheel support unit and the right front-wheel support unit are coupled by the upper bracket and the lower bracket, and space is formed forward of the steering shaft. Moreover, all the steering shaft, left front-wheel support unit and right front-wheel support unit are made of members which are long in the up-down direction of the body frame. The present inventor has realized the above and thought that it is possible to secure space forward of the steering shaft while limiting an increase in the size of the body portion of the straddled vehicle forward of the steering shaft in the left-right direction and front-rear direction of the body frame by forming not only the steering shaft, left front-wheel support unit and right front-wheel support unit but also the lamp unit with the up-down direction of the body frame as the basis. The left light group disposed on the left of the steering shaft in the left-right direction of the body frame includes at least two or more highly-directional light units each having a light-emitting section that emits highly-directional light and an optical lens section that refracts light of the light-emitting section and forms at least part of a light distribution of a main beam or dipped beam. The right light group disposed on the right of the steering shaft in the left-right direction of the body frame also includes at least two or more highly-directional light units. Thus, the inventor considered forming the left light group and the right light group on the basis of the up-down direction of the body frame by taking advantage of the configuration including at least two or more highly-directional light units. Furthermore, the inventor considered contriving the position relationship between the left light group and the right light group in the left-right direction of the body frame.

According to the straddled vehicle of the first aspect, the top end portion of the left optical lens body made up of the optical lens section of the highly-directional light unit included in the left light group is disposed below the top edge of the upper bracket in the up-down direction of the body frame as viewed from the front of the body frame in the front-rear direction. The bottom end portion of the left optical lens body is disposed above the bottom edge of the lower bracket in the up-down direction of the body frame as viewed from the front of the body frame in the front-rear direction. The left end portion of the left optical lens body is disposed on the right of the left edge of the left front-wheel support unit in the left-right direction of the body frame as viewed from the front of the body frame in the front-rear direction. The right end portion of the left optical lens body is disposed on the right of the right edge of the left front-wheel support unit in the left-right direction of the body frame as viewed from the front of the body frame in the front-rear direction. The top end portion of the right optical lens body made up of the optical lens section of the highly-directional light unit included in the right light group is disposed below the upper edge of the upper bracket in the up-down direction of the body frame as viewed from the front of the body frame in the front-rear direction. The bottom end portion of the right optical lens body is disposed above the lower edge of the lower bracket in the up-down direction of the body frame as viewed from the front of the body frame in the front-rear direction. The right end portion of the right optical lens body is disposed on the left of the right edge of the right front-wheel support unit in the left-right direction of the body frame as viewed from the front of the body frame in the front-rear direction. The left end portion of the right optical lens body is disposed on the left of the left edge of the right front-wheel support unit in the left-right direction of the body frame as viewed from the front of the body frame in the front-rear direction. Thus, in the left light group and the right light group, the left optical lens body and the right optical lens body are provided in the region formed of the left edge of the left front-wheel support unit, the right edge of the right front-wheel support unit, the upper edge of the upper bracket, and the lower edge of the lower bracket as viewed from the front of the body frame in the front-rear direction. It is thereby possible to limit an increase in the size of the body portion of the straddled vehicle forward of the steering shaft in the left-right direction of the body frame.

A plurality of optical lens sections of the left light group are disposed at positions overlapping in the up-down direction of the body frame as viewed from the front of the body frame in the front-rear direction. A plurality of highly-directional light units of the left light group are disposed at positions overlapping in the up-down direction of the body frame as viewed from the left side in the left-right direction of the body frame. A plurality of optical lens sections of the right light group are disposed at positions overlapping in the up-down direction of the body frame as viewed from the front of the body frame in the front-rear direction. A plurality of highly-directional light units of the right light group are disposed at positions overlapping in the up-down direction of the body frame as viewed from the right side in the left-right direction of the body frame. For this reason, the left light group and the right light group can be formed on the basis of the up-down direction of the body frame.

Furthermore, the length between the right end portion of the left optical lens body and the left end portion of the right optical lens body in the left-right direction of the body frame is formed to be greater than the length by which the optical lens sections of the left light group neighboring in the up-down direction overlap in the left-right direction and the length by which the optical lens sections of the right light group neighboring in the up-down direction overlap in the left-right direction. The left light group and the right light group each formed on the basis of the up-down direction of the body frame are disposed while being spaced apart from each other in the left-right direction of the body frame in a region formed of the left edge of the left front-wheel support unit, the right edge of the right front-wheel support unit, the upper edge of the upper bracket and the lower edge of the lower bracket. In other words, the left light group and the right light group each formed on the basis of the up-down direction of the body frame are disposed so as to extend along the left front-wheel support unit and the right front-wheel support unit. For this reason, it is possible to further secure a space extending forward of the steering shaft in the up-down direction of the body frame. In addition, since a space extending in the up-down direction of the body frame can be secured, even when several parts such as a brake hose and a wire harness are arranged between the steering shaft and the lamp unit, it is possible to limit an increase in the size of the body portion of the straddled vehicle forward of the steering shaft in the front-rear direction of the body frame.

Thus, according to the straddled vehicle of the first aspect, it is possible to secure a space forward of the steering shaft while limiting an increase in the size of the body portion of the straddled vehicle forward of the steering shaft in the left-right direction and the front-rear direction of the body frame.

Furthermore, the following aspects can also be adopted in the present invention.

A straddled vehicle according to a second aspect is the straddled vehicle according to the first aspect, in which the left light group and the right light group are formed so that the length between the right end portion of the left optical lens body and the left end portion of the right optical lens body is greater than a length of each of the optical lens sections of the left light group in the left-right direction and a length of each of the optical lens sections of the right light group in the left-right direction.

According to the second aspect, it is possible to secure a space forward of the steering shaft while limiting an increase in the size of the body portion of the straddled vehicle forward of the steering shaft in the left-right direction and the front-rear direction of the body frame.

A straddled vehicle according to a third aspect is the straddled vehicle according to the first aspect, in which the left light group and the right light group are formed so that a length between the neighboring optical lens sections of the left light group and a length between the neighboring optical lens sections of the right light group in the up-down direction of the body frame are smaller than the length between the right end portion of the left optical lens section and the left end portion of the right optical lens section in the left-right direction of the body frame.

According to the third aspect, it is possible to secure a space forward of the steering shaft while limiting an increase in the size of the body portion of the straddled vehicle forward of the steering shaft in the left-right direction, the front-rear direction and the up-down direction of the body frame.

A straddled vehicle according to a fourth aspect is the straddled vehicle according to the first aspect, in which as viewed from the front of the body frame in the front-rear direction, at least part of the left optical lens body is located below the top end portion of the right optical lens body in the up-down direction of the body frame and above the bottom end portion of the right optical lens body in the up-down direction of the body frame.

According to the fourth aspect, since the left optical lens body and the right optical lens body are arranged in a compact form in the up-down direction of the body frame, which prevents an increase in the size of the straddled vehicle in the up-down direction of the body frame. Thus, according to the fourth aspect, it is possible to secure a space forward of the steering shaft while limiting an increase in the size of the body portion of the straddled vehicle forward of the steering shaft in the left-right direction and the front-rear direction of the body frame.

A straddled vehicle according to a fifth aspect is the straddled vehicle according to the first aspect, in which as viewed from the front of the body frame in the front-rear direction, at least part of the optical lens section of the highly-directional light unit located at an uppermost position in the left light group in the up-down direction of the body frame is located below a top end portion of the optical lens section of the highly-directional light unit located at an uppermost position in the right light group in the up-down direction of the body frame and above a bottom end portion of the optical lens section of the highly-directional light unit located at the uppermost position in the right light group in the up-down direction of the body frame, and as viewed from the front of the body frame in the front-rear direction, at least part of the optical lens section of the highly-directional light unit located at a lowermost position in the left light group in the up-down direction of the body frame is located below a top end portion of the optical lens section of the highly-directional light unit located at a lowermost position in the right light group in the up-down direction of the body frame and above a bottom end portion of the optical lens section of the highly-directional light unit located at the lowermost position in the right light group in the up-down direction of the body frame.

According to the fifth aspect, as viewed from the front of the body frame in the front-rear direction, since the bottom end portion of the optical lens section of the highly-directional light unit located at the uppermost position in the up-down direction of the body frame in the left light group is never located above, in the up-down direction of the body frame, the top end portion of the optical lens section of the highly-directional light unit located at the uppermost position in the up-down direction of the body frame in the right light group, the highly-directional light unit located at the uppermost position in the up-down direction of the body frame in the left light group and the highly-directional light unit located at the uppermost position in the up-down direction of the body frame in the right light group are arranged in a compact form in the up-down direction of the body frame. Furthermore, as viewed from the front of the body frame in the front-rear direction, since the top end portion of the optical lens section of the highly-directional light unit located at the lowermost position in the up-down direction of the body frame in the left light group is never located below, in the up-down direction of the body frame, the bottom end portion of the optical lens section of the highly-directional light unit located at the lowermost position in the up-down direction of the body frame in the right light group, the highly-directional light unit located at the lowermost position in the up-down direction of the body frame in the left light group and the highly-directional light unit located at the lowermost position in the up-down direction of the body frame in the right light group are arranged in a compact form in the up-down direction of the body frame. Thus, the size of the straddled vehicle does not increase in the up-down direction of the body frame. Thus, according to the fifth aspect, it is possible to secure a space forward of the steering shaft while limiting an increase in the size of the body portion of the straddled vehicle forward of the steering shaft in the left-right direction and the front-rear direction of the body frame.

A straddled vehicle according to the sixth aspect is the straddled vehicle according to the first aspect, in which as viewed from the front of the body frame in the front-rear direction, the left end portion of the optical lens section of the highly-directional light unit located at a rightmost position in the left light group in the left-right direction of the body frame is located on the right of the right edge of the left front-wheel support unit in the left-right direction of the body frame, and as viewed from the front of the body frame in the front-rear direction, the right end portion of the optical lens section of the highly-directional light unit located at a leftmost position in the left-right direction of the body frame in the right light group is located on the left of the left edge of the right front-wheel support unit in the left-right direction of the body frame.

According to the sixth aspect, as viewed from the front of the body frame in the front-rear direction, the optical lens section of the highly-directional light unit located at the rightmost position in the left-right direction of the body frame in the left light group and the optical lens section of the highly-directional light unit located at a leftmost position in the left-right direction of the body frame in the right light group are arranged between the right edge of the left front-wheel support unit and the left edge of the right front-wheel support unit. Thus, since the left group rightmost highly-directional light unit and the right group leftmost highly-directional light unit are arranged in a compact form in the left-right direction of the body frame, the size of the straddled vehicle does not increase in the left-right direction of the body frame. Thus, according to the sixth aspect, it is possible to secure a space forward of the steering shaft while limiting an increase in the size of the body portion of the straddled vehicle forward of the steering shaft in the left-right direction and the front-rear direction of the body frame.

A straddled vehicle according to a seventh aspect is the straddled vehicle according to the first aspect, in which as viewed from the front of the body frame in the front-rear direction, the length between the right end portion of the left optical lens body and the left end portion of the right optical lens body in the left-right direction of the body frame is greater than a length obtained by adding up a length between the left end portion of the optical lens section of the highly-directional light unit located at a rightmost position in the left-right direction of the body frame in the left light group and the right edge of the left front-wheel support unit in the left-right direction of the body frame and a length between the right end portion of the optical lens section of the highly-directional light unit located at a leftmost position in the left-right direction of the body frame in the right light group and the left edge in the right front-wheel support unit in the left-right direction of the body frame.

According to the seventh aspect, as viewed from the front of the body frame in the front-rear direction, it is possible to secure a wider space between the left optical lens body and the right optical lens body. Thus, according to the seventh aspect, it is possible to secure a space forward of the steering shaft while limiting an increase in the size of the body portion of the straddled vehicle forward of the steering shaft in the left-right direction and the front-rear direction of the body frame.

A straddled vehicle according to an eighth aspect is the straddled vehicle according to the first aspect, in which as viewed from the front of the body frame in the front-rear direction, the length between the left end portion of the left optical lens body and the right end portion of the right optical lens body in the left-right direction of the body frame is greater than the length between a top end portion of the optical lens section of the highly-directional light unit located at an uppermost position in the left light group and the right light group in the up-down direction of the body frame and a bottom end portion of the optical lens section of the highly-directional light unit located at a lowermost position in the left light group and the right light group in the up-down direction of the body frame as viewed from the front of the body frame in the front-rear direction.

According to the eighth aspect, as viewed from the front of the body frame in the front-rear direction, it is possible to secure a wider space between the left optical lens body and the right optical lens body. Since the highly-directional light unit located at the uppermost position in the up-down direction of the body frame in the left light group and the right light group, and the highly-directional light unit located at the lowermost position in the up-down direction of the body frame in the left light group and the right light group are arranged in a compact form in the up-down direction of the body frame, the size of the straddled vehicle does not increase in the up-down direction of the body frame. Thus, according to the eighth aspect, it is possible to secure a space forward of the steering shaft while limiting an increase in the size of the body portion of the straddled vehicle forward of the steering shaft in the left-right direction and the front-rear direction of the body frame.

A straddled vehicle according to a ninth aspect is the straddled vehicle according to the first aspect, further including the highly-directional light unit disposed so as to overlap a center virtual line passing the body frame vertically as viewed from the front of the body frame in the front-rear direction.

According to the ninth aspect, the straddled vehicle of the first aspect can be provided with the highly-directional light units disposed so as to overlap a center virtual line as viewed from the front of the body frame in the front-rear direction using a space secured forward of the steering shaft and between the left light group and the right light group as viewed from the front of the body frame in the front-rear direction.

A straddled vehicle according to a tenth aspect is the straddled vehicle according to the first aspect further including a light radiating section that forms light radiated outward, as a beam other than the main beam and the dipped beam, in which at least part of the light radiating section is disposed, as viewed from the front of the body frame in the front-rear direction, between a left virtual line passing through right end portions of the optical lens sections of the plurality of highly-directional light units of the left light group located in the up-down direction of the body frame and a right virtual line passing through left end portions of the optical lens sections of the plurality of highly-directional light units of the right light group located in the up-down direction of the body frame.

According to the tenth aspect, the light radiating section can be disposed that forms light radiated outward, as a beam other than the main beam and the dipped beam, as viewed from the front of the body frame in the front-rear direction, using a space secured in a front area of the steering shaft and between the left virtual line and the right virtual line as viewed from the front of the body frame in the front-rear direction.

A straddled vehicle according to an eleventh aspect is the straddled vehicle according to the first aspect, further including a lamp unit in which the left light group and the right light group are integrated as a unit, in which the lamp unit includes a through-passage that penetrates in the front-rear direction of the body frame between a left virtual line passing through right end portions of the optical lens sections of the plurality of highly-directional light units located in the up-down direction of the body frame in the left light group and a right virtual line passing through left end portions of the optical lens sections of the plurality of highly-directional light units located in the up-down direction of the body frame in the right light group as viewed from the front of the body frame in the front-rear direction.

According to the eleventh aspect, it is possible to dispose a through-passage that allows air to pass therethrough using a space secured forward of the steering shaft while limiting an increase in the size of the body portion of the straddled vehicle forward of the steering shaft in the left-right direction and the front-rear direction of the body frame.

A straddled vehicle according to a twelfth aspect is the straddled vehicle according to the first aspect, in which at least part of an electric and electronic part other than the highly-directional light units, a throttle wire, a brake wire, a brake hose, a clutch wire, a wire harness and a key cylinder is disposed between a left virtual line passing through right end portions of the optical lens sections of the plurality of highly-directional light units located in the up-down direction of the body frame in the left light group and a right virtual line passing through left end portions of the optical lens sections of the plurality of highly-directional light units located in the up-down direction of the body frame in the right light group as viewed from the front of the body frame in the front-rear direction and behind a front end of the left light group and the right light group in the front-rear direction of the body frame and forward of a rear end of the left light group and the right light group in the front-rear direction of the body frame as viewed from above the up-down direction of the body frame.

According to the twelfth aspect, it is possible to dispose at least part of an electric and electronic part other than the highly-directional light unit, a throttle wire, a brake wire, brake hose, a clutch wire, a wire harness and a key cylinder using a space secured forward of the steering shaft while limiting an increase in the size of the body portion of the straddled vehicle forward of the steering shaft in the left-right direction and the front-rear direction of the body frame.

A straddled vehicle according to a thirteenth aspect is the straddled vehicle according to the first aspect, in which the highly-directional light unit located at a rightmost position in the left-right direction of the body frame in the left light group and the highly-directional light unit located at a leftmost position in the left-right direction of the body frame in the right light group are fixed to an identical base portion so as to be relatively not movable and configured to allow optical axes to be adjusted collectively.

According to the thirteenth aspect, it is possible to adjust the optical axis of the highly-directional light unit located at the rightmost position in the left-right direction of the body frame in the left light group and the optical axis of the highly-directional light unit located at the leftmost position in the left-right direction of the body frame in the right light group together, and thereby dispose the highly-directional light unit located at the rightmost position in the left-right direction of the body frame in the left light group and the highly-directional light unit located at the leftmost position in the left-right direction of the body frame in the right light group in a compact form. Thus, according to the thirteenth aspect, it is possible to secure a space forward of the steering shaft while limiting an increase in the size of the body portion of the straddled vehicle forward of the steering shaft in the left-right direction and the front-rear direction of the body frame.

A straddled vehicle according to a fourteenth aspect is the straddled vehicle according to the first aspect, in which each of the highly-directional light units included in the left light group and the right light group is a module including one of the light-emitting sections and one of the optical lens sections.

According to the fourteenth aspect, one light-emitting section and one optical lens section are modularized, which facilitates assembly into the vehicle body and allows the highly-directional light unit to be disposed in a compact form. Thus, according to the fourteenth aspect, it is possible to secure a space forward of the steering shaft while limiting an increase in the size of the body portion of the straddled vehicle forward of the steering shaft in the left-right direction and the front-rear direction of the body frame.

A straddled vehicle according to a fifteenth aspect is the straddled vehicle according to the first aspect, further including an outer cover that integrally covers at least a front area of two or more of the highly-directional light units included in the left light group and the right light group.

According to the fifteenth aspect, it is possible to protect optical lens sections of a plurality of highly-directional light units and arrange the plurality of highly-directional light units in a compact form. Thus, according to the fifteenth aspect, it is possible to secure a space forward of the steering shaft while limiting an increase in the size of the body portion of the straddled vehicle forward of the steering shaft in the left-right direction and the front-rear direction of the body frame.

A straddled vehicle according to the sixteenth aspect is the straddled vehicle according to the first aspect, in which the left light group includes two of the highly-directional light units that form a light distribution formed by the optical lens sections to become at least part of a light distribution of a main beam and the right light group includes two of the highly-directional light units that form a light distribution formed by the optical lens sections to become at least part of a light distribution of a dipped beam, or the left light group includes two of the highly-directional light units that form a light distribution formed by the optical lens sections to become at least part of a light distribution of a dipped beam and the right light group includes two of the highly-directional light units that form a light distribution formed by the optical lens sections to become at least part of a light distribution of a main beam.

According to the sixteenth aspect, it is possible to dispose two highly-directional light units that form a light distribution formed by the optical lens sections to become at least part of a light distribution of a main beam and two highly-directional light units that form a light distribution formed by the optical lens sections to become at least part of a light distribution of a dipped beam separately in the left-right direction of the body frame. Thus, according to the sixteenth aspect, it is possible to secure a space forward of the steering shaft while limiting an increase in the size of the body portion of the straddled vehicle forward of the steering shaft in the left-right direction and the front-rear direction of the body frame.

A straddled vehicle according to a seventeenth aspect is the straddled vehicle according to the first aspect, in which the left light group includes one of the highly-directional light units that forms a light distribution formed by the optical lens section to become at least part of a light distribution of a main beam and one of the highly-directional light units that forms a light distribution formed by the optical lens section to become at least part of a light distribution of a dipped beam, and the right light group includes one of the highly-directional light units that forms a light distribution formed by the optical lens section to become at least part of a light distribution of a main beam and one of the highly-directional light units that forms a light distribution formed by the optical lens section to become at least part of a light distribution of a dipped beam.

According to the seventeenth aspect, it is possible to dispose one highly-directional light unit that forms a light distribution formed by the optical lens section to become at least part of a light distribution of a main beam and one of the highly-directional light units that forms a light distribution formed by the optical lens section to become at least part of a light distribution of a dipped beam in the left-right direction of the body frame. Thus, it is possible to secure a space forward of the steering shaft while making more compact the configuration of radiating the main beam and the dipped beam. Thus, according to the seventeenth aspect, it is possible to secure a space forward of the steering shaft while limiting an increase in the size of the body portion of the straddled vehicle forward of the steering shaft in the left-right direction and the front-rear direction of the body frame.

A straddled vehicle according to an eighteenth aspect is the straddled vehicle according to the first aspect, in which the highly-directional light unit located at a rightmost position in the left-right direction of the body frame in the left light group is located at an uppermost position in the up-down direction of the body frame in the left light group, the highly-directional light unit located at a leftmost position in the left-right direction of the body frame in the right light group is located at an uppermost position in the up-down direction of the body frame in the right light group, the highly-directional light unit located at a leftmost position in the left-right direction of the body frame in the left light group is located at a lowermost position in the up-down direction of the body frame in the left light group, and the highly-directional light unit located at a rightmost position in the left-right direction of the body frame in the right light group is located at a lowermost position in the up-down direction of the body frame in the right light group.

According to the eighteenth aspect, an arrangement is provided in which, as viewed from the front of the body frame in the front-rear direction, the spacing in the left-right direction of the body frame between the highly-directional light unit located at the rightmost position in the left-right direction of the body frame and the uppermost position in the up-down direction of the body frame in the left light group and the highly-directional light unit located at the leftmost position in the left-right direction of the body frame and the uppermost position in the up-down direction of the body frame in the right light group is narrower than the spacing in the left-right direction of the body frame between the highly-directional light unit located at the leftmost position in the left-right direction of the body frame and the lowermost position in the up-down direction of the body frame in the right light group and the highly-directional light unit located at the rightmost position in the left-right direction of the body frame and the lowermost position in the up-down direction of the body frame in the left light group. Thus, according to the eighteenth aspect, it is possible to secure a space forward of the steering shaft while limiting an increase in the size of the body portion of the straddled vehicle forward of the steering shaft in the left-right direction and the front-rear direction of the body frame.

A straddled vehicle according to a nineteenth aspect is the straddled vehicle according to the first aspect, in which the highly-directional light unit located at a rightmost position in the left-right direction of the body frame in the left light group is located at a lowermost position in the up-down direction of the body frame in the left light group, the highly-directional light unit located at a leftmost position in the left-right direction of the body frame in the right light group is located at a lowermost position in the up-down direction of the body frame in the right light group, the highly-directional light unit located at a leftmost position in the left-right direction of the body frame in the left light group is located at an uppermost position in the up-down direction of the body frame in the left light group, and the highly-directional light unit located at a rightmost position in the left-right direction of the body frame in the right light group is located at an uppermost position in the up-down direction of the body frame in the right light group.

According to the nineteenth aspect, an arrangement is provided in which, as viewed from the front of the body frame in the front-rear direction, the spacing in the left-right direction of the body frame between the highly-directional light unit located at the rightmost position in the left-right direction of the body frame and the lowermost position in the up-down direction of the body frame in the left light group and the highly-directional light unit located at the leftmost position in the left-right direction of the body frame and the lowermost position in the up-down direction of the body frame in the right light group is narrower than the spacing in the left-right direction of the body frame between the highly-directional light unit located at the leftmost position in the left-right direction of the body frame and the uppermost position in the up-down direction of the body frame in the left light group and the highly-directional light unit located at the rightmost position in the left-right direction of the body frame and the uppermost position in the up-down direction of the body frame in the right light group. Thus, according to the nineteenth aspect, it is possible to secure a space forward of the steering shaft while limiting an increase in the size of the body portion of the straddled vehicle forward of the steering shaft in the left-right direction and the front-rear direction of the body frame.

Advantageous Effects of Invention

According to the present invention, it is possible to secure a space forward of the steering shaft while limiting an increase in the size of the body portion of the straddled vehicle forward of the steering shaft in the left-right direction and the front-rear direction of the body frame.

BRIEF DESCRIPTION OF DRAWINGS

FIGS. 22A to 22E are front views illustrating arrangement examples of the two highly-directional light units according to Embodiment 1 of the present invention;

FIGS. 23A to 23E are front views illustrating arrangement examples of the two highly-directional light units according to Embodiment 1 of the present invention;

FIGS. 27A to 27D are front views illustrating arrangement examples of the highly-directional light units and type examples when the light group according to Embodiment 1 of the present invention includes four highly-directional light units;

FIGS. 28A to 28D are front views illustrating arrangement examples of the highly-directional light units and type examples when the light group according to Embodiment 1 of the present invention includes four highly-directional light units;

DESCRIPTION OF EMBODIMENTS

Figure 1:
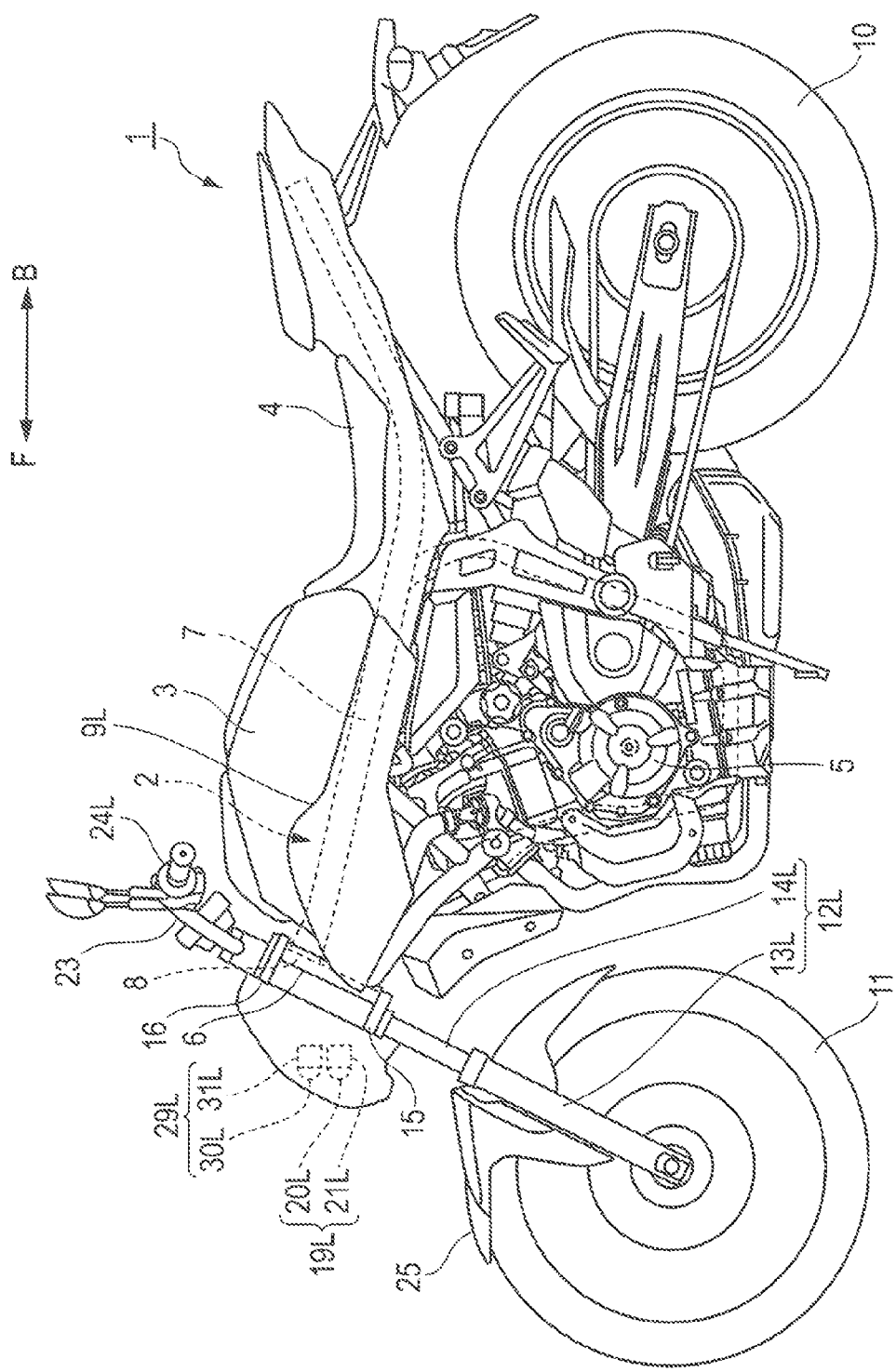
FIG. 1 is a side view illustrating a straddled vehicle according to Embodiment 1 of the present invention.

Hereinafter, embodiments of the present invention will be described with reference to the accompanying drawings.

<Definitions of Directions>

Hereinafter, the arrows described in the drawings are defined as follows. Arrow F denotes a front direction of the straddled vehicle in the front-rear direction of the body frame. Arrow B denotes a back direction of the straddled vehicle in the front-rear direction of the body frame. Arrow U denotes an up-direction of the straddled vehicle in the up-down direction of the body frame. Arrow D denotes a down-direction of the straddled vehicle in the up-down direction of the body frame. Arrow R denotes a right direction of the straddled vehicle in the left-right direction of the body frame. Arrow L denotes a left direction of the straddled vehicle in the left-right direction of the body frame.

(Embodiment 1)

Straddled vehicle 1 according to Embodiment 1 of the present invention will be described.

Figure 2:
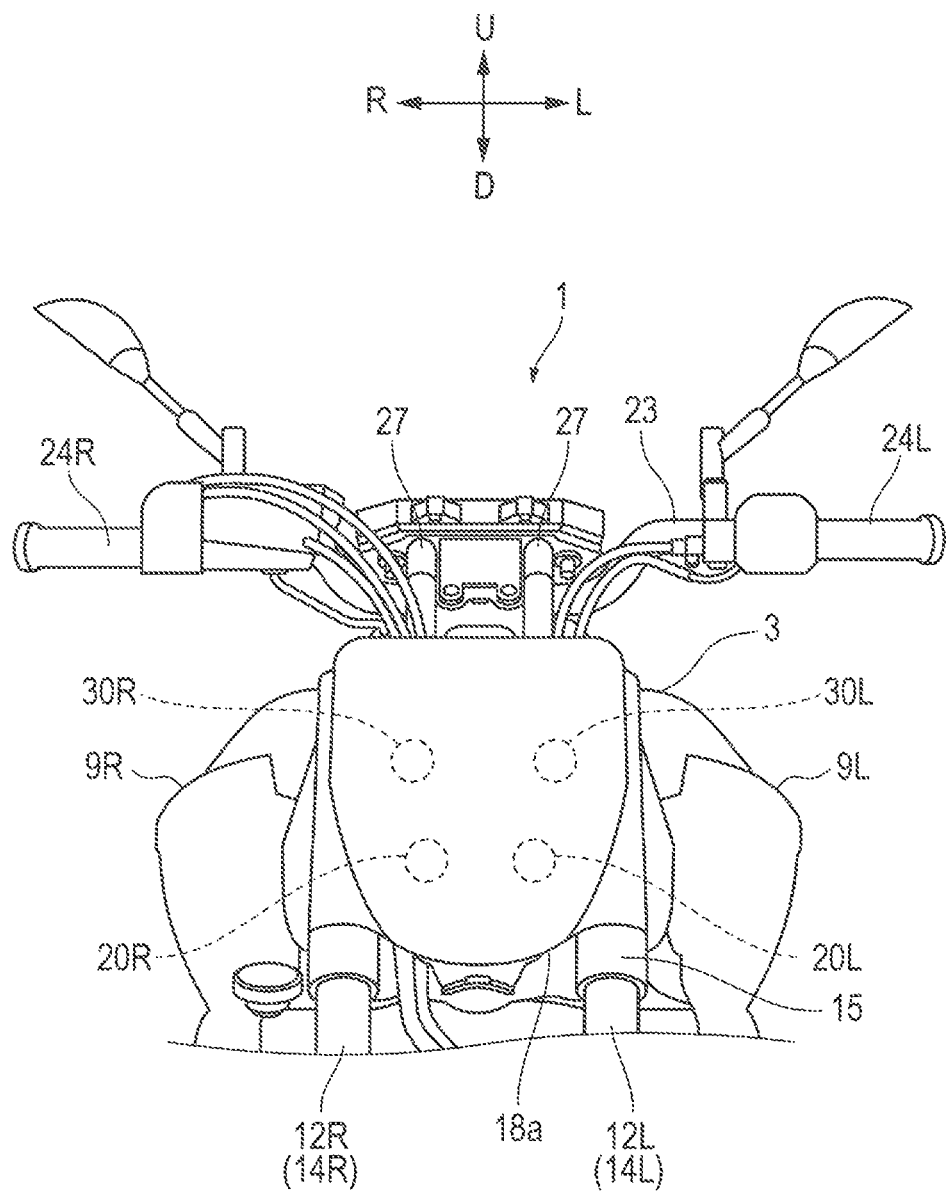
FIG. 2 is a front view of the straddled vehicle according to Embodiment 1 of the present invention.
Figure 3:
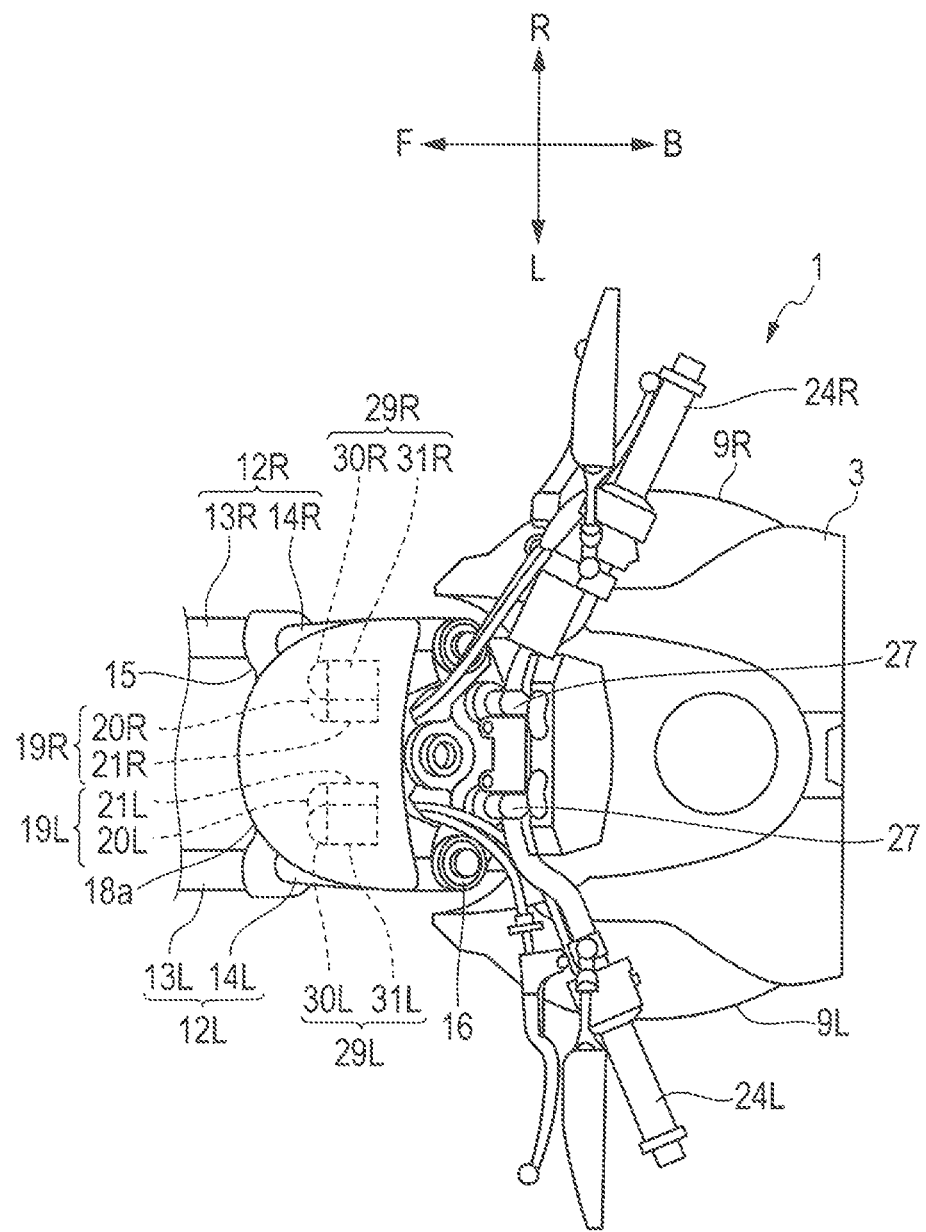
FIG. 3 is a plan view of the straddled vehicle according to Embodiment 1 of the present invention.

FIG. 1 is a side view illustrating straddled vehicle 1 according to the present embodiment. FIG. 2 is a front view of straddled vehicle 1 according to the present embodiment. FIG. 3 is a plan view of straddled vehicle 1 according to the present embodiment.

As shown in FIG. 1, straddled vehicle 1 includes body frame 2, fuel tank 3, seat 4, and power unit 5. Power unit 5 includes an engine section, a crank section, and a mission section. Straddled vehicle 1 is a naked type straddled vehicle.

Body frame 2 includes head pipe 6 and body frame 7. Body frame 7 is connected to head pipe 6 and is disposed behind head pipe 6.

Fuel tank 3 is disposed behind head pipe 6. Fuel tank 3 is disposed above body frame 7. Seat 4 is disposed behind fuel tank 3. Seat 4 is disposed above body frame 7. Power unit 5 is disposed below fuel tank 3. Power unit 5 is supported by body frame 7.

As shown in FIG. 1 to FIG. 3, straddled vehicle 1 includes steering shaft 8, left cover section 9L, right cover section 9R, rear wheel 10, front wheel 11, left front-wheel support unit 12L, right front-wheel support unit 12R, lower bracket 15, upper bracket 16, lamp unit 18a, and handlebar 23. Hereinafter, these components will be described.

Steering shaft 8 is supported by body frame 2 so as to be capable of turning (hereinafter, referred to as "turnably"). For example, steering shaft 8 is inserted into a hole of head pipe 6 and turns around a central axial line of head pipe 6.

Left cover portion 9L covers at least the left side of body frame 2. Right cover portion 9R covers at least the right side of body frame 2.

Figure 4:
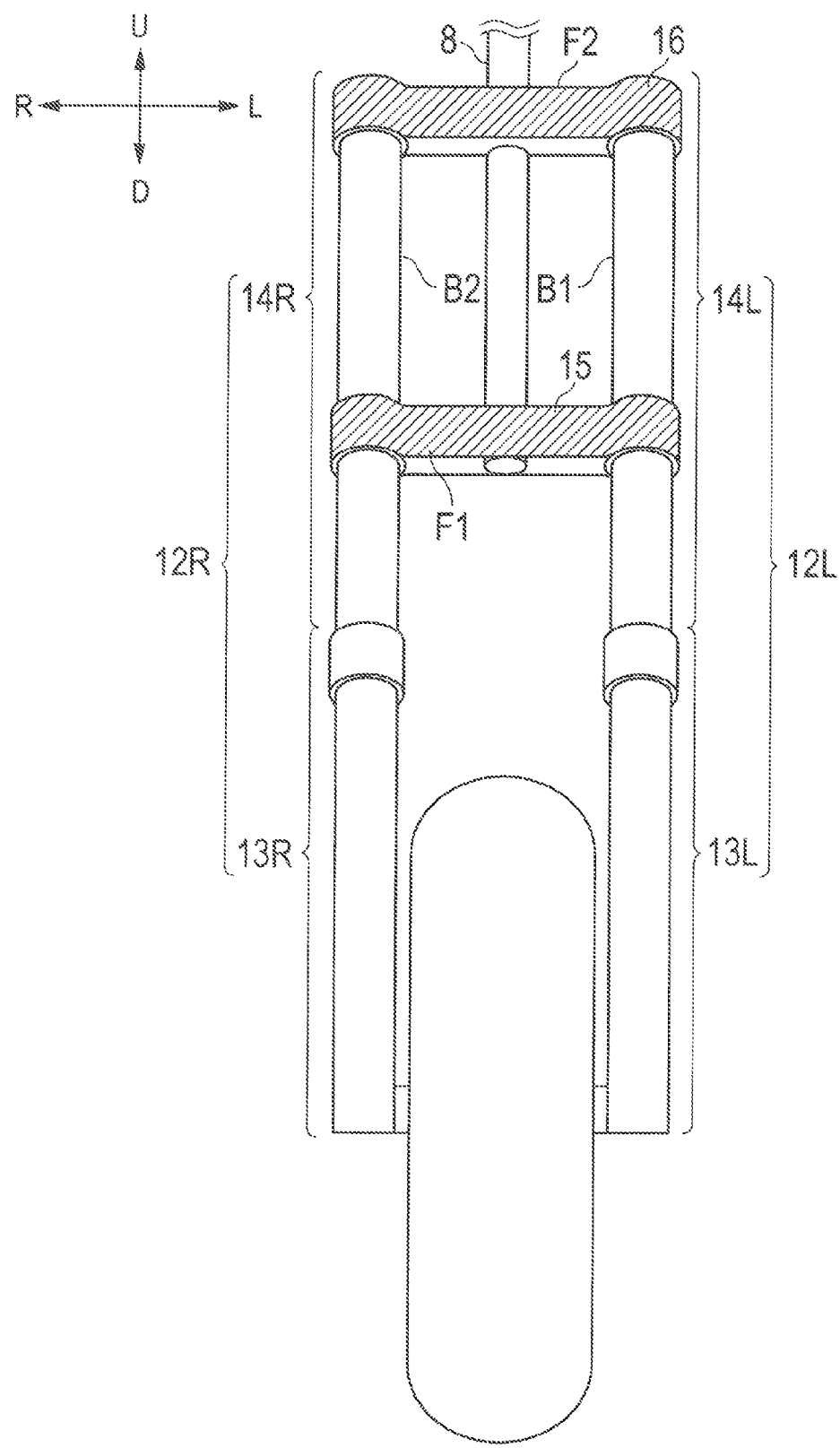
FIG. 4 is a front view illustrating a left front-wheel support unit, a right front-wheel support unit, an upper bracket, and a lower bracket according to Embodiment 1 of the present invention.

Left front-wheel support unit 12L is disposed on the left of front wheel 11 in the left-right direction of the body frame. Right front-wheel support unit 12R is disposed on the right of front wheel 11 in the left-right direction of the body frame. Left front-wheel support unit 12L and right front-wheel support unit 12R are arranged in pairs on left and right sides and rotatably support front wheel 11 and turn integrally with steering shaft 8. Left front-wheel support unit 12L and right front-wheel support unit 12R fixedly support fender 25 that covers an upper portion of front wheel 11. FIG. 4 is a front view illustrating left front-wheel support unit 12L and right front-wheel support unit 12R as viewed from the front of body frame 2 in the front-rear direction.

As shown in FIG. 4, left front-wheel support unit 12L is located on the left of steering shaft 8 in the left-right direction of body frame 2. Left front-wheel support unit 12L includes, for example, left upper member 14L supported by the left portion of upper bracket 16 and the left portion of lower bracket 15, and left lower member 13L that supports front wheel 11 and that is displaceable with respect to left upper member 14L in the up-down direction.

As shown in FIG. 4, right front-wheel support unit 12R is located on the right of steering shaft 8 in the left-right direction of body frame 2. Right front-wheel support unit 12R includes, for example, right upper member 14R supported by the right portion of upper bracket 16 and the right portion of lower bracket 15, and right lower member 13R that supports front wheel 11 and that is displaceable with respect to right upper member 14R in the up-down direction.

Both left front-wheel support unit 12L and right front-wheel support unit 12R may internally include a spring and a damper. Alternatively, one of left front-wheel support unit 12L and right front-wheel support unit 12R may include a spring while the other includes a damper. Alternatively, one of left front-wheel support unit 12L and right front-wheel support unit 12R may include a spring and a damper while the other includes neither a spring nor a damper.

Lower bracket 15 and upper bracket 16 are connected to steering shaft 8, left front-wheel support unit 12L and right front-wheel support unit 12R. FIG. 4 is a front view illustrating lower bracket 15 and upper bracket 16 as viewed from the front of body frame 2 in the front-rear direction.

As shown in FIG. 4, a left portion of lower bracket 15 is connected to a lower portion of left upper member 14L of left front-wheel support unit 12L, while a right portion of lower bracket 15 is connected to a lower portion of right upper member 14R of right front-wheel support unit 12R, and a central portion of lower bracket 15 is provided at a lower portion of steering shaft 8. Lower bracket 15 includes lower bracket front face F1 that faces forward in the front-rear direction of body frame 2 of side surfaces making up lower bracket 15.

As shown in FIG. 4, a left portion of upper bracket 16 is connected to an upper portion of left upper member 14L of left front-wheel support unit 12L, while a right portion of upper bracket 16 is connected to an upper portion of right upper member 14R of right front-wheel support unit 12R and a central portion of upper bracket 16 is provided at an upper portion of steering shaft 8. Upper bracket 16 includes upper bracket front face F2 that faces forward in the front-rear direction of body frame 2 of side surfaces making up upper bracket 16.

Handlebar 23 is made up of a member that is long in the left-right direction of body frame 2 and is configured to turn integrally with steering shaft 8 in accordance with steering of a rider. As shown in FIG. 2 and FIG. 3, handlebar 23 is fixed to handlebar holders 27 disposed above upper bracket 16. Handlebar 23 includes left grip 24L disposed on the left of handlebar 23 and held by the rider and right grip 24R disposed on the right of handlebar 23 and held by the rider. Note that handlebar 23 may be constructed of a single member or may be constructed of a right handlebar member and a left handlebar member or may be constructed of another component.

Lamp unit 18*a* is disposed so as to cover at least part of a region, as viewed from the front of body frame 2 in the front-rear direction, between a right edge of left front-wheel support unit 12L and a left edge of right front-wheel support unit 12R, and between a top edge or bottom edge of upper bracket front face F2 and a top edge or bottom edge of lower bracket front face F1.

Lamp unit 18*a* includes, in a casing, a light group including at least four highly-directional light units. The highly-directional light unit is a light section that refracts highly-directional light and forms a light distribution, and the light distribution becomes at least part of a light distribution of a main beam or dipped beam. In FIG. 1 to FIG. 3, lamp unit 18*a* includes leftward highly-directional light unit 19L, leftward highly-directional light unit 29L, rightward highly-directional light unit 19R, and rightward highly-directional light unit 29R, for example.

In the present specification, as viewed from the front of body frame 2 in the front-rear direction, the highly-directional light unit provided on the left of steering shaft 8 in the left-right direction of body frame 2 is called "leftward highly-directional light unit." At least two or more leftward highly-directional light units are collectively called a "left light group." As viewed from the front of body frame 2 in the front-rear direction, the highly-directional light unit provided on the right of steering shaft 8 in the left-right direction of body frame 2 is called a "rightward highly-directional light unit." At least two or more rightward highly-directional light units are collectively called a "right light group." The left light group and the right light group are collectively called a "light group."

Leftward highly-directional light unit 19L includes optical lens section 20L and case 21L, for example. Leftward highly-directional light unit 29L includes optical lens section 30L and case 31L, for example. Rightward highly-directional light unit 19R includes optical lens section 20R and case 21R, for example. Rightward highly-directional light unit 29R includes optical lens section 30R and case 31R, for example.

Light radiated outward from the light group including leftward highly-directional light units 19L and 29L and rightward highly-directional light units 19R and 29R constitutes a main beam and a dipped beam.

Here, the main beam refers to a beam that radiates light onto a region of the same height or higher than that of the center of lamp unit 18*a* of illuminations of the headlight that illuminates an area forward of the vehicle to allow straddled vehicle 1 to travel even in the darkness. On the other hand, the dipped beam refers to a restrained beam that radiates light onto a region of the same level or higher than that of the center of lamp unit 18 in illumination of the headlight that illuminates forward of the vehicle to allow straddled vehicle 1 to travel even in the darkness so as not to dazzle the driver of the vehicle coming on the opposite side.

Figure 5A:
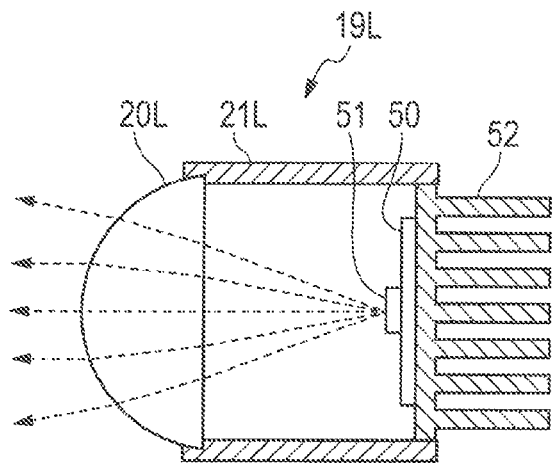
FIGS. 5A to 5C are side views illustrating examples of a highly-directional light unit according to Embodiment 1 of the present invention.
Figure 5B:
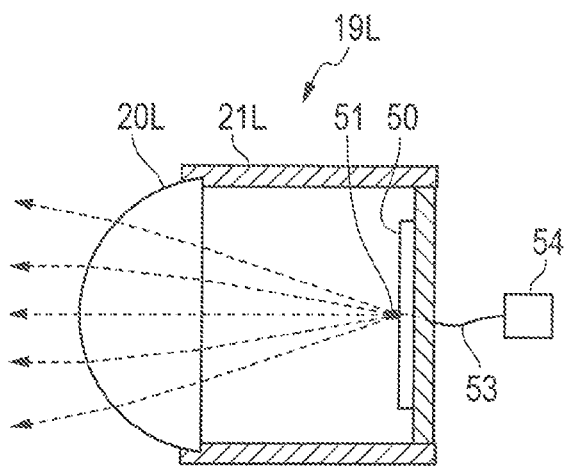
Figure 5C:
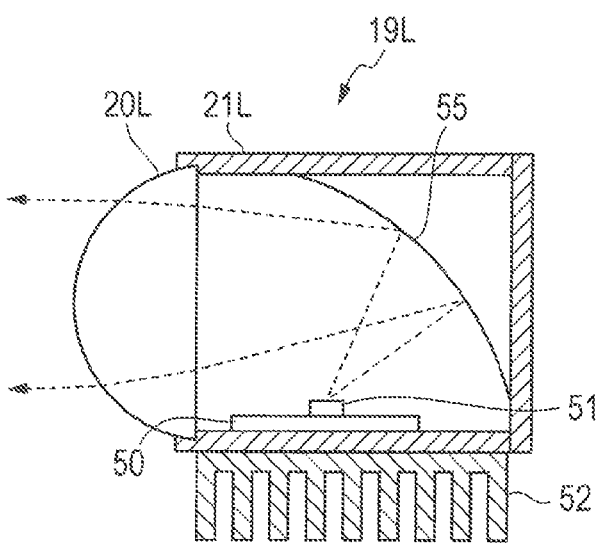

Here, configuration examples of the highly-directional light unit will be described in detail using FIG. 5A to FIG. 5C. Here, leftward highly-directional light unit 19L will be described as an example. FIG. 5A to FIG. 5C are side views of leftward highly-directional light unit 19L. Leftward highly-directional light unit 19L shown in FIG. 5A to FIG. 5C includes light-emitting section 51 that emits highly-directional light and optical lens section 20L that refracts the light of the light-emitting section and forms at least part of a light distribution of a main beam or dipped beam.

Note that optical lens section 20L and light-emitting section 51 may or may not be modularized. The term "module" means components that are replaceable as a single unit. When modularized, light-emitting section 51 and optical lens section 20L can be more easily assembled into the body of straddled vehicle 1.

As shown in FIG. 5A, leftward highly-directional light unit 19L includes substrate 50 in the rear of case 21L. Light-emitting section 51 is disposed on an inner side surface of case 21L of substrate 50, and heat sink 52 is disposed on an outer side surface of case 21L of substrate 50.

In FIG. 5A, light-emitting section 51 is, for example, an LED (light emitting diode) and emits highly-directional light. Optical lens section 20L refracts light of light-emitting section 51 and forms a light distribution. The light distribution formed by optical lens section 20L becomes at least part of a light distribution of a main beam or dipped beam.

Leftward highly-directional light unit 19L may also have a configuration shown in FIG. 5B or FIG. 5C in addition to the aforementioned configuration in FIG. 5A. In the configuration shown in FIG. 5B, substrate 50 holds light-emitting section 51 which is one end of optical fiber 53. Light source 54 is connected to the other end of optical fiber 53. Light source 54 is, for example, a semiconductor laser. In the configuration shown in FIG. 5C, substrate 50, light-emitting section 51 (e.g., LED) and heat sink 52 are arranged on a side surface of case 21L. Reflector 55 that reflects light of light-emitting section 51 is disposed in case 21L.

The configuration of leftward highly-directional light unit 19L has been described in detail as an example, but leftward highly-directional light unit 29L, rightward highly-directional light unit 19L, and rightward highly-directional light unit 29R also adopt one of the configurations in FIG. 5A to FIG. 5C as described above.

Note that illustrations of substrate 50, light-emitting section 51, heat sink 52 or the like are omitted in FIG. 1 to FIG. 3 and drawings which will be described later (e.g., FIG. 12 to FIG. 14, FIG. 23, FIG. 33 and FIG. 35).

<Necessary Conditions of Highly-Directional Light Unit>

The highly-directional light units according to the present embodiment satisfy the necessary conditions described below.

[Up-Down/Left-Right Arrangement Conditions]

First, up-down/left-right arrangement conditions will be described using FIG. 6. The up-down/left-right arrangement conditions are conditions showing in what range a plurality of highly-directional light units are arranged which are included in a light group in the up-down direction of body frame 2 and in the left-right direction of body frame 2 as viewed from the front in the front-rear direction of body frame 2.

Figure 6:
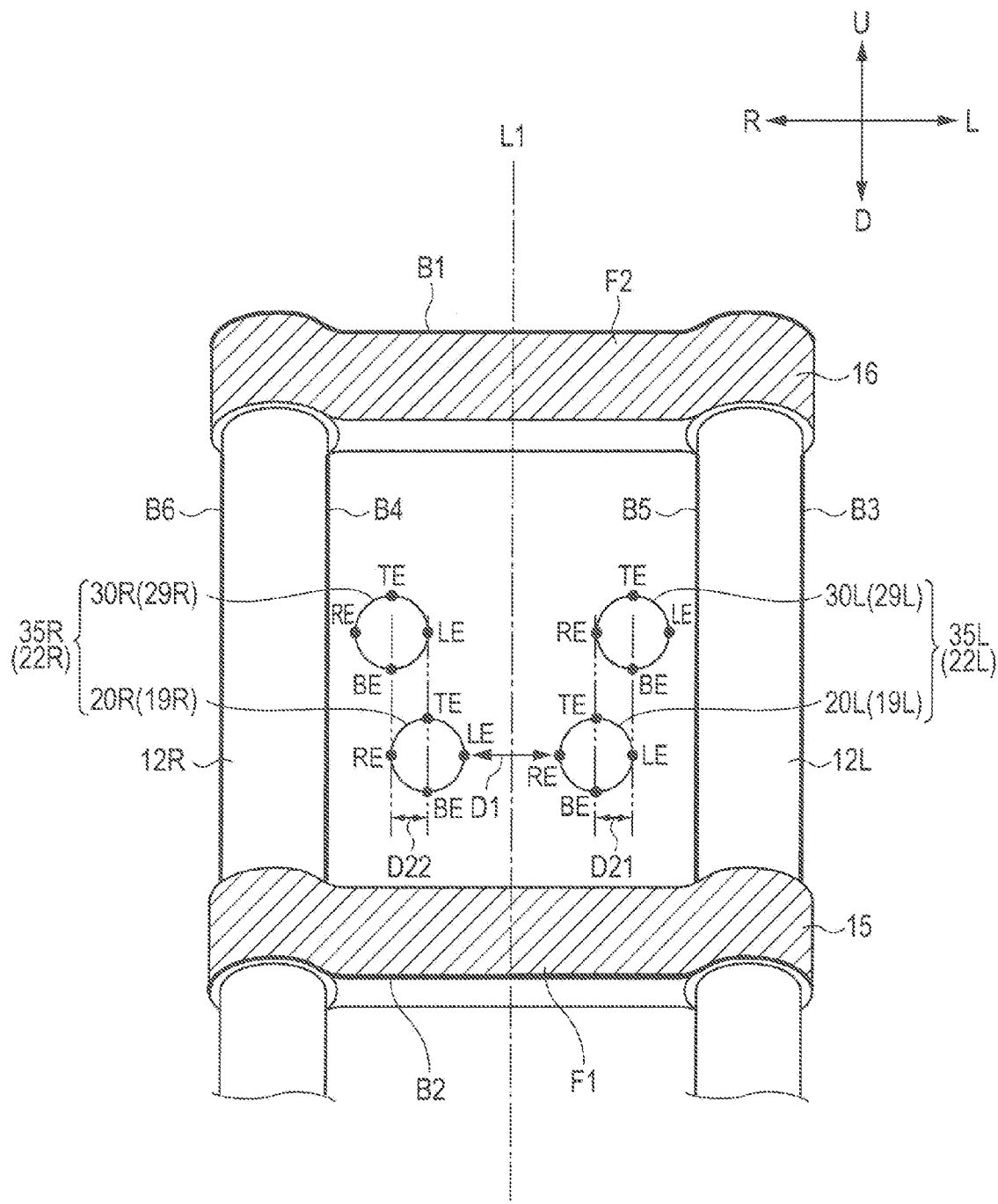
FIG. 6 is a front view illustrating an arrangement example of the highly-directional light units when a light group according to Embodiment 1 of the present invention includes four highly-directional light units.

FIG. 6 is a front view illustrating an arrangement example of the highly-directional light units in the case where the light group includes four highly-directional light units as viewed from the front of body frame 2 in the front-rear direction.

In FIG. 6, center virtual line L1 indicates a line passing through the center of body frame 2 in the up-down direction. In other words, center virtual line L1 is a line passing through the central axis of steering shaft 8 (see FIG. 4) in the up-down direction of body frame 2 as viewed from front of body frame 2 in the front-rear direction. In FIG. 6, B1 denotes a top edge of upper bracket front face F2, B2 denotes a bottom edge of lower bracket front face F1, B3 denotes a left edge of left front-wheel support unit 12L, B4 denotes a left edge of right front-wheel support unit 12R, B5 denotes a right edge of left front-wheel support unit 12L and B6 denotes a right edge of right front-wheel support unit 12R.

In FIG. 6, TE denotes a top end (also referred to as "top end portion") of the optical lens section of the highly-directional light unit, BE denotes a bottom end (also referred to as "bottom end portion") of the optical lens section of the highly-directional light unit, LE denotes a left end (also referred to as "left end portion") of the optical lens section of the highly-directional light unit and RE denotes a right end (also referred to as "right end portion") of the optical lens section of the highly-directional light unit.

Note that the same definitions of the above-described reference numerals are applied to the other drawings.

As shown in FIG. 6, optical lens section 20L of leftward highly-directional light unit 19L, optical lens section 30L of leftward highly-directional light unit 29L, optical lens section 20R of rightward highly-directional light unit 19R, and optical lens section 30R of rightward highly-directional light unit 29R are arranged so as not to overlap center virtual line L1.

As shown in FIG. 6, optical lens section 20L of leftward highly-directional light unit 19L and optical lens section 30L of leftward highly-directional light unit 29L are located on the left of center virtual line L1 in the left-right direction of body frame 2. That is, leftward highly-directional light unit 19L and leftward highly-directional light unit 29L are located on the left of steering shaft 8 in the left-right direction of body frame 2. Left light group 22L includes leftward highly-directional light unit 19L and leftward highly-directional light unit 29L.

As shown in FIG. 6, as viewed from the front of body frame 2 in the front-rear direction, optical lens section 20L of leftward highly-directional light unit 19L is located at the rightmost position in the left-right direction of body frame 2 and the lowermost position in the up-down direction of body frame 2 in left light group 22L. As viewed from the front of body frame 2 in the front-rear direction, optical lens section 30L of leftward highly-directional light unit 29L is located at the leftmost position in the left-right direction of body frame 2 and the uppermost position in the up-down direction of body frame 2 in left light group 22L.

As shown in FIG. 6, optical lens section 20R of rightward highly-directional light unit 19R and optical lens section 30R of rightward highly-directional light unit 29R are on the right of center virtual line L1 in the left-right direction of body frame 2. That is, rightward highly-directional light unit 19R and rightward highly-directional light unit 29R are on the right of steering shaft 8 in the left-right direction of body frame 2. Right light group 22R includes rightward highly-directional light unit 19R and rightward highly-directional light unit 29R.

As shown in FIG. 6, as viewed from the front of body frame 2 in the front-rear direction, optical lens section 20R of rightward highly-directional light unit 19R is located at the leftmost position in the left-right direction of body frame 2 and the lowermost position in the up-down direction of body frame 2 in right light group 22R. As viewed from the front of body frame 2 in the front-rear direction, optical lens section 30R of rightward highly-directional light unit 29R is located at the rightmost position in the left-right direction of body frame 2 and the uppermost position in the up-down direction of body frame 2 in right light group 22R.

In the present specification, a set of optical lens sections of leftward highly-directional light unit included in the left light group as viewed from the front of body frame 2 in the front-rear direction is called "left optical lens body." That is, the left optical lens body is made up of optical lens sections of leftward highly-directional light units included in the left light group. The top end of the left optical lens body is the top end of the optical lens section of the leftward highly-directional light unit located at the uppermost position in the plurality of leftward highly-directional light units in the up-down direction of body frame 2. The bottom end of the left optical lens body is the bottom end of the optical lens section of the leftward highly-directional light unit located at the lowermost position in the up-down direction of body frame 2 in the plurality of leftward highly-directional light units. The left end of the left optical lens body is the left end of the optical lens section of the leftward highly-directional light unit located at the leftmost position in the left-right direction of body frame 2 in the plurality of leftward highly-directional light units. The right end of the left optical lens body is the right end of the optical lens section of the leftward highly-directional light unit located at the rightmost position in the left-right direction of body frame 2 in the plurality of leftward highly-directional light units.

Thus, in FIG. 6, left optical lens body 35L is made up of optical lens section 20L of leftward highly-directional light unit 19L and optical lens section 30L of leftward highly-directional light unit 29L. The top end of left optical lens body 35L is top end TE of optical lens section 30L located at the uppermost position in the up-down direction of body frame 2. The bottom end of left optical lens body 35L is bottom end BE of optical lens section 20L located at the lowermost position in the up-down direction of body frame 2. The left end of left optical lens body 35L is left end LE of optical lens section 30L located at the leftmost position in the left-right direction of body frame 2. The right end of left optical lens body 35L is right end RE of optical lens section 20L located at the rightmost position in the left-right direction of body frame 2.

In the present specification, as viewed from the front of body frame 2 in the front-rear direction, a set of optical lens sections of rightward highly-directional light units included in the right light group is called "right optical lens body." That is, the right optical lens body is made up of optical lens sections of rightward highly-directional light units included in the right light group. The top end of the right optical lens body is the top end of the optical lens section of the rightward highly-directional light unit located at the uppermost position in the plurality of rightward highly-directional light units in the up-down direction of body frame 2. The bottom end of the right optical lens body is the bottom end of the optical lens section of the rightward highly-directional light unit located at the lowermost position in the plurality of rightward highly-directional light units in the up-down direction of body frame 2. The left end of the right optical lens body is the left end of the optical lens section of the rightward highly-directional light unit located at the leftmost position in the left-right direction of body frame 2 in the plurality of rightward highly-directional light units. The right end of the right optical lens body is the right end of the optical lens section of the rightward highly-directional light unit located at the rightmost position in the left-right direction of body frame 2 in the plurality of rightward highly-directional light units.

Thus, in FIG. 6, right optical lens body 35R is made up of optical lens section 20R of rightward highly-directional light unit 19R and optical lens section 30R of rightward highly-directional light unit 29R. The top end of right optical lens body 35R is top end TE of optical lens section 30R located at the uppermost position in the up-down direction of body frame 2. The bottom end of right optical lens body 35R is bottom end BE of optical lens section 20R located at the lowermost position in the up-down direction of body frame 2. The left end of right optical lens body 35R is left end LE of optical lens section 20R located at the leftmost position in the left-right direction of body frame 2. The right end of right optical lens body 35R is right end RE of optical lens section 30R located at the rightmost position in the left-right direction of body frame 2.

As shown in FIG. 6, top end TE (top end TE of optical lens section 30L) of left optical lens body 35L is located below top edge B1 of upper bracket front face F2 in the up-down direction of body frame 2. As shown in FIG. 6, top end TE (top end TE of optical lens section 30R) of right optical lens 35R is located below top edge B1 of upper bracket front face F2 in the up-down direction of body frame 2.

As shown in FIG. 6, bottom end BE (bottom end BE of optical lens section 20L) of left optical lens body 35L is located above bottom edge B2 of lower bracket front face F1 in the up-down direction of body frame 2. As shown in FIG. 6, bottom end BE (bottom end BE of optical lens section 20R) of right optical lens body 35R is located above bottom edge B2 of lower bracket front face F1 in the up-down direction of body frame 2.

As shown in FIG. 6, left end LE (left end LE of optical lens section 30L) of left optical lens body 35L is located on the right of left edge B3 of left front-wheel support unit 12L in the left-right direction of body frame 2. As shown in FIG. 6, right end RE (right end RE of optical lens section 20L) of left optical lens body 35L is located on the right of right edge B5 of left front-wheel support unit 12L in the left-right direction of body frame 2.

As shown in FIG. 6, left end LE of right optical lens body 35R (left end LE of optical lens section 20R) is located on the left of left edge B4 of right front-wheel support unit 12R in the left-right direction of body frame 2. As shown in FIG. 6, right end RE of right optical lens body 35R (right end RE of optical lens section 30R) is located on the left of right edge B6 of right front-wheel support unit 12R in the left-right direction of body frame 2.

Under the above-described up-down/left-right arrangement conditions, left optical lens body 35L and right optical lens body 35R are arranged within a region enclosed by the top edge of upper bracket 16, the bottom edge of lower bracket 15, the left edge of left front-wheel support unit 12L and the right edge of right front-wheel support unit 12R as viewed from the front of body frame 2 in the front-rear direction. Therefore, it is possible to suppress an increase in the size of the body portion of straddled vehicle 1 forward of steering shaft 8 in the left-right direction of body frame 2.

Figure 7:
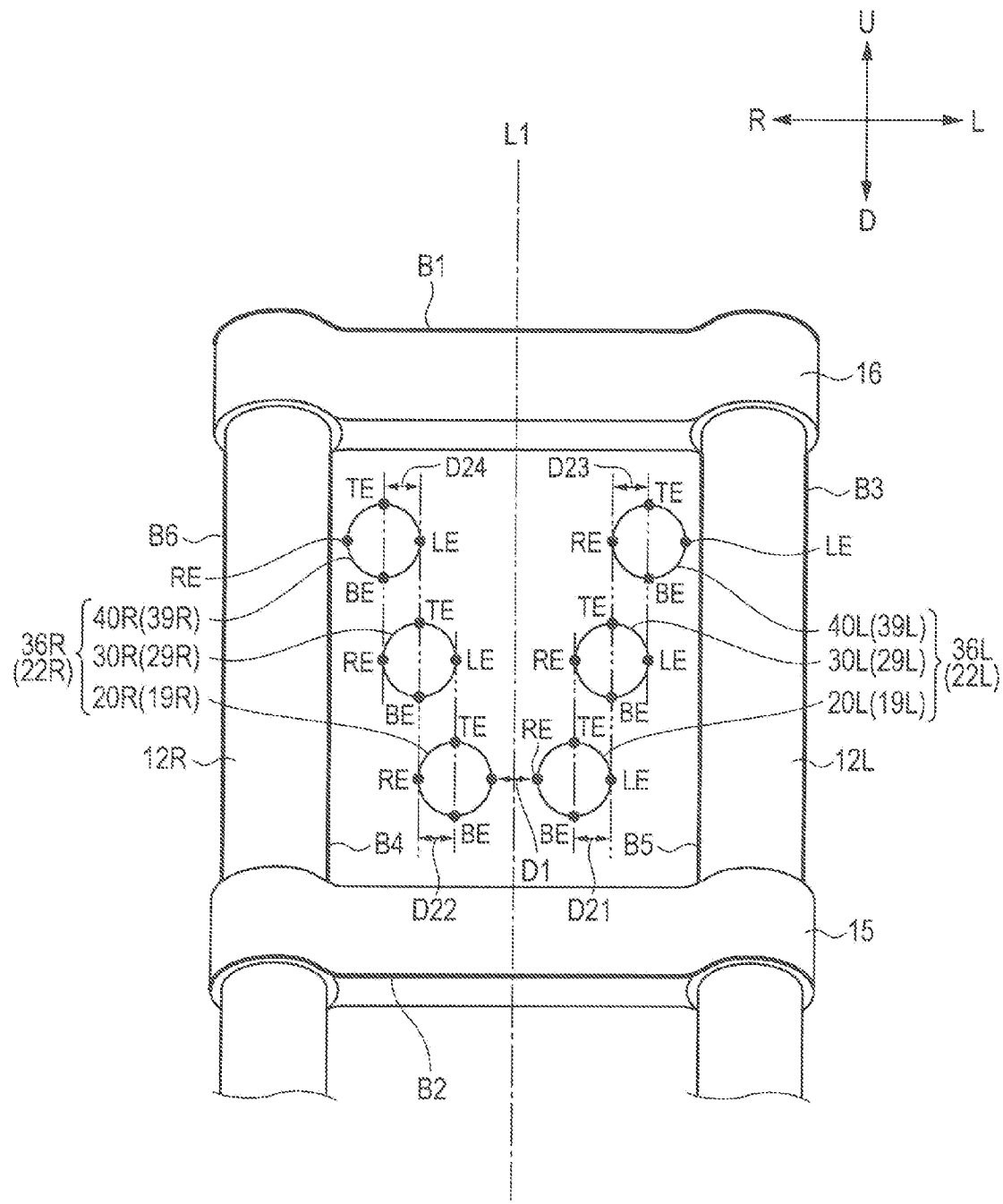
FIG. 7 is a front view illustrating an arrangement example of the highly-directional light units when the light group according to Embodiment 1 of the present invention includes six highly-directional light units.

Next, up-down/left-right arrangement conditions will be described using FIG. 7. FIG. 7 is a front view illustrating an arrangement example of the respective highly-directional light units in the case where the light group includes six highly-directional light units as viewed from the front of body frame 2 in the front-rear direction.

As shown in FIG. 7, left light group 22L includes leftward highly-directional light unit 39L in addition to leftward highly-directional light units 19L and 29L. On the other hand, right light group 22R includes rightward highly-directional light unit 39R in addition to rightward highly-directional light units 19R and 29R. As viewed from the front of body frame 2 in the front-rear direction, optical lens section 40L of leftward highly-directional light unit 39L is located at the leftmost position in the left-right direction of body frame 2 and the uppermost position in the up-down direction of body frame 2 in left light group 22L. As viewed from the front of body frame 2 in the front-rear direction, optical lens section 40R of rightward highly-directional light unit 39R is located at the rightmost position in the left-right direction of body frame 2 and the uppermost position in the up-down direction of body frame 2 in right light group 22R.

In FIG. 7, left optical lens body 36L is made up of optical lens section 20L of leftward highly-directional light unit 19L, optical lens section 30L of leftward highly-directional light unit 29L and optical lens section 40L of leftward highly-directional light unit 39L. The top end of left optical lens body 36L is top end TE of optical lens section 40L located at the uppermost position in the up-down direction of body frame 2. The bottom end of left optical lens body 36L is bottom end BE of optical lens section 20L located at the lowermost position in the up-down direction of body frame 2. The left end of left optical lens body 36L is left end LE of optical lens section 40L located at the leftmost position in the left-right direction of body frame 2. The right end of left optical lens body 36L is right end RE of optical lens section 20L located at the rightmost position in the left-right direction of body frame 2.

In FIG. 7, right optical lens body 36R is made up of optical lens section 20R of rightward highly-directional light unit 19R, optical lens section 30R of rightward highly-directional light unit 29R and optical lens section 30R of rightward highly-directional light unit 29R. The top end of right optical lens body 36R is top end TE of optical lens section 40R located at the uppermost position in the up-down direction of body frame 2. The bottom end of right optical lens body 36R is bottom end BE of optical lens section 20R located at the lowermost position in the up-down direction of body frame 2. The left end of right optical lens body 36R is left end LE of optical lens section 20R located at the leftmost position in the left-right direction of body frame 2. The right end of right optical lens body 36R is right end RE of optical lens section 40R located at the rightmost position in the left-right direction of body frame 2.

As shown in FIG. 7, top end TE of left optical lens body 36L (top end TE of optical lens section 40L) is located below top edge B1 of upper bracket front face F2 in the up-down direction of body frame 2. As shown in FIG. 7, top end TE of right optical lens 36R (top end TE of optical lens section 40R) is located below top edge B1 of upper bracket front face F2 in the up-down direction of body frame 2.

As shown in FIG. 7, bottom end BE of left optical lens body 36L (bottom end BE of optical lens section 20L) is located above bottom edge B2 of lower bracket front face F1 in the up-down direction of body frame 2. As shown in FIG. 7, bottom end BE of right optical lens body 36R (bottom end BE of optical lens section 20R) is located above bottom edge B2 of lower bracket front face F1 in the up-down direction of body frame 2.

As shown in FIG. 7, left end LE of left optical lens body 36L (left end LE of optical lens section 40L) is located on the right of left edge B3 of left front-wheel support unit 12L in the left-right direction of body frame 2. As shown in FIG. 7, right end RE of left optical lens body 36L (right end RE of optical lens section 20L) is located on the right of right edge B5 of left front-wheel support unit 12L in the left-right direction of body frame 2.

As shown in FIG. 7, left end LE of right optical lens body 36R (left end LE of optical lens section 20R) is located on the left of left edge B4 of right front-wheel support unit 12R in the left-right direction of body frame 2. As shown in FIG. 7, right end RE of right optical lens body 36R (right end RE of optical lens section 40R) is located on the left of right edge B6 of right front-wheel support unit 12R in the left-right direction of body frame 2.

Under the above-described up-down/left-right arrangement conditions, as viewed from the front of body frame 2 in the front-rear direction, left optical lens body 36L and right optical lens body 36R are arranged within a region enclosed by the top edge of upper bracket 16, the bottom edge of lower bracket 15, the left edge of left front-wheel support unit 12L and the right edge of right front-wheel support unit 12R. Therefore, it is possible to limit an increase in the size of the body portion of straddled vehicle 1 forward of steering shaft 8 in the left-right direction of body frame 2.

Figure 8:
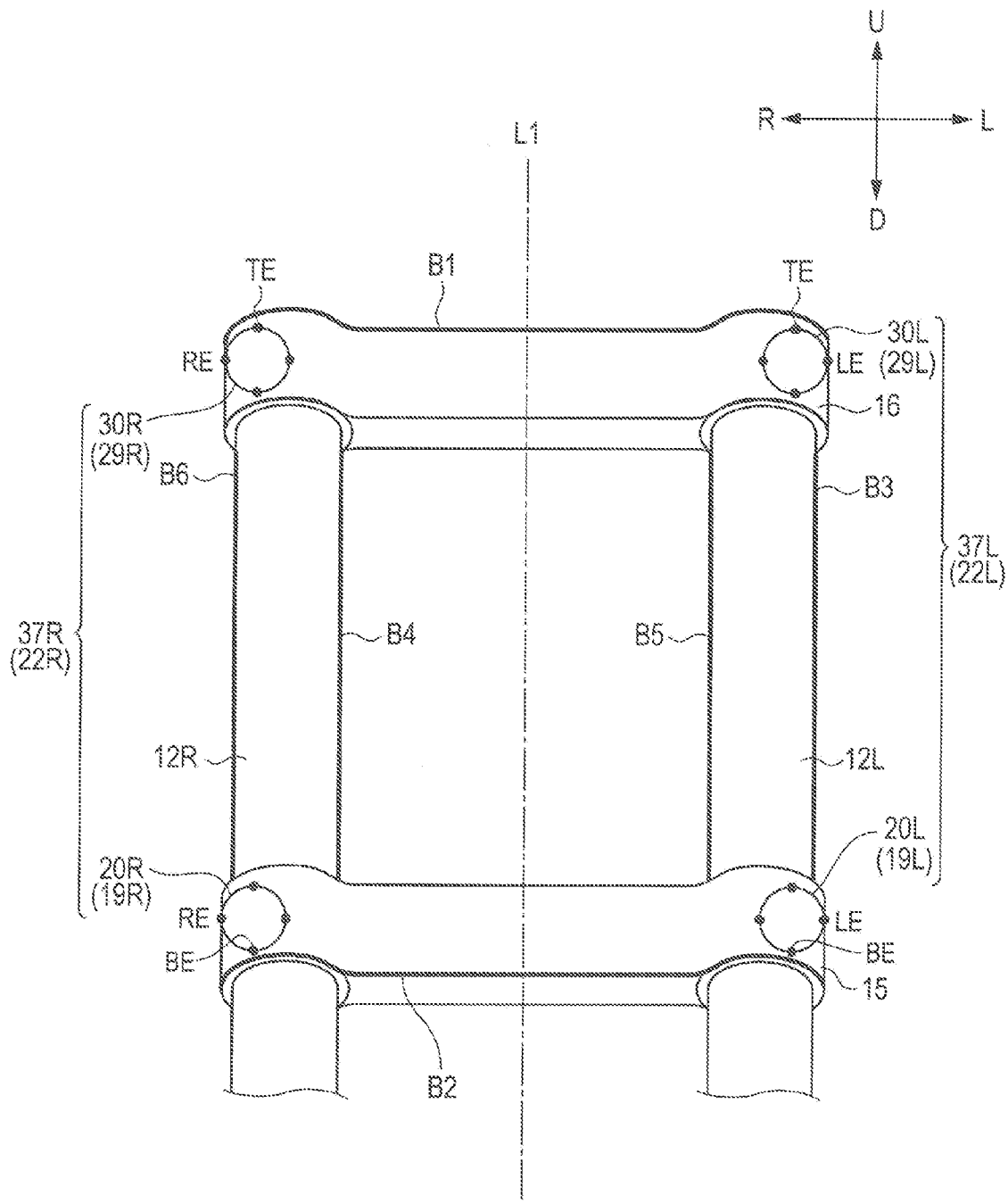
FIG. 8 is a front view illustrating another arrangement example of the highly-directional light units that satisfy up and down and left and right arrangement conditions according to Embodiment 1 of the present invention.

Note that the arrangement of the highly-directional light units that satisfies the up-down/left-right arrangement conditions is not limited to the arrangements shown in FIG. 6 and FIG. 7. FIG. 8 shows another arrangement example of the highly-directional light units that satisfies the up-down/left-right arrangement conditions as viewed from the front of body frame 2 in the front-rear direction. Like FIG. 6, FIG. 8 shows a case where a light group includes four highly-directional light units.

As shown in FIG. 8, as viewed from the front of body frame 2 in the front-rear direction, optical lens section 20L of leftward highly-directional light unit 19L is located at lowermost position in left light group 22L in the up-down direction of body frame 2. As viewed from the front of body frame 2 in the front-rear direction, optical lens section 30L of leftward highly-directional light unit 29L is located at the uppermost position in left light group 22L in the up-down direction of body frame 2. As viewed from the front of body frame 2 in the front-rear direction, both optical lens section 20L of leftward highly-directional light unit 19L and optical lens section 30L of leftward highly-directional light unit 29L are located at the leftmost position in the left-right direction of body frame 2 in left light group 22L. That is, optical lens section 20L and optical lens section 30L are arranged without any misalignment in the left-right direction of body frame 2 as viewed from the front of body frame 2 in the front-rear direction.

As shown in FIG. 8, as viewed from the front of body frame 2 in the front-rear direction, optical lens section 20R of rightward highly-directional light unit 19R is located at the lowermost position in right light group 22R in the up-down direction of body frame 2. As viewed from the front of body frame 2 in the front-rear direction, optical lens section 30R of rightward highly-directional light unit 29R is located at the uppermost position in right light group 22R in the up-down direction of body frame 2. As viewed from the front of body frame 2 in the front-rear direction, both optical lens section 20R of rightward highly-directional light unit 19R and optical lens section 30R of rightward highly-directional light unit 29R are located at the rightmost positions in the left-right direction of body frame 2 in right light group 22R. That is, optical lens section 20R and optical lens section 30R are arranged without any misalignment in the left-right direction of body frame 2 as viewed from the front of body frame 2 in the front-rear direction.

In FIG. 8, left optical lens body 37L is made up of optical lens section 20L of leftward highly-directional light unit 19L and optical lens section 30L of leftward highly-directional light unit 29L. The top end of left optical lens body 37L is top end TE of optical lens section 30L. The bottom end of left optical lens body 37L is bottom end BE of optical lens section 20L. The left end of left optical lens body 37L is left end LE of either optical lens section 20L or optical lens section 30L. The right end of left optical lens body 37L is right end RE of either optical lens section 20L or optical lens section 30L.

In FIG. 8, right optical lens body 37R is made up of optical lens section 20R of rightward highly-directional light unit 19R and optical lens section 30R of rightward highly-directional light unit 29R. The bottom end of right optical lens body 37R is bottom end BE of optical lens section 20R. The top end of right optical lens body 37R is top end TE of optical lens section 30R. The left end of right optical lens body 37R is left end LE of either optical lens section 20R or optical lens section 30R. The right end of right optical lens body 37R is right end RE of either optical lens section 20R or optical lens section 30R.

As shown in FIG. 8, top end TE of left optical lens body 37L (top end TE of optical lens section 30L) is located below top edge B1 of upper bracket front face F2 in the up-down direction of body frame 2. As shown in FIG. 8, top end TE of right optical lens 37R (top end TE of optical lens section 30R) is located below top edge B1 of upper bracket front face F2 in the up-down direction of body frame 2.

As shown in FIG. 8, bottom end BE of left optical lens body 37L (bottom end BE of optical lens section 20L) is located above bottom edge B2 of lower bracket front face F1 in the up-down direction of body frame 2. As shown in FIG. 8, bottom end BE of right optical lens body 37R (bottom end BE of optical lens section 20R) is located above bottom edge B2 of lower bracket front face F1 in the up-down direction of body frame 2.

As shown in FIG. 8, left end LE of left optical lens body 37L (left end LE of optical lens section 20L or left end LE of optical lens section 30L) is located on the left of left edge B3 of left front-wheel support unit 12L in the left-right direction of body frame 2. As shown in FIG. 8, right end RE of left optical lens body 37L (right end RE of optical lens section 20L or right end RE of optical lens section 30L) is located on the left of right edge B5 of left front-wheel support unit 12L in the left-right direction of body frame 2.

As shown in FIG. 8, left end LE of right optical lens body 37R (left end LE of optical lens section 20R or left end LE of optical lens section 30R) is located on the right of left edge B4 of right front-wheel support unit 12R in the left-right direction of body frame 2. As shown in FIG. 8, right end RE of right optical lens body 37R (right end RE of optical lens section 20R or right end RE of optical lens section 30R) is located on the right of right edge B6 of right front-wheel support unit 12R in the left-right direction of body frame 2.

[Up-Down Relation Condition 1]

Next, up-down relation condition 1 will be described using FIG. 1 and FIG. 6. Up-down relation condition 1 is a condition showing what positional relationship exists between a plurality of leftward highly-directional light units of left light group 22L in the up-down direction of body frame 2 and what positional relationship exists between a plurality of rightward highly-directional light units of right light group 22R in the up-down direction of body frame 2.

As shown in FIG. 6, as viewed from the front of body frame 2 in the front-rear direction, optical lens section 20L of leftward highly-directional light unit 19L and optical lens section 30L of leftward highly-directional light unit 29L of left light group 22L are provided at positions overlapping each other in the up-down direction of body frame 2. As shown in FIG. 6, as viewed from the front of body frame 2 in the front-rear direction, optical lens section 20R of rightward highly-directional light unit 19R and optical lens section 30R of rightward highly-directional light unit 29R of right light group 22R are provided at positions overlapping each other in the up-down direction of body frame 2.

As shown in FIG. 1, as viewed from the left side in the left-right direction of body frame 2, leftward highly-directional light unit 19L and leftward highly-directional light unit 29L of left light group 22L are provided at positions overlapping each other in the up-down direction of body frame 2. Though not shown, right light group 22R is also disposed in the same way as left light group 22L shown in FIG. 1. That is, as viewed from the right side in the left-right direction of body frame 2, rightward highly-directional light unit 19R and rightward highly-directional light unit 29R are provided at positions overlapping each other in the up-down direction of body frame 2.

Under above-described up-down relation condition 1, leftward highly-directional light units 19L and 29L and rightward highly-directional light units 19R and 29R included in the light group (left light group 22L and right light group 22R) can be formed on the basis of the up-down direction of body frame 2 respectively.

Next, up-down relation condition 1 will be described using FIG. 7.

As shown in FIG. 7, as viewed from the front of body frame 2 in the front-rear direction, optical lens section 20L of leftward highly-directional light unit 19L, optical lens section 30L of leftward highly-directional light unit 29L and optical lens section 40L of leftward highly-directional light unit 39L of left light group 22L are provided at positions overlapping each other in the up-down direction of body frame 2. As shown in FIG. 7, as viewed from the front of body frame 2 in the front-rear direction, optical lens section 20R of rightward highly-directional light unit 19R, optical lens section 30R of rightward highly-directional light unit 29R and optical lens section 40R of rightward highly-directional light unit 39R of right light group 22R are provided at positions overlapping each other in the up-down direction of body frame 2.

Though not shown, as viewed from the left side in the left-right direction of body frame 2, leftward highly-directional light unit 19L, leftward highly-directional light unit 29L and leftward highly-directional light unit 39L of left light group 22L are provided at positions overlapping each other in the up-down direction of body frame 2. Though not shown, as viewed from the right side in the left-right direction of body frame 2, rightward highly-directional light unit 19R, rightward highly-directional light unit 29R and rightward highly-directional light unit 39R of right light group 22R are provided at positions overlapping each other in the up-down direction of body frame 2.

Under above-described up-down relation condition 1, leftward highly-directional light units 19L, 29L and 39L and rightward highly-directional light units 19R, 29R and 39R included in the light group (left light group 22L and right light group 22R) can be formed on the basis of the up-down direction of body frame 2 respectively.

[Left-Right Relation Condition 1]

Next, left-right relation condition 1 will be described using FIG. 6. Left-right relation condition 1 is a condition showing the length between the right end of the optical lens sections of the leftward highly-directional light units of left light group 22L and the left end of the optical lens sections of the rightward highly-directional light units of the right light group 22R in the left-right direction of body frame 2 as viewed from the front of body frame 2 in the front-rear direction.

The definitions of length D1, length D21 and length D22 shown in FIG. 6 are as follows. Length D1 is the length between right end RE of optical lens section 20L of leftward highly-directional light unit 19L and left end LE of optical lens section 20R of rightward highly-directional light unit 19R in the left-right direction of body frame 2. In other words, length D1 is the length between right end RE of left optical lens body 35L and left end LE of right optical lens body 35R in the left-right direction of body frame 2. Length D21 is the length by which optical lens section 20L of leftward highly-directional light unit 19L and optical lens section 30L of leftward highly-directional light unit 29L neighboring in the up-down direction of body frame 2 overlap with each other in the left-right direction. In other words, length D21 is the length between left end LE of optical lens section 20L of leftward highly-directional light unit 19L and right end RE of optical lens section 30L of leftward highly-directional light unit 29L in the left-right direction of body frame 2. Length D22 is the length by which optical lens section 20R of rightward highly-directional light unit 19R and optical lens section 30R of rightward highly-directional light unit 29R neighboring in the up-down direction of body frame 2 overlap with each other in the left-right direction. In other words, length D22 is the length between right end RE of optical lens section 20R of rightward highly-directional light unit 19R and left end LE of optical lens section 30R of rightward highly-directional light unit 29R in the left-right direction of body frame 2.

As shown in FIG. 6, length D1 is longer than length D21 and longer than length D22. That is, the length between right end RE of optical lens section 20L of leftward highly-directional light unit 19L and left end LE of optical lens section 20R of rightward highly-directional light unit 19R in the left-right direction of body frame 2 is formed to be greater than both the length by which optical lens section 20L of leftward highly-directional light unit 19L and optical lens section 30L of leftward highly-directional light unit 29L neighboring in the up-down direction of body frame 2 overlap with each other in the left-right direction and the length by which optical lens section 20R of rightward highly-directional light unit 19R and optical lens section 30R of rightward highly-directional light unit 29R neighboring in the up-down direction of body frame 2 overlap with each other in the left-right direction.

In FIG. 6, the length between right end RE of optical lens section 30L of leftward highly-directional light unit 29L and left end LE of optical lens section 30R of rightward highly-directional light unit 29R in the left-right direction of body frame 2 is also longer than length D21 and longer than length D22.

Next, left-right relation condition 1 will be described using FIG. 7.

The definitions of length D23 and length D24 shown in FIG. 7 are as follows. Length D23 is the length by which optical lens section 30L of leftward highly-directional light unit 29L and optical lens section 40L of leftward highly-directional light unit 39L neighboring in the up-down direction of body frame 2 overlap with each other in the left-right direction. In other words, length D23 is the length between left end LE of optical lens section 30L of leftward highly-directional light unit 29L and right end RE of optical lens section 40L of leftward highly-directional light unit 39L in the left-right direction of body frame 2. Length D24 is the length by which optical lens section 30R of rightward highly-directional light unit 29R and optical lens section 40R of rightward highly-directional light unit 39R neighboring in the up-down direction of body frame 2 overlap with each other in the left-right direction. In other words, length D24 is the length between right end RE of optical lens section 30R of rightward highly-directional light unit 29R and left end LE of optical lens section 40R of rightward highly-directional light unit 39R in the left-right direction of body frame 2.

As shown in FIG. 7, length D1 is longer than length D21 and longer than length D22. That is, the length between right end RE of optical lens section 20L of leftward highly-directional light unit 19L and left end LE of optical lens section 20R of rightward highly-directional light unit 19R in the left-right direction of body frame 2 is formed to be greater than both the length by which optical lens section 20L of leftward highly-directional light unit 19L and optical lens section 30L of leftward highly-directional light unit 29L neighboring in the up-down direction of body frame 2 overlap with each other in the left-right direction and the length by which optical lens section 20R of rightward highly-directional light unit 19R and optical lens section 30R of rightward highly-directional light unit 29R neighboring in the up-down direction of body frame 2 overlap with each other in the left-right direction.

As shown in FIG. 7, length D1 is longer than length D23 and longer than length D24. That is, the length between right end RE of optical lens section 20L of leftward highly-directional light unit 19L and left end LE of optical lens section 20R of rightward highly-directional light unit 19R in the left-right direction of body frame 2 is formed to be greater than both the length by which optical lens section 30L of leftward highly-directional light unit 29L and optical lens section 40L of leftward highly-directional light unit 39L neighboring in the up-down direction of body frame 2 overlap with each other in the left-right direction and the length by which optical lens section 30R of rightward highly-directional light unit 29R and optical lens section 40R of rightward highly-directional light unit 39R neighboring in the up-down direction of body frame 2 overlap with each other in the left-right direction.

In FIG. 7, the length between right end RE of optical lens section 30L of leftward highly-directional light unit 29L and left end LE of optical lens section 30R of rightward highly-directional light unit 29R in the left-right direction of body frame 2 is also longer than any one of length D21 to length D24. Furthermore, in FIG. 7, the length between right end RE of optical lens section 40L of leftward highly-directional light unit 39L and left end LE of optical lens section 40R of rightward highly-directional light unit 39R in the left-right direction of body frame 2 is also longer than any one of length D21 to length D24.

Under above-described left-right relation condition 1, left light group 22L and right light group 22R formed on the basis of the up-down direction of body frame 2 are provided spaced apart from each other in the left-right direction of body frame 2 in the region formed by left edge B3 of left front-wheel support unit 12L, right edge B6 of right front-wheel support unit 12R, top edge B1 of upper bracket 16 and the bottom edge of lower bracket 15.

<Operation and Effects of Each Condition>

By satisfying the aforementioned up-down/left-right arrangement conditions, up-down relation condition 1 and left-right relation condition 1, straddled vehicle 1 can secure a space forward of steering shaft 8 while limiting an increase in the size of the body portion of straddled vehicle 1 forward of steering shaft 8 in the left-right direction and the front-rear direction of body frame 2.

That is, under the up-down/left-right arrangement conditions, the top end portion of left optical lens body 35L is disposed below the top edge of upper bracket 16 in the up-down direction of body frame 2. The bottom end portion of left optical lens body 35L is disposed above the bottom edge of lower bracket 15 in the up-down direction of body frame 2. The left end portion of left optical lens body 35L is disposed on the right of the left edge of left front-wheel support unit 12L in the left-right direction of body frame 2. The right end portion of left optical lens body 35L is disposed on the right of the right edge of left front-wheel support unit 12R in the left-right direction of body frame 2. The top end portion of right optical lens body 35R is disposed below the top edge of upper bracket 16 in the up-down direction of body frame 2. The bottom end portion of right optical lens body 35R is disposed above the bottom edge of lower bracket 15 in the up-down direction of body frame 2. The right end portion of right optical lens body 35R is disposed on the left of the right edge of right front-wheel support unit 12R in the left-right direction of body frame 2. The left end portion of right optical lens body 35R is disposed on the left of the left edge of right front-wheel support unit 12R in the left-right direction of body frame 2. Thus, in left light group 22L and right light group 22R, as viewed from the front of body frame 2 in the front-rear direction, left optical lens body 35L and right optical lens body 35R are provided in the region formed by the left edge of left front-wheel support unit 12L, the right edge of right front-wheel support unit 12R, the top edge of upper bracket 16 and the bottom edge of lower bracket 15. Thus, it is possible to limit an increase in the size of the body portion of straddled vehicle 1 forward of steering shaft 8 in the left-right direction of body frame 2.

Under up-down relation condition 1, a plurality of optical lens sections of left light group 22L are provided at positions overlapping each other in the up-down direction of body frame 2 as viewed from the front of body frame 2 in the front-rear direction. A plurality of highly-directional light units of left light group 22L are provided at positions overlapping each other in the up-down direction of body frame 2 as viewed from the left side in the left-right direction of body frame 2. A plurality of optical lens sections of right light group 22R are provided at positions overlapping each other in the up-down direction of body frame 2 as viewed from the front of body frame 2 in the front-rear direction. A plurality of highly-directional light units of right light group 22R are provided at positions overlapping each other in the up-down direction of body frame 2 as viewed from the right side in the left-right direction of body frame 2. Thus, left light group 22L and right light group 22R can be each formed on the basis of the up-down direction of body frame 2.

Furthermore, the length between the right end portion of the optical lens sections of left light group 22L and the left end portion of the optical lens sections of right light group 22R in the left-right direction of body frame 2 is formed to be greater than the length by which the optical lens sections neighboring in the up-down direction of left light group 22L overlap with each other in the left-right direction and the length by which the optical lens sections neighboring in the up-down direction of right light group 22R overlap with each other in the left-right direction. Left light group 22L and right light group 22R formed on the basis of the up-down direction of body frame 2 are provided while being spaced apart from each other in the left-right direction of body frame 2 in the region formed by the left edge of left front-wheel support unit 12L, the right edge of right front-wheel support unit 12R, the top edge of upper bracket 16 and the bottom edge of lower bracket 15. In other words, left light group 22L and right light group 22R formed on the basis of the up-down direction of body frame 2 are provided so as to extend along left front-wheel support unit 12L and right front-wheel support unit 12R. Therefore, it is possible to further secure a space extending forward of steering shaft 8 in the up-down direction of body frame 2. Since it is possible to further secure a space extending in the up-down direction of body frame 2, it is possible to limit an increase in the size of the body portion of straddled vehicle 1 forward of steering shaft 8 in the front-rear direction of body frame 2 even when several parts such as a brake hose and a wire harness are arranged between steering shaft 8 and lamp unit 18a.

Thus, according to straddled vehicle 1, it is possible to secure a space forward of steering shaft 8 while limiting an increase in the size of the body portion of straddled vehicle 1 forward of steering shaft 8 in the left-right direction and front-rear direction of body frame 2.

<Example of Use of Space>

Here, examples of the above-described space secured in straddled vehicle 1 will be described using FIG. 17 and FIG. 18.

First, the range of space in the up-down/left-right direction of body frame 2 as viewed from the front of body frame 2 in the front-rear direction will be described using FIG. 17. FIG. 17 is a front view illustrating an example of arrangement and an example of range of the highly-directional light units as viewed from the front of body frame 2 in the front-rear direction in the case where the light group includes four highly-directional light units.

Figure 17:
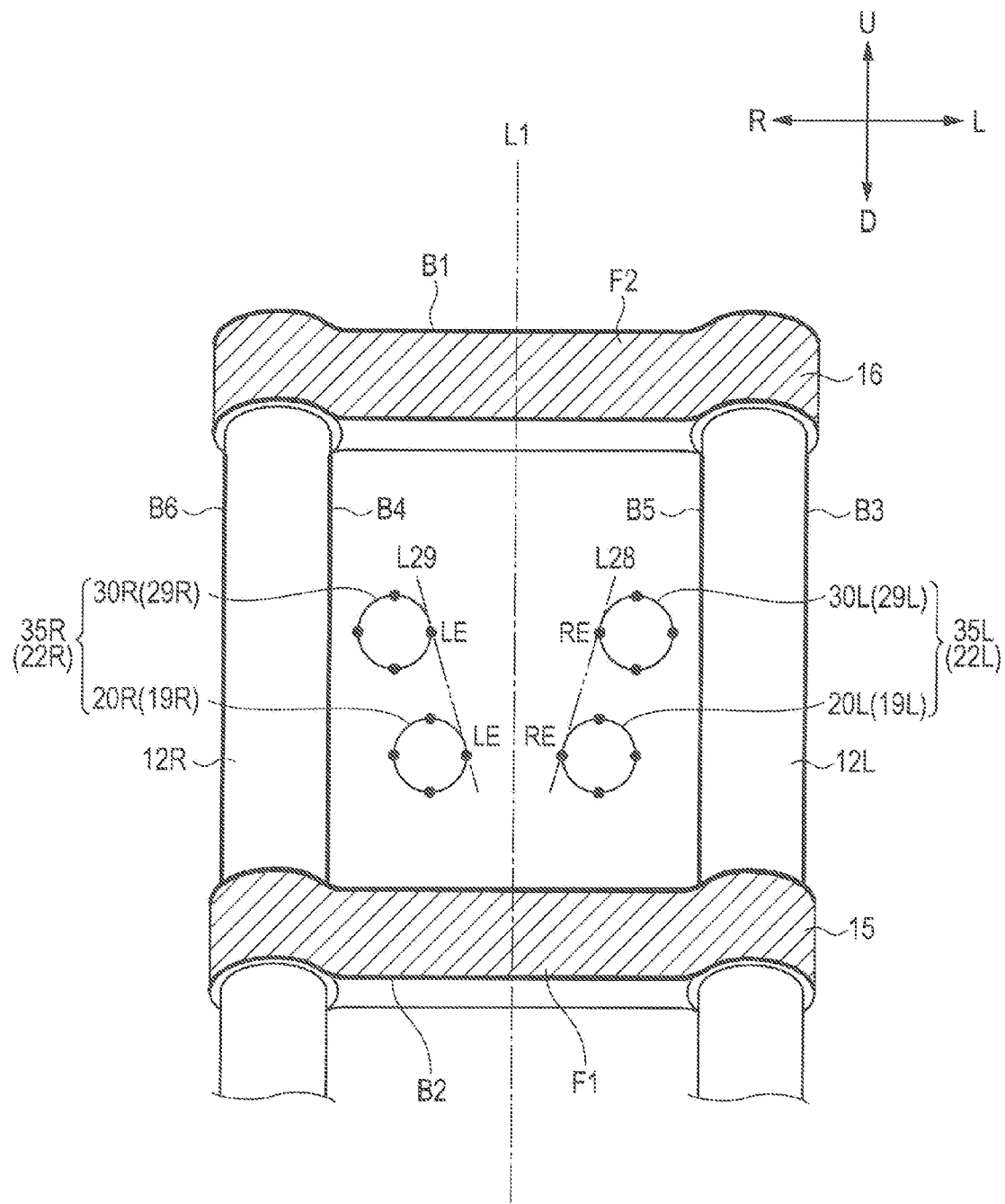
FIG. 17 is a front view illustrating an arrangement example of the highly-directional light units and an example of spatial range when the light group according to Embodiment 1 of the present invention includes four highly-directional light units.

In FIG. 17, virtual line L28 is a line passing through right end RE of optical lens section 30L of leftward highly-directional light unit 29L and right end RE of optical lens section 20L of leftward highly-directional light unit 19L. Virtual line L29 is a line passing through left end LE of optical lens section 30R of rightward highly-directional light unit 29R and left end LE of optical lens section 20R of rightward highly-directional light unit 19R. Note that virtual line L28 and virtual line L29 are not limited to the shape shown in FIG. 17.

In FIG. 17, the range of space in the up-down/left-right direction of body frame 2 as viewed from the front of body frame 2 in the front-rear direction is between virtual line L28 and virtual line L29.

Next, the range of space in the front-rear direction and left-right direction of body frame 2 as viewed from above in the up-down direction of body frame 2 will be described using FIG. 18. FIG. 18 is a front view illustrating an example of arrangement and an example of range of the highly-directional light units as viewed from above in the up-down direction of body frame 2 in the case where the light group includes four highly-directional light units.

Note that in the example of FIG. 18, the arrangement of leftward highly-directional light unit 19L and leftward highly-directional light unit 29L in the front-rear direction of body frame 2 has been assumed to be an arrangement shown in FIG. 13B which will be described later, but the arrangement is not limited to this, and may be another arrangement (e.g., arrangement example which will be described later in front-rear relation condition 2). In the example of FIG. 18, the arrangement of rightward highly-directional light unit 19R and rightward highly-directional light unit 29R in the front-rear direction of body frame 2 has been assumed to be an arrangement shown in FIG. 15C which will be described later, but the arrangement is not limited to this, and may be another arrangement (e.g., arrangement example which will be described later in front-rear relation condition 3).

Figure 18:
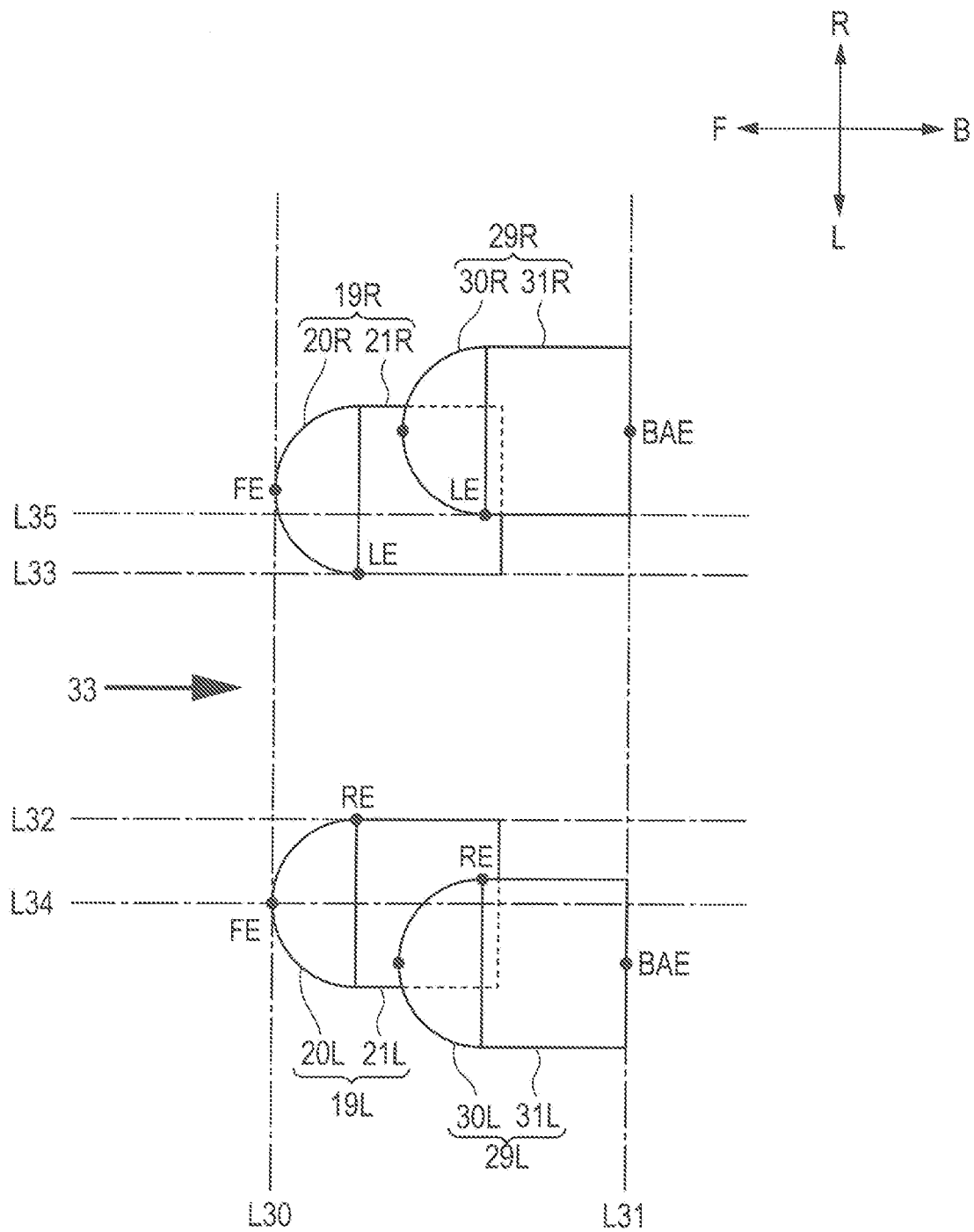
FIG. 18 is a plan view illustrating an arrangement example of the highly-directional light units and an example of spatial range when the light group according to Embodiment 1 of the present invention includes four highly-directional light units.

The definitions of virtual lines L30 to L35 shown in FIG. 18 are as follows. Virtual line L30 is a straight line passing through front end FE of leftward highly-directional light unit 19L and front end FE of rightward highly-directional light unit 19R. Virtual line L31 is a straight line passing through rear end BAE of leftward highly-directional light unit 29L and rear end BAE of rightward highly-directional light unit 29R. Virtual line L32 is a straight line passing through right end RE of optical lens section 20L of leftward highly-directional light unit 19L. Virtual line L33 is a straight line passing through left end LE of optical lens section 20R of rightward highly-directional light unit 19R. Virtual line L34 is a straight line passing through right end RE of optical lens section 30L of leftward highly-directional light unit 29L. Virtual line L35 is a straight line passing through left end LE of optical lens section 30R of rightward highly-directional light unit 29R. Note that in the present specification, front end FE of the highly-directional light unit is a front end of the optical lens section of the highly-directional light unit, for example. In the present specification, rear end BAE of the highly-directional light unit is a rear end of one of the case, substrate and heat sink in the highly-directional light unit (see FIGS. 5A to 5C).

In FIG. 18, as viewed from above in the up-down direction of body frame 2, the range of space in the front-rear direction of body frame 2 is between virtual line L30 and virtual line L31. In FIG. 18, as viewed from above in the up-down direction of body frame 2, the range of space in the left-right direction is between virtual line L32 and virtual line L33, and between virtual line L34 and virtual line L35.

Thus, a space is secured between virtual line L28 and virtual line L29, as viewed from the front of body frame 2 in the front-rear direction, between virtual line L30 and virtual line L31 as viewed from above in the up-down direction of body frame 2, between virtual line L32 and virtual line L33, and between virtual line L34 and virtual line L35. This space is a through-passage that penetrates in the front-rear direction of body frame 2.

The above-described space can be used as an air hole to pass air 33 through the hole from outside as shown in FIG. 18. Air 33 guided into straddled vehicle 1 via the space is used by an air cleaner, engine or the like, used to cool an electric and/or electronic part (details will be described later) or radiator or the like or used to output a sound of a horn to the outside.

Figure 19:
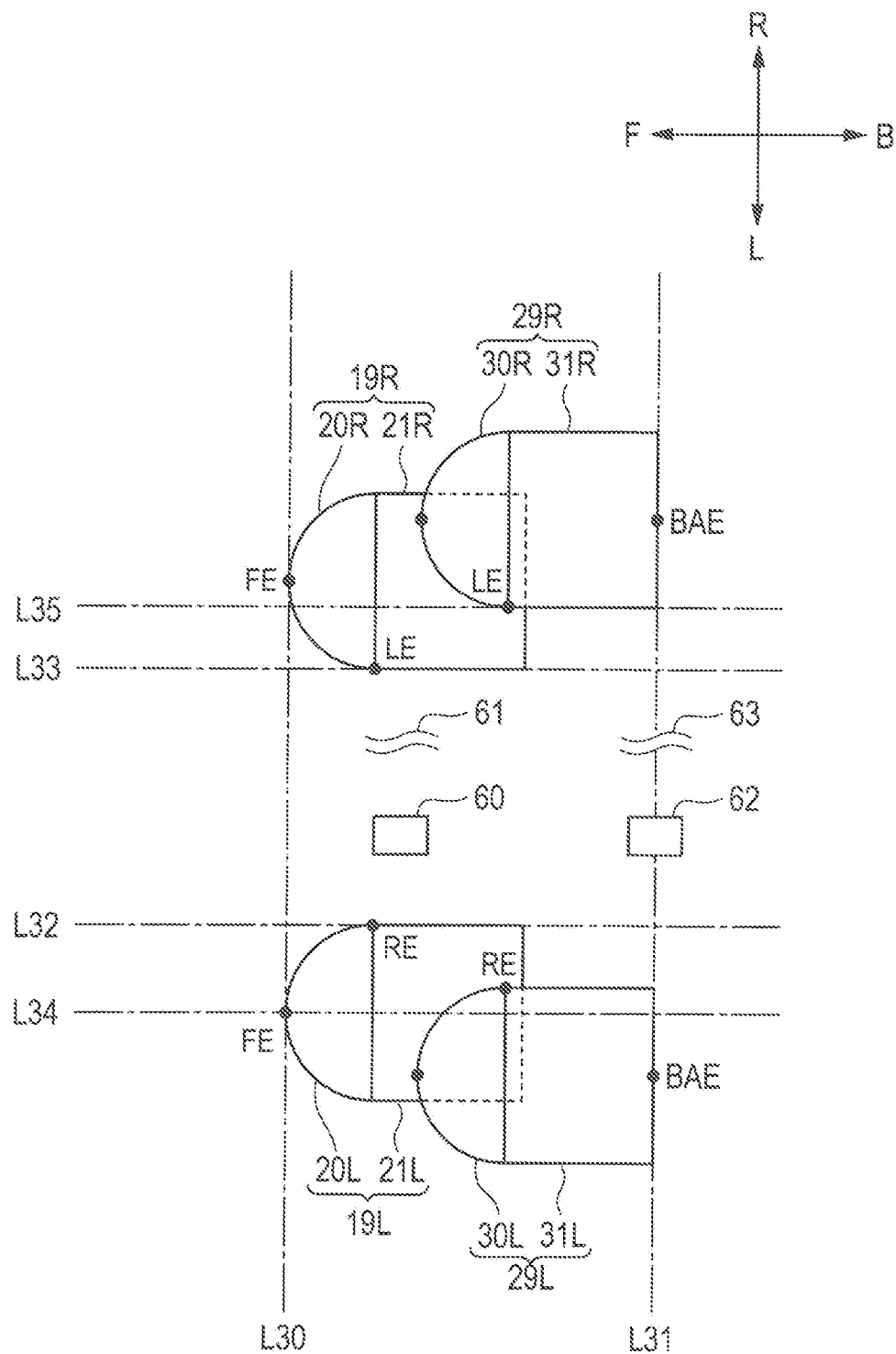
FIG. 19 is a plan view illustrating an arrangement example of the highly-directional light units and an arrangement example of parts when the light group according to Embodiment 1 of the present invention includes four highly-directional light units.

In addition, the above-described space can be used to arrange parts as shown in FIG. 19, for example. As shown in FIG. 19, whole part 60 or part 61 may be disposed or part of part 62 or part 63 may be disposed in the space. Part 60 and part 62 are, for example, electric and/or electronic parts or key cylinders or the like which are different from highly-directional light units. The electric and/or electronic parts different from highly-directional light units may be, for example, one of an engine control unit (ECU), an electronic control unit (ECU), a handlebar unit (hydraulic unit) that includes a motor and controls a liquid pressure of a hydraulic brake, a global positioning system (GPS) unit, an electronic toll collection system (ETC) unit, an ETC antenna, a horn, a laser unit, various electronic substrates and a battery. Part 61 or part 63 may be, for example, one of a throttle wire, a brake wire, a brake hose, a clutch wire and a wire harness.

Figure 20:
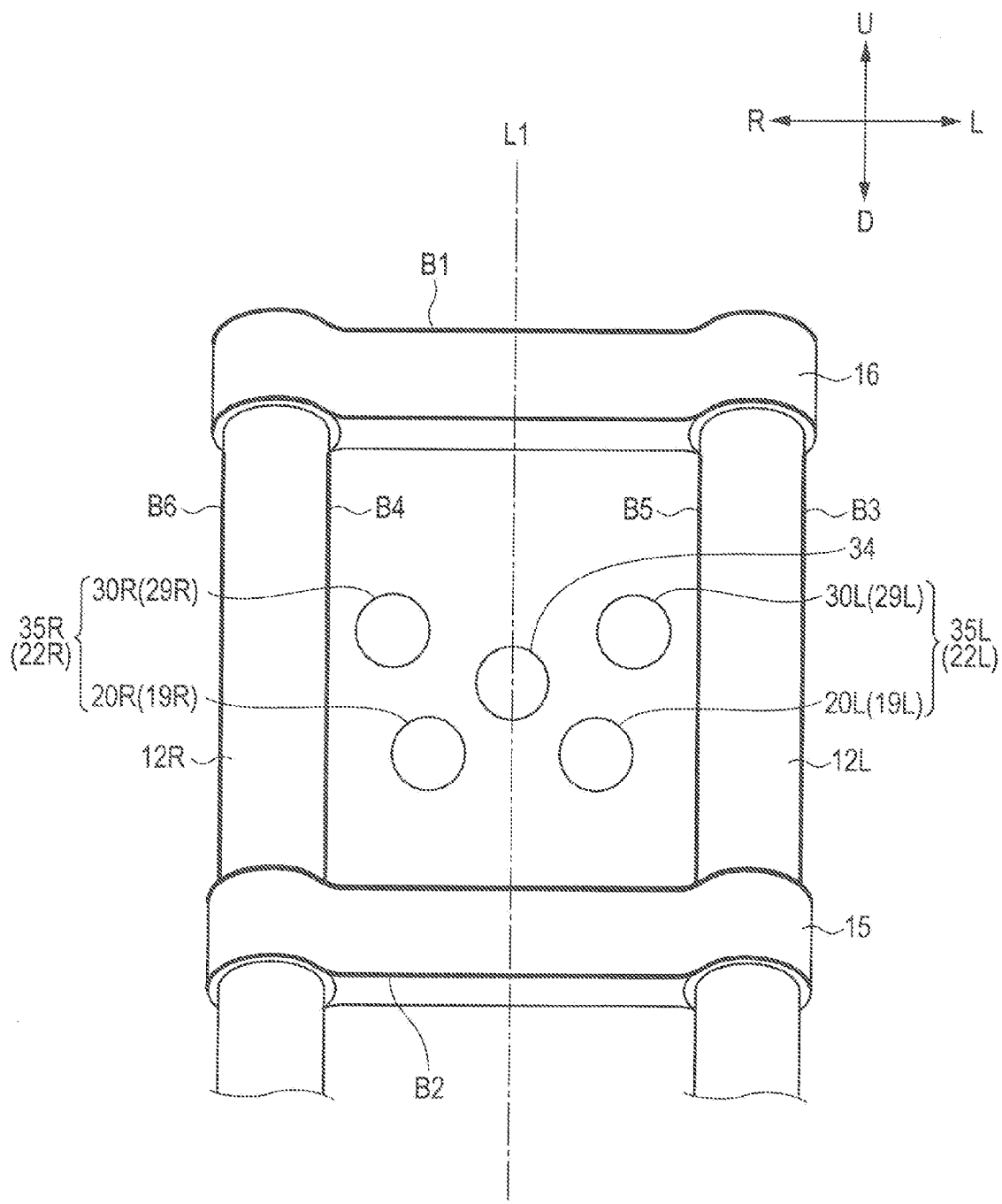
FIG. 20 is a front view illustrating an arrangement example of the highly-directional light units when the light group according to Embodiment 1 of the present invention includes five highly-directional light units.

A highly-directional light unit not included in left light group 22L and right light group 22R (hereinafter referred to as "another highly-directional light units") may be disposed in the above-described space. Arrangement examples of the other highly-directional light units will be described using FIG. 20. FIG. 20 is a front view illustrating an arrangement example of the highly-directional light units in the case where the light group includes five highly-directional light units as viewed from the front of body frame 2 in the front-rear direction.

In the example of FIG. 20, the light group includes left light group 22L including leftward highly-directional light units 19L and 29L, right light group 22R including rightward highly-directional light units 19R and 29R and another highly-directional light unit 34. Highly-directional light unit 34 adopts the same configuration (e.g., see FIG. 5) as those of leftward highly-directional light units 19L and 29L, and rightward highly-directional light units 19R and 29R.

As shown in FIG. 20, highly-directional light unit 34 is disposed so as to overlap center virtual line L1 as viewed from the front of body frame 2 in the front-rear direction.

Thus, it is possible to further provide the other highly-directional light unit which is not included in left light group 22L and right light group 22R using a space between left light group 22L and right light group 22R as viewed from the front of body frame 2 in the front-rear direction.

A light radiating section that is other than the highly-directional light units and that forms light radiated outward, as a beam other than the main beam and dipped beam may also be disposed in the above-described space. Examples of the light radiating section include a daytime running light, a decoration light, and a position light.

At least part of this light radiating section is disposed between virtual line L28 and virtual line L29 as viewed from the front of body frame 2 in the front-rear direction in FIG. 17.

Thus, as viewed from the front of body frame 2, using the space between virtual line L28 and virtual line L29, it is possible to further provide the light radiating section that forms light radiated outward, as a beam other than the main beam and dipped beam.

The range of space in the up-down and left-right directions of body frame 2 as viewed from the front of body frame 2 in the front-rear direction has been described above using FIG. 17 illustrating the configuration when left light group 22L and right light group 22R each include two highly-directional light units. Here, the range of space in the up-down and left-right direction of body frame 2 as viewed from the front of body frame 2 in the front-rear direction in the configuration in which left light group 22L and right light group 22R each include three highly-directional light units (e.g., configuration shown in FIG. 10 which will be described later) will be described using FIG. 21.

Figure 21:
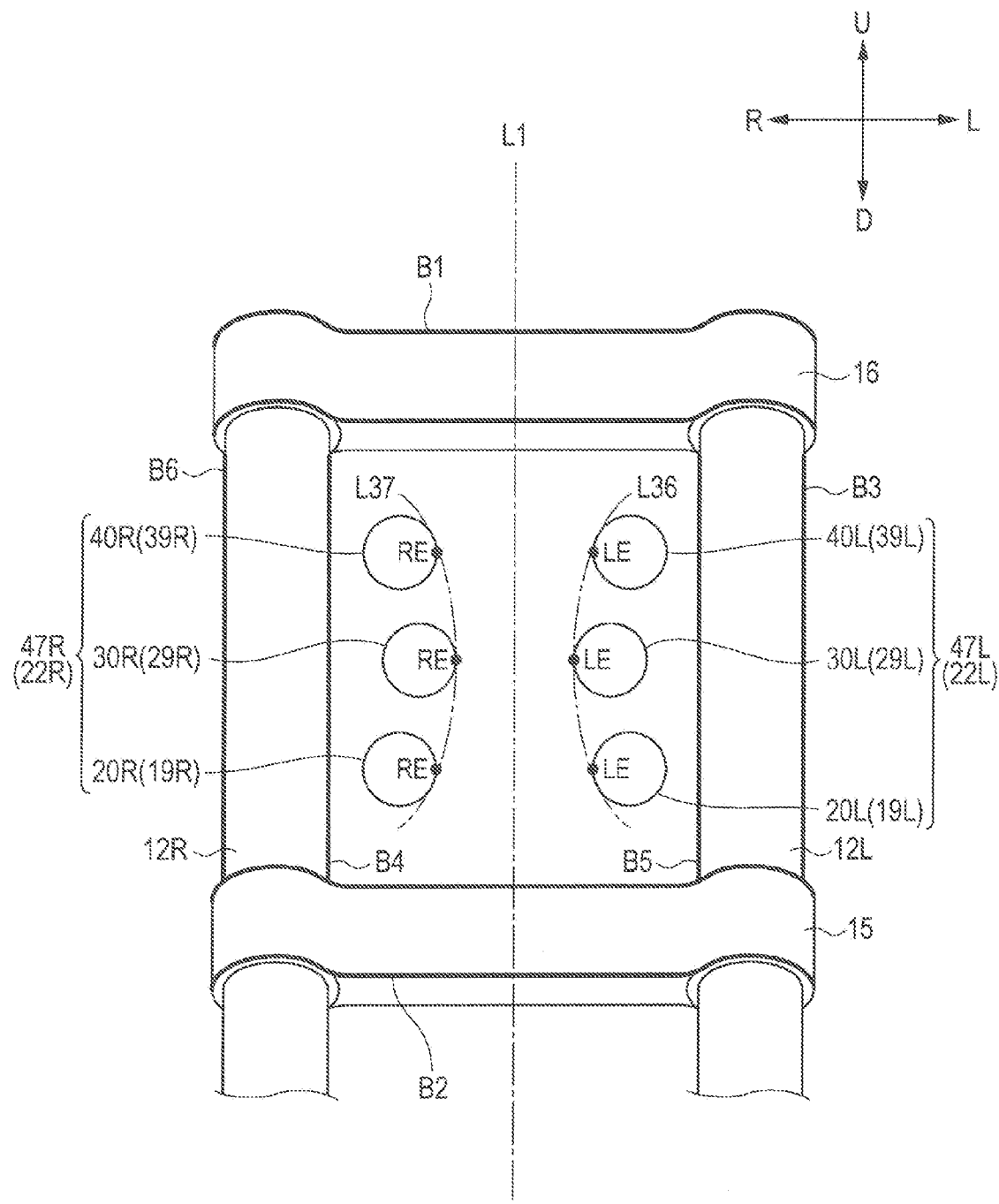
FIG. 21 is a front view illustrating an arrangement example of the highly-directional light units and an example of spatial range when the light group according to Embodiment 1 of the present invention includes six highly-directional light units.

In FIG. 21, virtual line L36 is a line passing through right end RE of optical lens section 40L of leftward highly-directional light unit 39L, right end RE of optical lens section 30L of leftward highly-directional light unit 29L and right end RE of optical lens section 20L of leftward highly-directional light unit 19L. Virtual line L37 is a line passing through left end LE of optical lens section 40R of rightward highly-directional light unit 39R, left end LE of optical lens section 30R of rightward highly-directional light unit 29R and left end LE of optical lens section 20R of rightward highly-directional light unit 19R. Note that virtual line L36 and virtual line L37 are not limited to the shapes shown in FIG. 21.

In FIG. 21, the range of space in the up-down and left-right direction of body frame 2 as viewed from the front of body frame 2 in the front-rear direction is between virtual line L36 and virtual line L37. Note that the range of space in the front-rear direction of body frame 2 as viewed from above in the up-down direction of body frame 2 is between the front end of the highly-directional light unit whose front end is located at the foremost position in the front-rear direction of body frame 2 and the rear end of the highly-directional light unit whose rear end is located at the rearmost position in the front-rear direction of body frame 2 among all highly-directional light units shown in FIG. 21.

The space secured in this way can be used for an arrangement of parts or the like (including other highly-directional light unit and light radiating section) or an air hole as described above.

<Additional Conditions of Highly-Directional Light Units>

Straddled vehicle 1 may be configured to satisfy not only the up-down and left-right arrangement conditions, up-down relation condition 1 and left-right relation condition 1 which are the aforementioned necessary conditions but also at least one of a plurality of additional conditions which will be described later. Hereinafter, various additional conditions will be described.

[Up-Down Relation Condition 2]

Next, up-down relation condition 2 will be described using FIG. 6. Up-down relation condition 2 is a condition showing, when two leftward highly-directional light units neighboring in the up-down direction of body frame 2 of left light group 22L are assumed to be a left light pair, as viewed from the front of body frame 2 in the front-rear direction, what positional relationship in the up-down direction of body frame 2 exists between the optical lens section of the leftward highly-directional light unit located above in the up-down direction of body frame 2 of the left light pair and the optical lens section of the leftward highly-directional light unit located below in the up-down direction of body frame 2 of the left light pair, and when two rightward highly-directional light units neighboring in the up-down direction of body frame 2 of right light group 22R are assumed to be a right light pair, as viewed from the front of body frame 2 in the front-rear direction, what positional relationship in the up-down direction of body frame 2 exists between the optical lens section of the rightward highly-directional light unit located above in the up-down direction of body frame 2 of the right light pair and the optical lens section of the rightward highly-directional light unit located below in the up-down direction of body frame 2 of the right light pair.

In the example of FIG. 6, in left light group 22L, leftward highly-directional light unit 29L and leftward highly-directional light unit 19L neighbor each other in the up-down direction of body frame 2. Leftward highly-directional light unit 29L and leftward highly-directional light unit 19L neighboring each other in the up-down direction of body frame 2 in this way are assumed to be a left light pair. In this case, as viewed from the front of body frame 2 in the front-rear direction, bottom end BE of optical lens section 30L of leftward highly-directional light unit 29L located above in the up-down direction of body frame 2 of the left light pair is located above top end TE of optical lens section 20L of leftward highly-directional light unit 19L located below in the up-down direction of body frame 2 of the left light pair in the up-down direction of body frame 2.

In the example of FIG. 6, in right light group 22R, rightward highly-directional light unit 29R and rightward highly-directional light unit 19R neighbor each other in the up-down direction of body frame 2. Rightward highly-directional light unit 29R and rightward highly-directional light unit 19R neighboring each other in the up-down direction of body frame 2 in this way are assumed to be a right light pair. In this case, as viewed from the front of body frame 2 in the front-rear direction, bottom end BE of optical lens section 30R of rightward highly-directional light unit 29R located above in the up-down direction of body frame 2 of the right light pair is located above top end TE of optical lens section 20R of rightward highly-directional light unit 19R located below in the up-down direction of body frame 2 of the right light pair in the up-down direction of body frame 2.

Under above-described up-down relation condition 2, as viewed from the front of body frame 2 in the front-rear direction, leftward highly-directional light unit 29L and leftward highly-directional light unit 19L of left light group 22L neighboring each other in the up-down direction of body frame 2 are arranged while being spaced apart from each other in the up-down direction of body frame 2. Under above-described up-down relation condition 2, as viewed from the front of body frame 2 in the front-rear direction, rightward highly-directional light unit 29R and rightward highly-directional light unit 19R of right light group 22R neighboring each other in the up-down direction of body frame 2 are arranged while being spaced apart from each other in the up-down direction of body frame 2.

Next, up-down relation condition 2 will be described using FIG. 7. In the aforementioned example of FIG. 6, one left light pair and one right light pair exist whereas two left light pairs and two right light pairs exist in the example of FIG. 7.

In the example of FIG. 7, leftward highly-directional light unit 29L and leftward highly-directional light unit 19L of left light group 22L neighbor each other in the up-down direction of body frame 2, and leftward highly-directional light unit 39L and leftward highly-directional light unit 29L neighbor each other in the up-down direction of body frame 2. Thus, leftward highly-directional light unit 29L and leftward highly-directional light unit 19L are assumed to be a first left light pair, and leftward highly-directional light unit 39L and leftward highly-directional light unit 29L are assumed to be a second left light pair.

In FIG. 7, as viewed from the front of body frame 2 in the front-rear direction, bottom end BE of optical lens section 30L of leftward highly-directional light unit 29L of the first left light pair located above in the up-down direction of body frame 2 is located above, in the up-down direction of body frame 2, top end TE of optical lens section 20L of leftward highly-directional light unit 19L of the first left light pair located below in the up-down direction of body frame 2.

As viewed from the front of body frame 2 in the front-rear direction, bottom end BE of optical lens section 40L of leftward highly-directional light unit 39L of the second left light pair located above in the up-down direction of body frame 2 is located above, in the up-down direction of body frame 2, top end TE of optical lens section 30L of leftward highly-directional light unit 29L of the second left light pair located below in the up-down direction of body frame 2.

In the example of FIG. 7, rightward highly-directional light unit 29R and rightward highly-directional light unit 19R of right light group 22R neighbor each other in the up-down direction of body frame 2, and rightward highly-directional light unit 39R and rightward highly-directional light unit 29R neighbor each other in the up-down direction of body frame 2. Thus, rightward highly-directional light unit 29R and rightward highly-directional light unit 19R are assumed to be a first right light pair, and rightward highly-directional light unit 39R and rightward highly-directional light unit 29R are assumed to be a second right light pair.

In FIG. 7, as viewed from the front of body frame 2 in the front-rear direction, bottom end BE of optical lens section 30R of rightward highly-directional light unit 29R of the first right light pair located above in the up-down direction of body frame 2 is located above, in the up-down direction of body frame 2, top end TE of optical lens section 20R of rightward highly-directional light unit 19R of the first right light pair located below in the up-down direction of body frame 2.

As viewed from the front of body frame 2 in the front-rear direction, bottom end BE of optical lens section 40R of rightward highly-directional light unit 39R of the second right light pair located above in the up-down direction of body frame 2 is located above, in the up-down direction of body frame 2, top end TE of optical lens section 30R of rightward highly-directional light unit 29R of the second right light pair located below in the up-down direction of body frame 2.

Under above-described up-down relation condition 2, as viewed from the front of body frame 2 in the front-rear direction, leftward highly-directional light unit 29L and leftward highly-directional light unit 19L of left light group 22L neighboring each other in the up-down direction of body frame 2 are arranged, spaced apart from each other in the up-down direction of body frame 2. As viewed from the front of body frame 2 in the front-rear direction, leftward highly-directional light unit 39L and leftward highly-directional light unit 29L of left light group 22L neighboring each other in the up-down direction of body frame 2 are arranged while being spaced apart from each other in the up-down direction of body frame 2.

Under above-described up-down relation condition 2, as viewed from the front of body frame 2 in the front-rear direction, rightward highly-directional light unit 29R and rightward highly-directional light unit 19R of right light group 22R neighboring each other in the up-down direction of body frame 2 are arranged while being spaced apart from each other in the up-down direction of body frame 2. As viewed from the front of body frame 2 in the front-rear direction, rightward highly-directional light unit 39R and rightward highly-directional light unit 29R of right light group 22R neighboring each other in the up-down direction of body frame 2 are arranged while being spaced apart from each other in the up-down direction of body frame 2.

[Up-Down Relation Condition 3]

Next, up-down relation condition 3 will be described using FIG. 6. Up-down relation condition 3 is a condition showing, as viewed from the front of body frame 2 in the front-rear direction, what positional relationship in the left-right direction of body frame 2 exists between the optical lens section of the leftward highly-directional light unit of the left light pair located above in the up-down direction of body frame 2 and the optical lens section of the leftward highly-directional light unit of the left light pair located below in the up-down direction of body frame 2, and as viewed from the front of body frame 2 in the front-rear direction, what positional relationship in the left-right direction of body frame 2 exists between the optical lens section of the rightward highly-directional light unit of the right light pair located above in the up-down direction of body frame 2 and the optical lens section of the rightward highly-directional light unit of the right light pair located below in the up-down direction of body frame 2.

In the example of FIG. 6, leftward highly-directional light unit 29L and leftward highly-directional light unit 19L of left light group 22L neighbor each other in the up-down direction of body frame 2. Leftward highly-directional light unit 29L and leftward highly-directional light unit 19L neighboring each other in the up-down direction of body frame 2 in this way are assumed to be a left light pair. In this case, as viewed from the front of body frame 2 in the front-rear direction, at least part (e.g., right end RE) of optical lens section 30L of leftward highly-directional light unit 29L of the left light pair located above in the up-down direction of body frame 2 is located on the left, in the left-right direction of body frame 2, of right end RE of optical lens section 20L of leftward highly-directional light unit 19L of the left light pair located below in the up-down direction of body frame 2 and located on the right, in the left-right direction of body frame 2, of left end LE of optical lens section 20L.

In the example of FIG. 6, rightward highly-directional light unit 29R and rightward highly-directional light unit 19R of right light group 22R neighbor each other in the up-down direction of body frame 2. Rightward highly-directional light unit 29R and rightward highly-directional light unit 19R neighboring each other in the up-down direction of body frame 2 in this way are assumed to be a right light pair. In this case, as viewed from the front of body frame 2 in the front-rear direction, at least part (e.g., left end LE) of optical lens section 30R of rightward highly-directional light unit 29R of the right light pair located above in the up-down direction of body frame 2 is located on the left, in the left-right direction of body frame 2, of right end RE of optical lens section 20R of rightward highly-directional light unit 19R of the right light pair located below in the up-down direction of body frame 2 and located on the right, in the left-right direction of body frame 2, of left end LE of optical lens section 20R.

Under above-described up-down relation condition 3, as viewed from the front of body frame 2 in the front-rear direction, leftward highly-directional light unit 29L and leftward highly-directional light unit 19L of left light group 22L neighboring each other in the up-down direction of body frame 2 are not arranged while being spaced apart from each other in the left-right direction of body frame 2. Under above-described up-down relation condition 3, as viewed from the front of body frame 2 in the front-rear direction, rightward highly-directional light unit 29R and rightward highly-directional light unit 19R of right light group 22R neighboring each other in the up-down direction of body frame 2 are not arranged while being spaced apart from each other in the left-right direction of body frame 2.

Next, up-down relation condition 3 will be described using FIG. 7. While one left light pair and one right light pair exist in the aforementioned example of FIG. 6, two left light pairs and two right light pairs exist in the example of FIG. 7.

In the example of FIG. 7, leftward highly-directional light unit 29L and leftward highly-directional light unit 19L of left light group 22L neighbor each other in the up-down direction of body frame 2, and leftward highly-directional light unit 39L and leftward highly-directional light unit 29L neighbor each other in the up-down direction of body frame 2. Leftward highly-directional light unit 29L and leftward highly-directional light unit 19L are assumed to be a first left light pair, and leftward highly-directional light unit 39L and leftward highly-directional light unit 29L are assumed to be a second left light pair.

In FIG. 7, as viewed from the front of body frame 2 in the front-rear direction, at least part (e.g., right end RE) of optical lens section 30L of leftward highly-directional light unit 29L of the first left light pair located above in the up-down direction of body frame 2 is located on the left, in the left-right direction of body frame 2, of right end RE of optical lens section 20L of leftward highly-directional light unit 19L of the first left light pair located below in the up-down direction of body frame 2 and located on the right, in the left-right direction of body frame 2, of left end LE of optical lens section 20L.

As viewed from the front of body frame 2 in the front-rear direction, at least part (e.g., right end RE) of optical lens section 40L of leftward highly-directional light unit 39L of the second left light pair located above in the up-down direction of body frame 2 is located on the left, in the left-right direction of body frame 2, of right end RE of optical lens section 30L of leftward highly-directional light unit 29L of the second left light pair located below in the up-down direction of body frame 2 and located on the right, in the left-right direction of body frame 2, of left end LE of optical lens section 30L.

In the example of FIG. 7, rightward highly-directional light unit 29R and rightward highly-directional light unit 19R of right light group 22R neighbor each other in the up-down direction of body frame 2, and rightward highly-directional light unit 39R and rightward highly-directional light unit 29R neighbor each other in the up-down direction of body frame 2. Therefore, rightward highly-directional light unit 29R and rightward highly-directional light unit 19R are assumed to be a first right light pair, and rightward highly-directional light unit 39R and rightward highly-directional light unit 29R are assumed to be a second right light pair.

In FIG. 7, as viewed from the front of body frame 2 in the front-rear direction, at least part (e.g., left end LE) of optical lens section 30R of rightward highly-directional light unit 29R of the first right light pair located above in the up-down direction of body frame 2 is located on the left, in the left-right direction of body frame 2, of right end RE of optical lens section 20R of rightward highly-directional light unit 19R of the first right light pair located below in the up-down direction of body frame 2 and located on the right, in the left-right direction of body frame 2, of left end LE of optical lens section 20R.

As viewed from the front of body frame 2 in the front-rear direction, at least part (e.g., left end LE) of optical lens section 40R of rightward highly-directional light unit 39R of the second right light pair located above in the up-down direction of body frame 2 is located on the left, in the left-right direction of body frame 2, of right end RE of optical lens section 30R of rightward highly-directional light unit 29R of the second right light pair located below in the up-down direction of body frame 2 and located on the right, in the left-right direction of body frame 2, of left end LE of optical lens section 30R.

Under above-described up-down relation condition 3, as viewed from the front of body frame 2 in the front-rear direction, leftward highly-directional light unit 29L and leftward highly-directional light unit 19L of left light group 22L neighboring in the up-down direction of body frame 2 are not arranged while being spaced apart from each other in the left-right direction of body frame 2. As viewed from the front of body frame 2 in the front-rear direction, leftward highly-directional light unit 39L and leftward highly-directional light unit 29L of left light group 22L neighboring each other in the up-down direction of body frame 2 are not arranged while being spaced apart from each other in the left-right direction of body frame 2.

Under above-described up-down relation condition 3, as viewed from the front of body frame 2 in the front-rear direction, rightward highly-directional light unit 29R and rightward highly-directional light unit 19R of right light group 22R neighboring each other in the up-down direction of body frame 2 are not arranged while being spaced apart from each other in the left-right direction of body frame 2. As viewed from the front of body frame 2 in the front-rear direction, rightward highly-directional light unit 39R and rightward highly-directional light unit 29R of right light group 22R neighboring each other in the up-down direction of body frame 2 are not arranged while being spaced apart from each other in the left-right direction of body frame 2.

[Up-Down Relation Condition 4]

Next, up-down relation condition 4 will be described using FIG. 9. Up-down relation condition 4 is, as viewed from the front of body frame 2 in the front-rear direction, a condition showing how long is the length in the up-down direction of body frame 2 between the leftward highly-directional light unit of left light group 22L located at the rightmost position in the left-right direction of body frame 2 and the leftward highly-directional light unit neighboring the leftward highly-directional light unit in the up-direction or down-direction of body frame 2 and the length in the up-down direction of body frame 2, as viewed from the front of body frame 2 in the front-rear direction, between the rightward highly-directional light unit of right light group 22R located at the leftmost position in the left-right direction of body frame 2 and the rightward highly-directional light unit neighboring the rightward highly-directional light unit in the up-direction or down-direction of body frame 2, compared to, as viewed from the front of body frame 2 in the front-rear direction, the length in the left-right direction of body frame 2 between the leftward highly-directional light unit of left light group 22L located at the rightmost position in the left-right direction of body frame 2 and the rightward highly-directional light unit of right light group 22R located at the leftmost position in the left-right direction of body frame 2.

Figure 9:
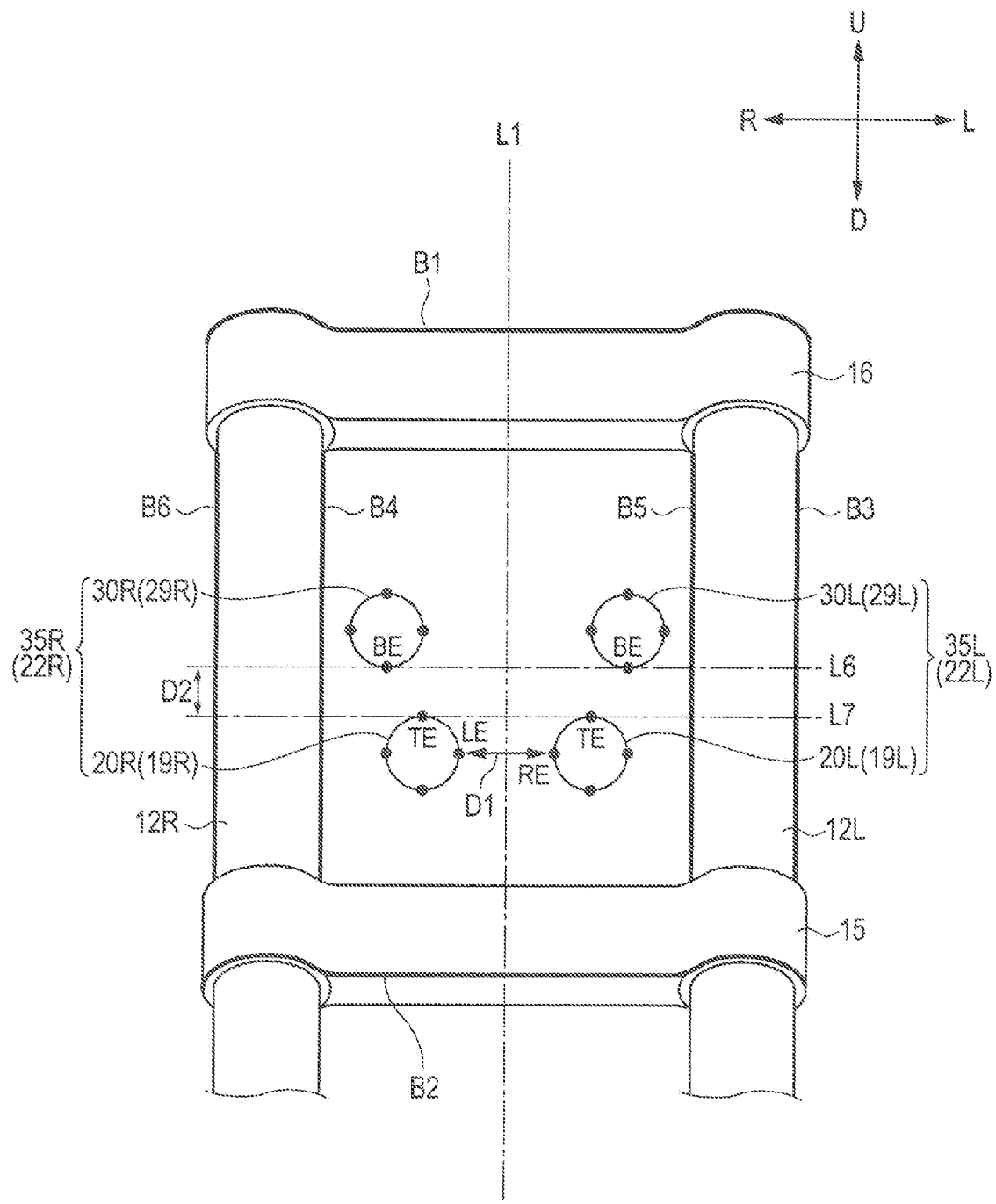
FIG. 9 is a front view illustrating an arrangement example of the highly-directional light units when the light group according to Embodiment 1 of the present invention includes four highly-directional light units.

FIG. 9 is front view illustrating an arrangement example of the highly-directional light units in the case where the light group includes four highly-directional light units as viewed from the front of body frame 2 in the front-rear direction.

The definitions of virtual lines L6 and L7 shown in FIG. 9 are as follows. Virtual line L6 is a line passing through bottom end BE of optical lens section 30L of leftward highly-directional light unit 29L and bottom end BE of optical lens section 30R of rightward highly-directional light unit 29R. Virtual line L7 is a line passing through top end TE of optical lens section 20L of leftward highly-directional light unit 19L and top end TE of optical lens section 20R of rightward highly-directional light unit 19R.

The definition of length D2 shown in FIG. 9 is as follows. Length D2 is a length between virtual line L6 and virtual line L7. In other words, length D2 is a length in the up-down direction of body frame 2 between bottom end BE of optical lens section 30L of leftward highly-directional light unit 29L and top end TE of optical lens section 20L of leftward highly-directional light unit 19L, and is a length in the up-down direction of body frame 2 between bottom end BE of optical lens section 30R of rightward highly-directional light unit 29R and top end TE of optical lens section 20R of rightward highly-directional light unit 19R.

In the example of FIG. 9, as viewed from the front of body frame 2 in the front-rear direction, leftward highly-directional light unit 19L of left light group 22L is located rightmost in the left-right direction of body frame 2 and rightward highly-directional light unit 19R of right light group 22R is located leftmost in the left-right direction of body frame 2. Leftward highly-directional light unit 19L neighbors leftward highly-directional light unit 29L in the up-direction of the up-down direction of body frame 2. Rightward highly-directional light unit 19R neighbors rightward highly-directional light unit 29R in the up-direction of the up-down direction of body frame 2.

In FIG. 9, length D1 is greater than length D2. In other words, the length in the left-right direction of body frame 2 between right end RE of optical lens section 20L of leftward highly-directional light unit 19L and left end LE of optical lens section 20R of rightward highly-directional light unit 19R is greater than the length in the up-down direction of body frame 2 between bottom end BE of optical lens section 30L of leftward highly-directional light unit 29L and top end TE of optical lens section 20L of leftward highly-directional light unit 19L. The length in the left-right direction of body frame 2 between right end RE of optical lens section 20L of leftward highly-directional light unit 19L and left end LE of optical lens section 20R of rightward highly-directional light unit 19R is greater than the length in the up-down direction of body frame 2 between bottom end BE of optical lens section 30R of rightward highly-directional light unit 29R and top end TE of optical lens section 20R of rightward highly-directional light unit 19R.

Under above-described up-down relation condition 4, as viewed from the front of body frame 2 in the front-rear direction, leftward highly-directional light unit 19L of left light group 22L located at the rightmost position in the left-right direction of body frame 2 and leftward highly-directional light unit 29L neighboring leftward highly-directional light unit 19L in the up-direction of the up-down direction of body frame 2 are not arranged while being spaced apart from each other by a length greater than length D1 in the up-down direction of body frame 2. As viewed from the front of body frame 2 in the front-rear direction, rightward highly-directional light unit 19R of right light group 22R located leftmost in the left-right direction of body frame 2 and rightward highly-directional light unit 29R neighboring rightward highly-directional light unit 19R in the up-direction of the up-down direction of body frame 2 are not arranged while being spaced apart from each other by a length greater than length D1 in the up-down direction of body frame 2. Thus, it is possible to limit an increase in the size of straddled vehicle 1 in the up-down direction of body frame 2.

Figure 10:
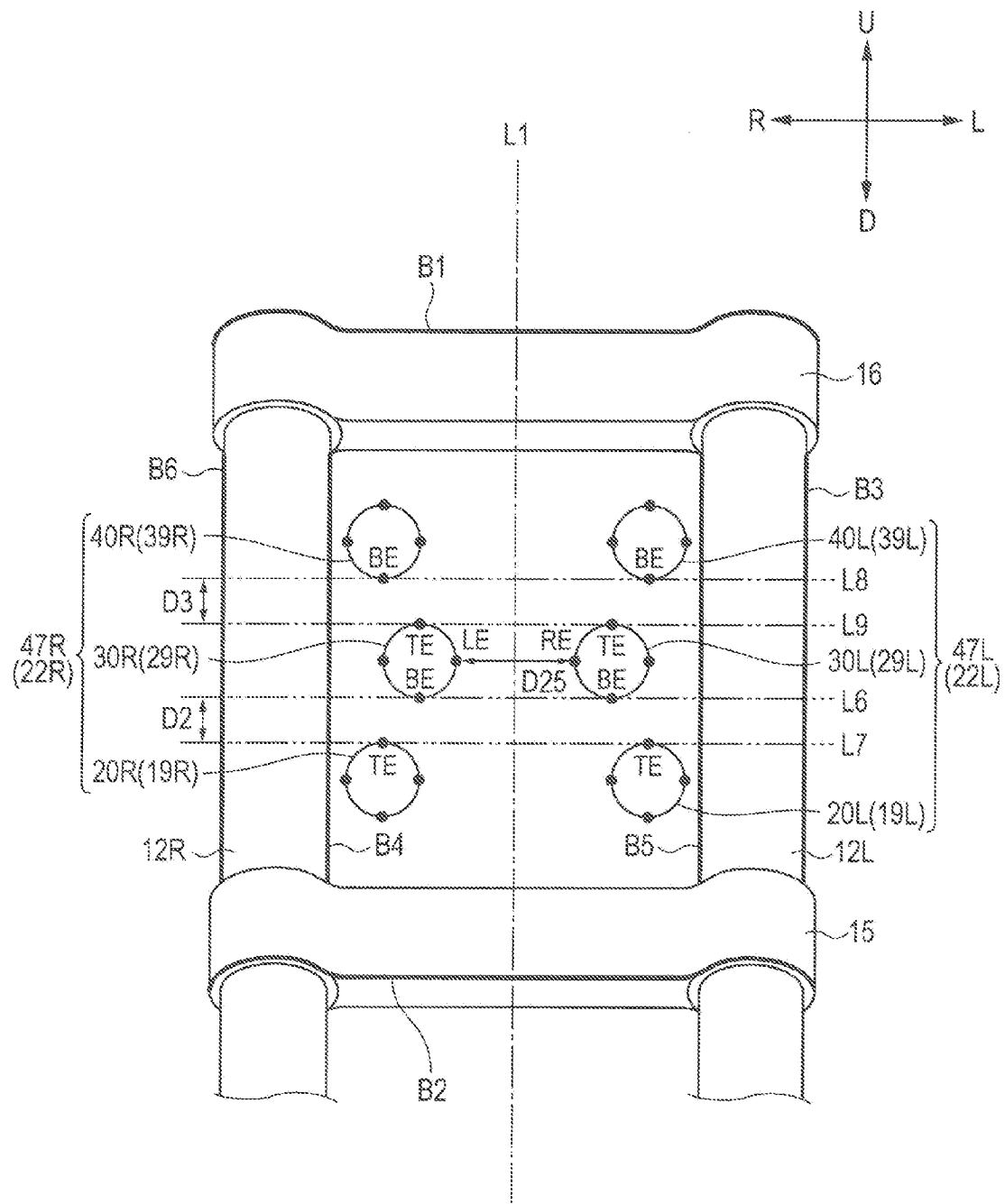
FIG. 10 is a front view illustrating an arrangement example of the highly-directional light units when the light group according to Embodiment 1 of the present invention includes six highly-directional light units.

Next, up-down relation condition 4 will be described using FIG. 10. FIG. 10 is a front view illustrating an arrangement example of the highly-directional light units in the case where the light group includes six highly-directional light units as viewed from the front of body frame 2 in the front-rear direction.

The definitions of virtual lines L8 and L9 shown in FIG. 10 are as follows. Virtual line L8 is a line passing through bottom end BE of optical lens section 40L of leftward highly-directional light unit 39L and bottom end BE of optical lens section 40R of rightward highly-directional light unit 39R. Virtual line L9 is a line passing through top end TE of optical lens section 30L of leftward highly-directional light unit 29L and top end TE of optical lens section 30R of rightward highly-directional light unit 29R.

The definitions of lengths D3 and D25 shown in FIG. 10 are as follows. Length D3 is a length between virtual line L8 and virtual line L9. In other words, length D3 is a length between bottom end BE of optical lens section 40L of leftward highly-directional light unit 39L and top end TE of optical lens section 30L of leftward highly-directional light unit 29L in the up-down direction of body frame 2, and a length between bottom end BE of optical lens section 40R of rightward highly-directional light unit 39R and top end TE of optical lens section 30R of rightward highly-directional light unit 29R in the up-down direction of body frame 2. Length D25 is a length between right end RE of optical lens section 30L of leftward highly-directional light unit 29L and left end LE of optical lens section 30R of rightward highly-directional light unit 29R in the left-right direction of body frame 2. In other words, length D25 is a length between right end RE of left optical lens body 47L and left end LE of right optical lens body 47R in the left-right direction of body frame 2.

In the example of FIG. 10, as viewed from the front of body frame 2 in the front-rear direction, leftward highly-directional light unit 29L of left light group 22L is located at the rightmost position in the left-right direction of body frame 2 and rightward highly-directional light unit 29R of right light group 22R is located at the leftmost position in the left-right direction of body frame 2. Leftward highly-directional light unit 29L neighbors leftward highly-directional light unit 39L in the up-direction of the up-down direction of body frame 2 and neighbors leftward highly-directional light unit 19L in the down-direction of the up-down direction of body frame 2. Rightward highly-directional light unit 29R neighbors rightward highly-directional light unit 39R in the up-direction of the up-down direction of body frame 2 and neighbors rightward highly-directional light unit 19R in the down-direction of the up-down direction of body frame 2.

In FIG. 10, left optical lens body 47L is made up of optical lens section 20L of leftward highly-directional light unit 19L, optical lens section 30L of leftward highly-directional light unit 29L, and optical lens section 40L of leftward highly-directional light unit 39L. The top end of left optical lens body 47L is top end TE of optical lens section 40L located at the uppermost position in the up-down direction of body frame 2. The bottom end of left optical lens body 47L is bottom end BE of optical lens section 20L located at the lowermost position in the up-down direction of body frame 2. The left end of left optical lens body 47L is left end LE of either optical lens section 20L or optical lens section 40L located at the leftmost position in the left-right direction of body frame 2. The right end of left optical lens body 47L is right end RE of optical lens section 30L located at the rightmost position in the left-right direction of body frame 2.

In FIG. 10, right optical lens body 47R is made up of optical lens section 20R of rightward highly-directional light unit 19R, optical lens section 30R of rightward highly-directional light unit 29R, and optical lens section 30R of rightward highly-directional light unit 29R. The top end of right optical lens body 47R is top end TE of optical lens section 40R located at the uppermost position in the up-down direction of body frame 2. The bottom end of right optical lens body 47R is bottom end BE of optical lens section 20R located at the lowermost position in the up-down direction of body frame 2. The left end of right optical lens body 47R is left end LE of optical lens section 30R located at the leftmost position in the left-right direction of body frame 2. The right end of right optical lens body 47R is right end RE of either optical lens section 20R or optical lens section 40R located at the rightmost position in the left-right direction of body frame 2.

In FIG. 10, length D25 is greater than length D2. Length D25 is also greater than length D3. In other words, the length between right end RE of optical lens section 30L of leftward highly-directional light unit 29L and left end LE of optical lens section 30R of rightward highly-directional light unit 29R in the left-right direction of body frame 2 is greater than the length between bottom end BE of optical lens section 40L of leftward highly-directional light unit 39L and top end TE of optical lens section 30L of leftward highly-directional light unit 29L in the up-down direction of body frame 2, and is greater than the length between bottom end BE of optical lens section 30L of leftward highly-directional light unit 29L and top end TE of optical lens section 20L of leftward highly-directional light unit 19L in the up-down direction of body frame 2. The length between right end RE of optical lens section 20L of leftward highly-directional light unit 19L and left end LE of optical lens section 20R of rightward highly-directional light unit 19R in the left-right direction of body frame 2 is greater than the length between bottom end BE of optical lens section 40R of rightward highly-directional light unit 39R and top end TE of optical lens section 30R of rightward highly-directional light unit 29R in the up-down direction of body frame 2, and greater than the length between bottom end BE of optical lens section 30R of rightward highly-directional light unit 29R and top end TE of optical lens section 20R of rightward highly-directional light unit 19R in the up-down direction of body frame 2.

Under above-described up-down relation condition 4, as viewed from the front of body frame 2 in the front-rear direction, leftward highly-directional light unit 29L of left light group 22L located at the rightmost position in the left-right direction of body frame 2 and leftward highly-directional light unit 39L neighboring leftward highly-directional light unit 29L in the up-direction of the up-down direction of body frame 2 are not arranged while being spaced apart from each other by a length greater than length D25 in the up-down direction of body frame 2. Under above-described up-down relation condition 4, as viewed from the front of body frame 2 in the front-rear direction, leftward highly-directional light unit 29L of left light group 22L located at the rightmost position in the left-right direction of body frame 2 and leftward highly-directional light unit 19L neighboring leftward highly-directional light unit 29L in the down-direction of the up-down direction of body frame 2 are not arranged while being spaced apart from each other by a length greater than length D25 in the up-down direction of body frame 2.

Under above-described up-down relation condition 4, as viewed from the front of body frame 2 in the front-rear direction, rightward highly-directional light unit 29R of right light group 22R located at the leftmost position in the left-right direction of body frame 2 and rightward highly-directional light unit 39R neighboring rightward highly-directional light unit 29R in the up-direction of the up-down direction of body frame 2 are not arranged while being spaced apart from each other by a length greater than length D25 in the up-down direction of body frame 2. Under above-described up-down relation condition 4, as viewed from the front of body frame 2 in the front-rear direction, rightward highly-directional light unit 29R of right light group 22R located at the leftmost position in the left-right direction of body frame 2 and rightward highly-directional light unit 19R neighboring rightward highly-directional light unit 29R in the down-direction of the up-down direction of body frame 2 are not arranged while being spaced apart from each other by a length greater than length D25 in the up-down direction of body frame 2. Thus, it is possible to limit an increase in the size of straddled vehicle 1 in the up-down direction of body frame 2.

[Front-Rear Relation Condition 1]

Next, front-rear relation condition 1 will be described using FIGS. 12A to 12C. Front-rear relation condition 1 is, as viewed from the front of body frame 2 in the front-rear direction, a condition showing what positional relationship in the front-rear direction of body frame 2 exists between the leftward highly-directional light unit of left light group 22L located at the rightmost position in the left-right direction of body frame 2 and the rightward highly-directional light unit of right light group 22R located at the leftmost position in the left-right direction of body frame 2 as viewed from above in the up-down direction of body frame 2.

Figure 12C:
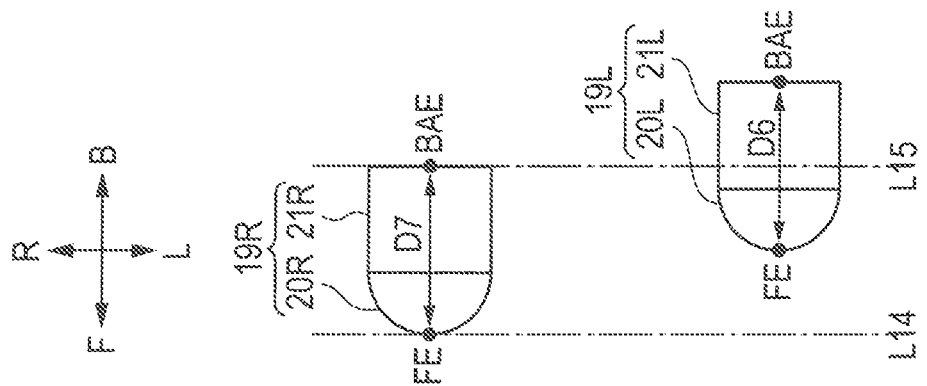
FIGS. 12A to 12C are plan views illustrating arrangement examples of two highly-directional light units according to Embodiment 1 of the present invention.
Figure 12B:
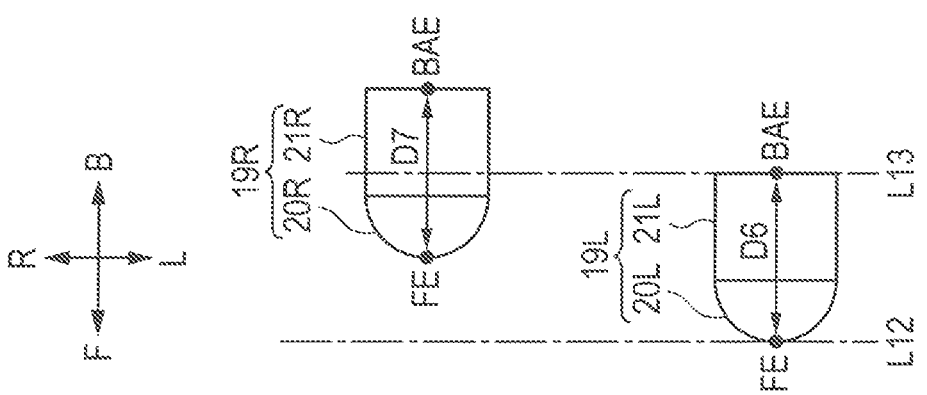
Figure 12A:
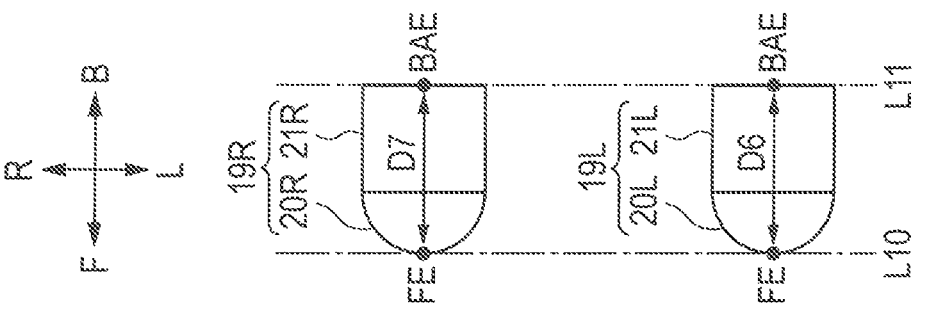

FIG. 12A to FIG. 12C are diagrams illustrating respective arrangement examples of leftward highly-directional light unit 19L and rightward highly-directional light unit 19R in the front-rear direction of body frame 2 as viewed from above in the up-down direction of body frame 2. In FIG. 12A to FIG. 12C, as viewed from the front of body frame 2 in the front-rear direction, leftward highly-directional light unit 19L of left light group 22L is located at the rightmost in the left-right direction of body frame 2 and rightward highly-directional light unit 19R of right light group 22R, as viewed from the front of body frame 2 in the front-rear direction, is located at the leftmost in the left-right direction of body frame 2 (e.g., see FIG. 6). In this case, leftward highly-directional light unit 19L and rightward highly-directional light unit 19R are arranged as shown in one of FIG. 12A to FIG. 12C.

First, FIG. 12A will be described. In FIG. 12A, virtual line L10 is a straight line passing through front end FE of leftward highly-directional light unit 19L and front end FE of rightward highly-directional light unit 19R. In FIG. 12A, virtual line L11 is a straight line passing through rear end BAE of leftward highly-directional light unit 19L and rear end BAE of rightward highly-directional light unit 19R.

In FIG. 12A, length D6 is the length between front end FE and rear end BAE of leftward highly-directional light unit 19L in the front-rear direction of body frame 2. Length D7 is the length between front end FE and rear end BAE of rightward highly-directional light unit 19R in the front-rear direction of body frame 2.

As shown in FIG. 12A, front end FE of leftward highly-directional light unit 19L, front end FE of rightward highly-directional light unit 19R and, rear end BAE of leftward highly-directional light unit 19L and rear end BAE of rightward highly-directional light unit 19R are arranged without any misalignment from each other in the front-rear direction of body frame 2. That is, leftward highly-directional light unit 19L and rightward highly-directional light unit 19R are arranged at the same position in the front-rear direction of body frame 2.

Next, FIG. 12B will be described. In FIG. 12B, virtual line L12 is a straight line passing through front end FE of leftward highly-directional light unit 19L. Virtual line L13 is a straight line passing through rear end BAE of leftward highly-directional light unit 19L.

As shown in FIG. 12B, at least part of rightward highly-directional light unit 19R (e.g., front end FE) is disposed behind front end FE of leftward highly-directional light unit 19L in the front-rear direction of body frame 2 and forward of rear end BAE of leftward highly-directional light unit 19L in the front-rear direction of body frame 2. That is, rightward highly-directional light unit 19R is disposed within a range of misalignment not greater than length D6 in the front-rear direction of body frame 2.

Next, FIG. 12C will be described. In FIG. 12C, virtual line L14 is a straight line passing through front end FE of rightward highly-directional light unit 19R. Virtual line L15 is a straight line passing through rear end BAE of rightward highly-directional light unit 19R.

As shown in FIG. 12C, at least part of leftward highly-directional light unit 19L (e.g., front end FE) is disposed behind front end FE of rightward highly-directional light unit 19R in the front-rear direction of body frame 2 and forward of rear end BAE of rightward highly-directional light unit 19R in the front-rear direction of body frame 2. That is, leftward highly-directional light unit 19L is disposed within a range of misalignment not greater than length D7 in the front-rear direction of body frame 2.

Under above-described front-rear relation condition 1, leftward highly-directional light unit 19L of left light group 22L located at the rightmost position in the left-right direction of body frame 2 and rightward highly-directional light unit 19R of right light group 22R located at the leftmost position in the left-right direction of body frame 2 are not arranged while being spaced apart from each other in the front-rear direction of body frame 2 as viewed from above in the up-down direction of body frame 2.

[Front-Rear Relation Condition 2]

Next, front-rear relation condition 2 will be described using FIGS. 13A to 13C. Front-rear relation condition 2 is a condition showing what positional relationship in the front-rear direction of body frame 2 exists between the leftward highly-directional light unit of left light group 22L located at the rightmost position in the left-right direction of body frame 2 as viewed from the front of body frame 2 in the front-rear direction and the leftward highly-directional light unit neighboring the leftward highly-directional light unit in the up-direction or down-direction of the up-down direction of the body frame to form a left light pair as viewed from above in the up-down direction of body frame 2.

Figure 13C:
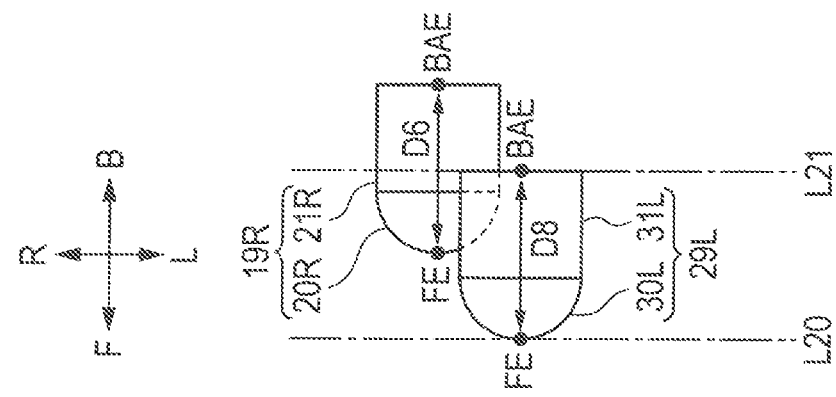
FIGS. 13A to 13C are plan views illustrating arrangement examples of the two highly-directional light units according to Embodiment 1 of the present invention.
Figure 13B:
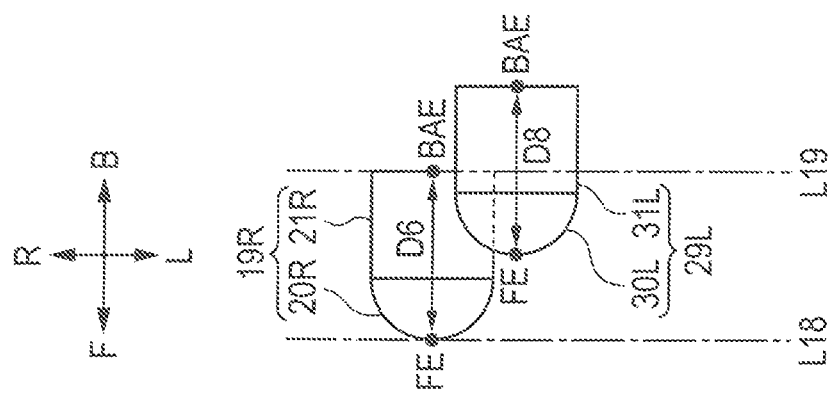
Figure 13A:
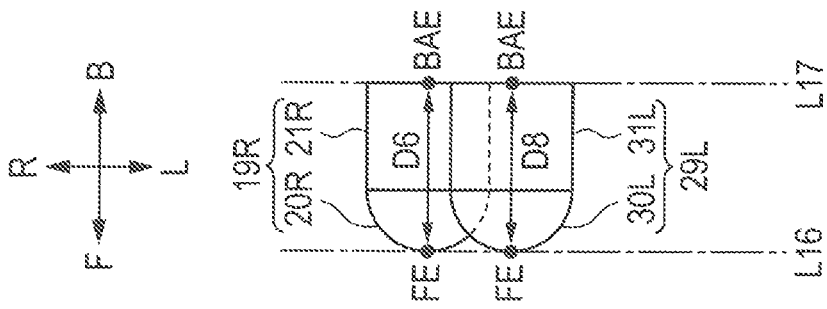

FIG. 13A to FIG. 13C are diagrams illustrating arrangement examples of leftward highly-directional light unit 19L and leftward highly-directional light unit 29L in the front-rear direction of body frame 2 as viewed from above in the up-down direction of body frame 2. In FIG. 13A to FIG. 13C, suppose that leftward highly-directional light unit 19L is located at the rightmost position in the left-right direction of body frame 2 in left light group 22L as viewed from the front of body frame 2 in the front-rear direction (e.g., see FIG. 6). Moreover, in FIG. 13A to FIG. 13C, suppose that leftward highly-directional light unit 29L neighbors leftward highly-directional light unit 19L in the up-direction of the up-down direction of body frame 2 as viewed from the front of body frame 2 in the front-rear direction (e.g., see FIG. 6). Furthermore, in FIG. 13A to FIG. 13C, suppose that leftward highly-directional light unit 19L and leftward highly-directional light unit 29L form a left light pair. In this case, leftward highly-directional light unit 19L and leftward highly-directional light unit 29L are arranged as shown in one of FIG. 13A to FIG. 13C.

First, FIG. 13A will be described. In FIG. 13A, virtual line L16 is a straight line passing through front end FE of leftward highly-directional light unit 19L and front end FE of leftward highly-directional light unit 29L. In FIG. 13A, virtual line L17 is a straight line passing through rear end BAE of leftward highly-directional light unit 19L and rear end BAE of leftward highly-directional light unit 29L.

In FIG. 13A, length D8 is the length between front end FE and rear end BAE of leftward highly-directional light unit 29L in the front-rear direction of body frame 2.

As shown in FIG. 13A, front end FE of leftward highly-directional light unit 19L and front end FE of leftward highly-directional light unit 29L, and rear end BAE of leftward highly-directional light unit 19L and rear end BAE of leftward highly-directional light unit 29L are arranged without any misalignment in the front-rear direction of body frame 2. That is, leftward highly-directional light unit 19L and leftward highly-directional light unit 29L are arranged at the same position in the front-rear direction of body frame 2.

Next, FIG. 13B will be described. In FIG. 13B, virtual line L18 is a straight line passing through front end FE of leftward highly-directional light unit 19L. Virtual line L19 is a straight line passing through rear end BAE of leftward highly-directional light unit 19L.

As shown in FIG. 13B, at least part of leftward highly-directional light unit 29L (e.g., front end FE) is disposed behind front end FE of leftward highly-directional light unit 19L in the front-rear direction of body frame 2 and forward of rear end BAE of leftward highly-directional light unit 19L in the front-rear direction of body frame 2. That is, leftward highly-directional light unit 29L is disposed within a range of misalignment not greater than length D6 in the front-rear direction of body frame 2.

Next, FIG. 13C will be described. In FIG. 13C, virtual line L20 is a straight line passing through front end FE of leftward highly-directional light unit 29L. Virtual line L21 is a straight line passing through rear end BAE of leftward highly-directional light unit 29L.

As shown in FIG. 13C, at least part of leftward highly-directional light unit 19L (e.g., front end FE) is disposed behind front end FE of leftward highly-directional light unit 29L in the front-rear direction of body frame 2 and forward of rear end BAE of leftward highly-directional light unit 29L in the front-rear direction of body frame 2. That is, leftward highly-directional light unit 19L is disposed within a range of misalignment not greater than length D8 in the front-rear direction of body frame 2.

Under above-described front-rear relation condition 2, leftward highly-directional light unit 19L of left light group 22L located at the rightmost position in the left-right direction of body frame 2 and leftward highly-directional light unit 29L neighboring leftward highly-directional light unit 19L in the up-direction of the up-down direction of the body frame to form a left light pair are not arranged while being spaced apart from each other in the front-rear direction of body frame 2 as viewed from above in the up-down direction of body frame 2.

Figure 14C:
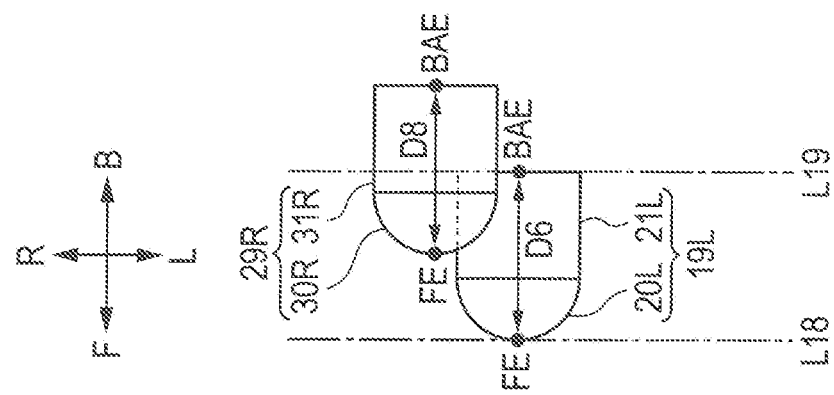
FIGS. 14A to 14C are plan views illustrating arrangement examples of the two highly-directional light units according to Embodiment 1 of the present invention.
Figure 14B:
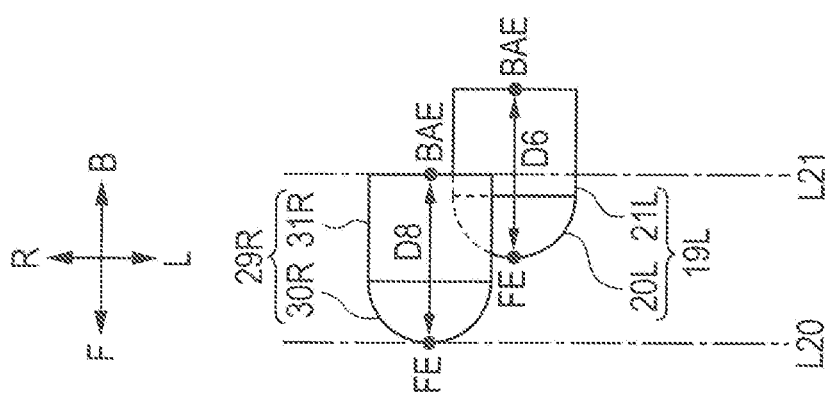
Figure 14A:
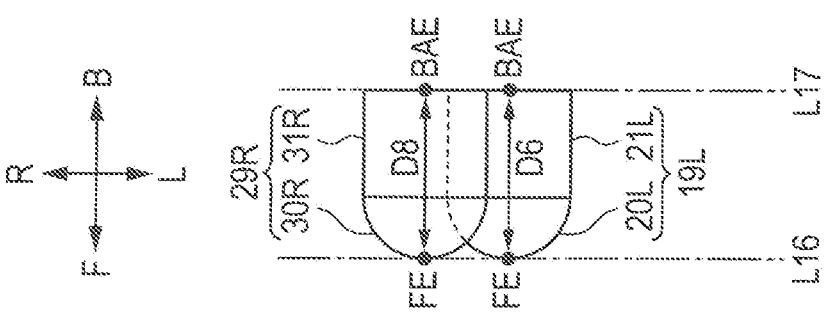

Next, front-rear relation condition 2 will be described using FIGS. 14A to 14C. FIG. 14A to FIG. 14C are diagrams illustrating arrangement examples of leftward highly-directional light unit 19L and leftward highly-directional light unit 29L in the front-rear direction of body frame 2 as viewed from above in the up-down direction of body frame 2.

In FIG. 14A to FIG. 14C, suppose that leftward highly-directional light unit 29L is located at the rightmost position in the left-right direction of body frame 2 in left light group 22L as viewed from the front of body frame 2 in the front-rear direction (e.g., see FIG. 10). In FIG. 14A to FIG. 14C, suppose that leftward highly-directional light unit 19L neighbors leftward highly-directional light unit 29L in the down-direction of the up-down direction of body frame 2 as viewed from the front of body frame 2 in the front-rear direction (e.g., see FIG. 10). In FIG. 14A to FIG. 14C, leftward highly-directional light unit 19L and leftward highly-directional light unit 29L form a left light pair. In this case, leftward highly-directional light unit 19L and leftward highly-directional light unit 29L are arranged as shown in one of FIG. 14A to FIG. 14C.

First, FIG. 14A will be described. As shown in FIG. 14A, front end FE of leftward highly-directional light unit 19L and front end FE of leftward highly-directional light unit 29L, and rear end BAE of leftward highly-directional light unit 19L and rear end BAE of leftward highly-directional light unit 29L are arranged without any misalignment in the front-rear direction of body frame 2. That is, leftward highly-directional light unit 19L and leftward highly-directional light unit 29L are arranged at the same position in the front-rear direction of body frame 2.

Next, FIG. 14B will be described. As shown in FIG. 14B, at least part of leftward highly-directional light unit 19L (e.g., front end FE) is disposed behind front end FE of leftward highly-directional light unit 29L in the front-rear direction of body frame 2 and forward of rear end BAE of leftward highly-directional light unit 29L in the front-rear direction of body frame 2. That is, leftward highly-directional light unit 19L is disposed within a range of misalignment not greater than length D8 in the front-rear direction of body frame 2.

Next, FIG. 14C will be described. As shown in FIG. 14C, at least part of leftward highly-directional light unit 29L (e.g., front end FE) is disposed behind front end FE of leftward highly-directional light unit 19L in the front-rear direction of body frame 2 and forward of rear end BAE of leftward highly-directional light unit 19L in the front-rear direction of body frame 2. That is, leftward highly-directional light unit 29L is disposed within a range of misalignment not greater than length D6 in the front-rear direction of body frame 2.

Under above-described front-rear relation condition 2, leftward highly-directional light unit 29L of left light group 22L located at the rightmost position in the left-right direction of body frame 2 and leftward highly-directional light unit 19L neighboring leftward highly-directional light unit 29L in the down-direction of the up-down direction of the body frame to form a left light pair are not arranged while being spaced apart from each other in the front-rear direction of body frame 2 as viewed from above in the up-down direction of body frame 2.

Note that in FIGS. 13A to 13C and FIGS. 14A to 14C, leftward highly-directional light unit 19L and leftward highly-directional light unit 29L are assumed to be arranged while being spaced apart from each other in the left-right direction of body frame 2 as viewed from above in the up-down direction of body frame 2, but even when leftward highly-directional light unit 19L and leftward highly-directional light unit 29L are arranged at the same position in the left-right direction of body frame 2 as viewed from above in the up-down direction of body frame 2, the arrangement examples of leftward highly-directional light unit 19L and leftward highly-directional light unit 29L in the front-rear direction of body frame 2 described using FIGS. 13A to 13C and FIGS. 14A to 14C can be implemented.

[Front-Rear Relation Condition 3]

Next, front-rear relation condition 3 will be described using FIGS. 15A to 15C. Front-rear relation condition 3 is a condition showing what positional relationship in the front-rear direction of body frame 2 exists between the rightward highly-directional light unit of right light group 22R located at the rightmost position in the left-right direction of body frame 2 as viewed from the front of body frame 2 in the front-rear direction and the rightward highly-directional light unit neighboring the rightward highly-directional light unit in the up-direction or down-direction of the up-down direction of the body frame to form a right light pair as viewed from above in the up-down direction of body frame 2.

Figure 15C:
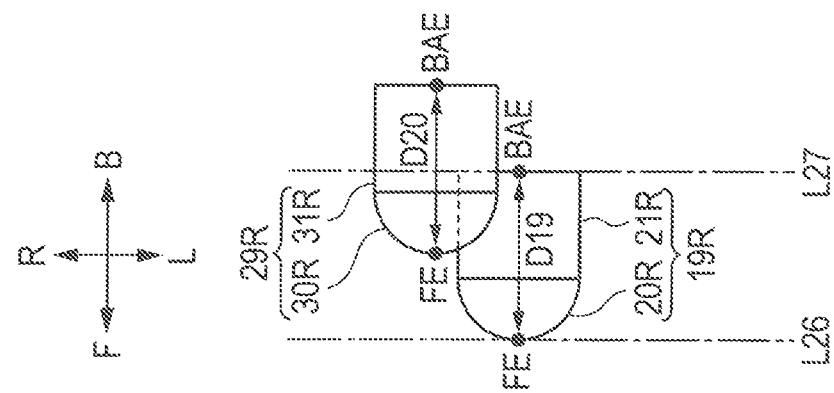
FIGS. 15A to 15C are plan views illustrating arrangement examples of the two highly-directional light units according to Embodiment 1 of the present invention.
Figure 15B:
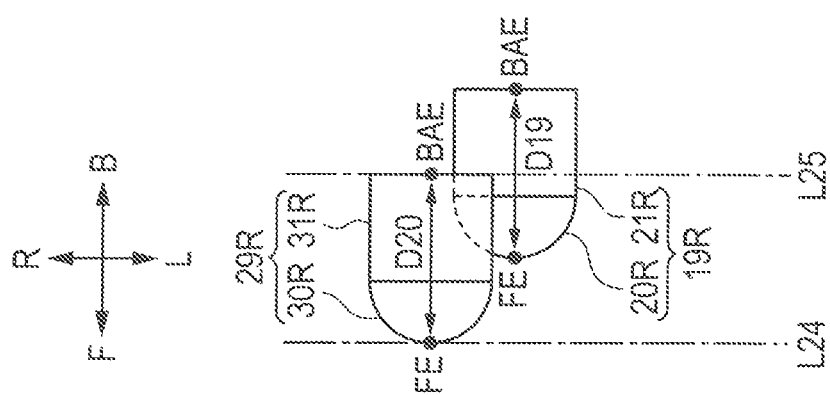
Figure 15A:
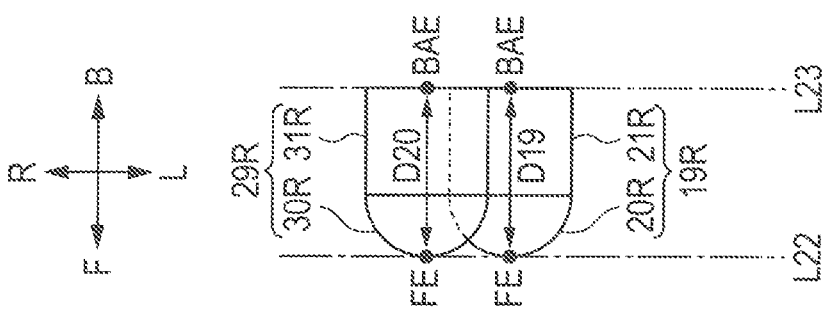

FIGS. 15A to 15C are diagrams illustrating arrangement examples of rightward highly-directional light unit 19R and rightward highly-directional light unit 29R in the front-rear direction of body frame 2 as viewed from above in the up-down direction of body frame 2. In FIGS. 15A to 15C, suppose that rightward highly-directional light unit 19R is located at the leftmost position in the left-right direction of body frame 2 in right light group 22R as viewed from the front of body frame 2 in the front-rear direction (e.g., see FIG. 6). In FIGS. 15A to 15C, as viewed from the front of body frame 2 in the front-rear direction, rightward highly-directional light unit 29R neighbors rightward highly-directional light unit 19R in the up-direction of the up-down direction of body frame 2 (e.g., see FIG. 6). Furthermore, in FIG. 15A to FIG. 15C, suppose that rightward highly-directional light unit 19R and rightward highly-directional light unit 29R form a right light pair. In this case, rightward highly-directional light unit 19R and rightward highly-directional light unit 29R are arranged as shown in one of FIGS. 15A to 15C.

First, FIG. 15A will be described. In FIG. 15A, virtual line L22 is a straight line passing through front end FE of rightward highly-directional light unit 19R and front end FE of rightward highly-directional light unit 29R. In FIG. 15A, virtual line L23 is a straight line passing through rear end BAE of rightward highly-directional light unit 19R and rear end BAE of rightward highly-directional light unit 29R.

In FIG. 15A, length D19 is the length between front end FE and rear end BAE of rightward highly-directional light unit 19R in the front-rear direction of body frame 2. Length D20 is the length between front end FE and rear end BAE of rightward highly-directional light unit 29R in the front-rear direction of body frame 2.

As shown in FIG. 15A, front end FE of rightward highly-directional light unit 19R and front end FE of rightward highly-directional light unit 29R, and rear end BAE of rightward highly-directional light unit 19R and rear end BAE of rightward highly-directional light unit 29R are arranged without any misalignment in the front-rear direction of body frame 2. That is, rightward highly-directional light unit 19R and rightward highly-directional light unit 29R are arranged at the same position in the front-rear direction of body frame 2.

Next, FIG. 15B will be described. In FIG. 15B, virtual line L24 is a straight line passing through front end FE of rightward highly-directional light unit 29R. Virtual line L25 is a straight line passing through rear end BAE of rightward highly-directional light unit 29R.

As shown in FIG. 15B, at least part of rightward highly-directional light unit 19R (e.g., front end FE) is disposed behind front end FE of rightward highly-directional light unit 29R in the front-rear direction of body frame 2 and forward of rear end BAE of rightward highly-directional light unit 29R in the front-rear direction of body frame 2. That is, rightward highly-directional light unit 19R is disposed within a range of misalignment not greater than length D20 in the front-rear direction of body frame 2.

Next, FIG. 15C will be described. In FIG. 15C, virtual line L26 is a straight line passing through front end FE of rightward highly-directional light unit 19R. Virtual line L27 is a straight line passing through rear end BAE of rightward highly-directional light unit 19R.

As shown in FIG. 15C, at least part of rightward highly-directional light unit 29R (e.g., front end FE) is disposed behind front end FE of rightward highly-directional light unit 19R in the front-rear direction of body frame 2 and forward of rear end BAE of rightward highly-directional light unit 19R in the front-rear direction of body frame 2. That is, rightward highly-directional light unit 29R is disposed within a range of misalignment not greater than length D19 in the front-rear direction of body frame 2.

Under above-described front-rear relation condition 3, rightward highly-directional light unit 19R of right light group 22R located at the leftmost position in the left-right direction of body frame 2 and rightward highly-directional light unit 29R neighboring rightward highly-directional light unit 19R in the up-direction of the up-down direction of the body frame to form a right light pair are not disposed while being spaced apart from each other in the front-rear direction of body frame 2 as viewed from above in the up-down direction of body frame 2.

Figure 16C:
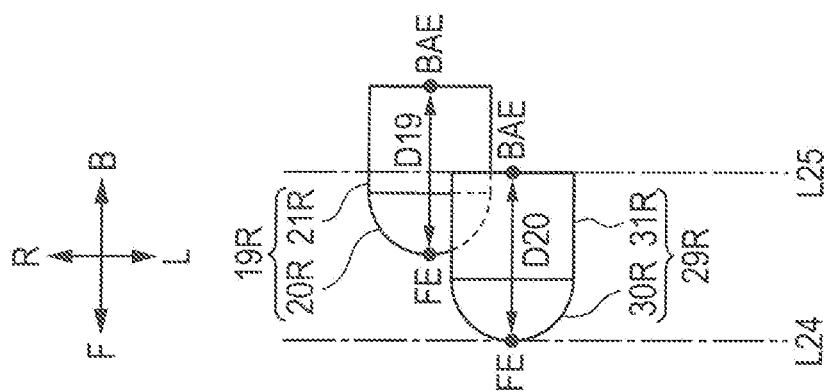
FIGS. 16A to 16C are plan views illustrating arrangement examples of the two highly-directional light units according to Embodiment 1 of the present invention.
Figure 16B:
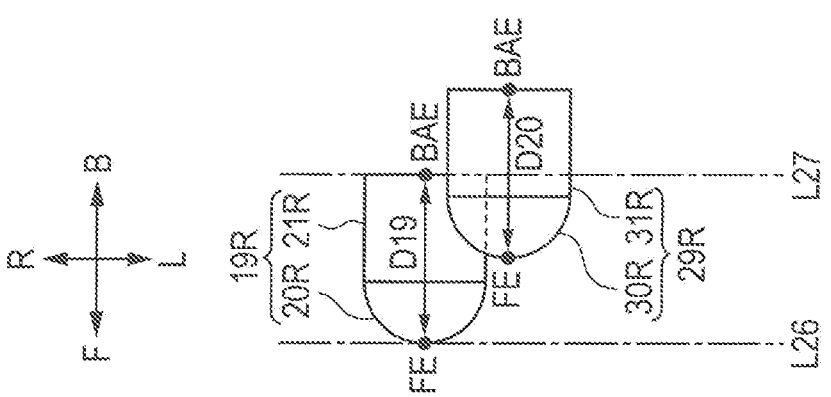
Figure 16A:
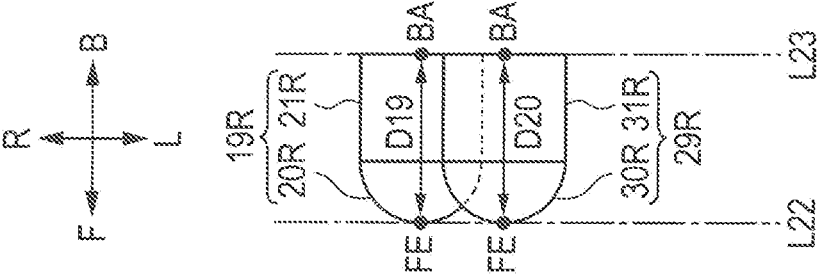

Next, front-rear relation condition 3 will be described using FIGS. 16A to 16C. FIGS. 16A to 16C are diagrams illustrating arrangement examples of rightward highly-directional light unit 19R and rightward highly-directional light unit 29R in the front-rear direction of body frame 2 as viewed from above in the up-down direction of body frame 2.

In FIGS. 16A to 16C, suppose that rightward highly-directional light unit 29R is located at the leftmost position in the left-right direction of body frame 2 in right light group 22R as viewed from the front of body frame 2 in the front-rear direction (e.g., see FIG. 10). In FIGS. 16A to 16C, suppose that rightward highly-directional light unit 19R neighbors rightward highly-directional light unit 29R in the down-direction of the up-down direction of body frame 2 as viewed from the front of body frame 2 in the front-rear direction (e.g., see FIG. 10). In FIGS. 16A to 16C, rightward highly-directional light unit 19R and rightward highly-directional light unit 29R form a right light pair. In this case, rightward highly-directional light unit 19R and rightward highly-directional light unit 29R are arranged as shown in one of FIGS. 16A to 16C.

First, FIG. 16A will be described. As shown in FIG. 16A, front end FE of rightward highly-directional light unit 19R and front end FE of rightward highly-directional light unit 29R, and rear end BAE of rightward highly-directional light unit 19R and rear end BAE of rightward highly-directional light unit 29R are arranged without any misalignment in the front-rear direction of body frame 2. That is, rightward highly-directional light unit 19R and rightward highly-directional light unit 29R are arranged at the same position in the front-rear direction of body frame 2.

Next, FIG. 16B will be described. As shown in FIG. 16B, at least part of rightward highly-directional light unit 29R (e.g., front end FE) is disposed behind front end FE of rightward highly-directional light unit 19R in the front-rear direction of body frame 2 and forward of rear end BAE of rightward highly-directional light unit 19R in the front-rear direction of body frame 2. That is, rightward highly-directional light unit 29R is disposed within a range of misalignment not greater than length D19 in the front-rear direction of body frame 2.

Next, FIG. 16C will be described. As shown in FIG. 16C, at least part of rightward highly-directional light unit 19R (e.g., front end FE) is disposed behind front end FE of rightward highly-directional light unit 29R in the front-rear direction of body frame 2 and forward of rear end BAE of rightward highly-directional light unit 29R in the front-rear direction of body frame 2. That is, rightward highly-directional light unit 19R is disposed within a range of misalignment not greater than length D20 in the front-rear direction of body frame 2.

Under above-described front-rear relation condition 3, rightward highly-directional light unit 29R of right light group 22R located at the leftmost position in the left-right direction of body frame 2 and rightward highly-directional light unit 19R neighboring rightward highly-directional light unit 29R in the down-direction of the up-down direction of the body frame to form a right light pair are not arranged while being spaced apart from each other in the front-rear direction of body frame 2 as viewed from above in the up-down direction of body frame 2.

Note that in FIGS. 15A to 15C and FIGS. 16A to 16C, rightward highly-directional light unit 19R and rightward highly-directional light unit 29R are arranged while being misaligned from each other in the left-right direction of body frame 2 as viewed from above in the up-down direction of body frame 2. However, as viewed from above in the up-down direction of body frame 2, even when rightward highly-directional light unit 19R and rightward highly-directional light unit 29R are arranged at the same position in the left-right direction of body frame 2, it is possible to implement each arrangement example of rightward highly-directional light unit 19R and rightward highly-directional light unit 29R in the front-rear direction of body frame 2 described using FIGS. 15A to 15C and FIGS. 16A to 16C.

[Left-Right Relation Condition 2]

Next, left-right relation condition 2 will be described using FIG. 6 and FIG. 7. Left-right relation condition 2 is a condition showing what positional relationship in the left-right direction of body frame 2 exists between the right end of the optical lens section of the leftward highly-directional light unit located at the rightmost position in the left-right direction of body frame 2 in left light group 22L as viewed from the front of body frame 2 in the front-rear direction and the left end of the optical lens section of the rightward highly-directional light unit located at the leftmost position in the left-right direction of body frame 2 in right light group 22R.

In the example of FIG. 6, the highly-directional light unit located at the rightmost position in leftward highly-directional light units 19L and 29L included in left light group 22L in the left-right direction of body frame 2 as viewed from the front of body frame 2 in the front-rear direction is leftward highly-directional light unit 19L. In the example of FIG. 6, the highly-directional light unit located at the leftmost position in the left-right direction of body frame 2 in rightward highly-directional light units 19R and 29R included in right light group 22R, as viewed from the front of body frame 2 in the front-rear direction is rightward highly-directional light unit 19R. In this case, right end RE of optical lens section 20L of leftward highly-directional light unit 19L is located on the left of left end LE of optical lens section 20R of rightward highly-directional light unit 19R in the left-right direction of body frame 2. In other words, left end LE of optical lens section 20R of rightward highly-directional light unit 19R is located on the right of right end RE of optical lens section 20L of leftward highly-directional light unit 19L in the left-right direction of body frame 2.

In the example of FIG. 7, the highly-directional light unit located at the rightmost position in leftward highly-directional light units 19L, 29L and 39L included in left light group 22L is leftward highly-directional light unit 19L in the left-right direction of body frame 2 as viewed from the front of body frame 2 in the front-rear direction. Furthermore, in the example of FIG. 7, the highly-directional light unit located at the leftmost position in the left-right direction of body frame 2 in rightward highly-directional light units 19R, 29R and 39R included in right light group 22R as viewed from the front of body frame 2 in the front-rear direction is rightward highly-directional light unit 19R. In this case, right end RE of optical lens section 20L of leftward highly-directional light unit 19L is located on the left of left end LE of optical lens section 20R of rightward highly-directional light unit 19R in the left-right direction of body frame 2. In other words, left end LE of optical lens section 20R of rightward highly-directional light unit 19R is located on the right of right end RE of optical lens section 20L of leftward highly-directional light unit 19L in the left-right direction of body frame 2.

Under above-described left-right relation condition 2, as viewed from the front of body frame 2 in the front-rear direction, leftward highly-directional light unit 19L located at the rightmost position in the left-right direction of body frame 2 in left light group 22L and rightward highly-directional light unit 19R located at the leftmost position in the left-right direction of body frame 2 in right light group 22R are arranged while being spaced apart from each other in the left-right direction of body frame 2.

[Left-Right Relation Condition 3]

Next, left-right relation condition 3 will be described using FIGS. 22A to 22E. Left-right relation condition 3 is a condition showing what positional relationship in the up-down direction of body frame 2 exists between the leftward highly-directional light unit located at the uppermost position in left light group 22L as viewed from the front of body frame 2 in the front-rear direction and the rightward highly-directional light unit located at the uppermost position of right light group 22R in the up-down direction of body frame 2, and what positional relationship in the up-down direction of body frame 2 exists between the leftward highly-directional light unit located at the lowermost position in left light group 22L in the up-down direction of body frame 2 and the rightward highly-directional light unit located at the lowermost position in right light group 22R in the up-down direction of body frame 2.

FIG. 22A to FIG. 22E are diagrams illustrating arrangement examples of leftward highly-directional light unit 29L and rightward highly-directional light unit 29R in the up-down direction of body frame 2 as viewed from the front of body frame 2 in the front-rear direction. In FIG. 22A to FIG. 22E, suppose that leftward highly-directional light unit 29L is located at the uppermost position in the up-down direction of body frame 2 in left light group 22L as viewed from the front of body frame 2 in the front-rear direction (e.g., see FIG. 6). In FIG. 22A to FIG. 22E, suppose that rightward highly-directional light unit 29R is located at the uppermost position in the up-down direction of body frame 2 in right light group 22R as viewed from the front of body frame 2 in the front-rear direction, (e.g., see FIG. 6). In this case, leftward highly-directional light unit 29L and rightward highly-directional light unit 29R are arranged as shown in one of FIG. 22A to FIG. 22E.

First, FIG. 22A will be described. In FIG. 22A, virtual line L38 is a line passing through top end TE of optical lens section 30L of leftward highly-directional light unit 29L and top end TE of optical lens section 30R of rightward highly-directional light unit 29R. In FIG. 22A, virtual line L39 is a line passing through bottom end BE of optical lens section 30L of leftward highly-directional light unit 29L and bottom end BE of optical lens section 30R of rightward highly-directional light unit 29R.

In FIG. 22A, length D9 is the length between top end TE and bottom end BE of optical lens section 30L. In other words, length D9 is a maximum lens width of optical lens section 20L in the up-down direction. Length D10 is the length between top end TE and bottom end BE of optical lens section 30R. In other words, length D10 is a maximum lens width of optical lens section 30R in the up-down direction.

As shown in FIG. 22A, top end TE of optical lens section 30L and top end TE of optical lens section 30R, and bottom end BE of optical lens section 30L and bottom end BE of optical lens section 30R are arranged at the same positions in the up-down direction of body frame 2.

Next, FIG. 22B will be described. In FIG. 22B, virtual line L40 is a line passing through top end TE of optical lens section 30L of leftward highly-directional light unit 29L. Virtual line L41 is a line passing through bottom end BE of optical lens section 30L of leftward highly-directional light unit 29L.

As shown in FIG. 22B, at least part of optical lens section 30R (e.g., bottom end BE) is disposed below top end TE of optical lens section 30L in the up-down direction of body frame 2 and disposed above bottom end BE of optical lens section 30L in the up-down direction of body frame 2. That is, optical lens section 30R is disposed within a range of misalignment not greater than length D9 in the up-down direction of body frame 2.

Next, FIG. 22C will be described. As shown in FIG. 22C, at least part of optical lens section 30R (e.g., top end TE) is disposed below top end TE of optical lens section 30L in the up-down direction of body frame 2 and disposed above bottom end BE of optical lens section 30L in the up-down direction of body frame 2. That is, optical lens section 30R is disposed within a range of misalignment not greater than length D9 in the up-down direction of body frame 2.

Next, FIG. 22D will be described. In FIG. 22D, virtual line L42 is a line passing through top end TE of optical lens section 30R of rightward highly-directional light unit 29R. Virtual line L43 is a line passing through bottom end BE of optical lens section 30R of rightward highly-directional light unit 29L.

As shown in FIG. 22D, at least part of optical lens section 30L (e.g., bottom end BE) is disposed below top end TE of optical lens section 30R in the up-down direction of body frame 2 and disposed above bottom end BE of optical lens section 30R in the up-down direction of body frame 2. That is, optical lens section 30L is disposed within a range of misalignment not greater than length D10 in the up-down direction of body frame 2.

Next, FIG. 22E will be described. As shown in FIG. 22E, at least part of optical lens section 30L (e.g., top end TE) is below top end TE of optical lens section 30R in the up-down direction of body frame 2 and is disposed above bottom end BE of optical lens section 30R in the up-down direction of body frame 2. That is, optical lens section 30L is disposed within a range of misalignment not greater than length D10 in the up-down direction of body frame 2.

Under above-described left-right relation condition 3, as viewed from the front of body frame 2 in the front-rear direction, the bottom end of optical lens section 30L of leftward highly-directional light unit 29L located at the uppermost position in left light group 22L in the up-down direction of body frame 2 is never located above, in the up-down direction of body frame 2, the top end of optical lens section 30R of rightward highly-directional light unit 29R located at the uppermost position in right light group 22R in the up-down direction of body frame 2, and as viewed from the front of body frame 2 in the front-rear direction, the top end of optical lens section 30L of leftward highly-directional light unit 29L located at the uppermost position in left light group 22L in the up-down direction of body frame 2 is never located below, in the up-down direction of body frame 2, the bottom end of optical lens section 30R of rightward highly-directional light unit 29R located at the uppermost position in right light group 22R in the up-down direction of body frame 2. For this reason, leftward highly-directional light unit 29L located at the uppermost position in left light group 22L in the up-down direction of body frame 2 and rightward highly-directional light unit 29R located at the uppermost position in right light group 22R in the up-down direction of body frame 2 are arranged in a compact form in the up-down direction of body frame 2.

Under above-described left-right relation condition 3, as viewed from the front of body frame 2 in the front-rear direction, the bottom end of optical lens section 30R of rightward highly-directional light unit 29R located at the uppermost position in right light group 22R in the up-down direction of body frame 2 is never located above, in the up-down direction of body frame 2, the top end of optical lens section 30L of leftward highly-directional light unit 29L located at the uppermost position in left light group 22L in the up-down direction of body frame 2, and as viewed from the front of body frame 2 in the front-rear direction, the top end of optical lens section 30R of rightward highly-directional light unit 29R located at the uppermost position in right light group 22R in the up-down direction of body frame 2 is never located below, in the up-down direction of body frame 2, the bottom end of optical lens section 30L of leftward highly-directional light unit 29L located at the uppermost position in the up-down direction of body frame 2 in left light group 22L. For this reason, leftward highly-directional light unit 29L located at the uppermost position in the up-down direction of body frame 2 in left light group 22L and rightward highly-directional light unit 29R located at the uppermost position in the up-down direction of body frame 2 in right light group 22R are arranged in a compact form in the up-down direction of body frame 2.

Therefore, the size of straddled vehicle 1 does not increase in the up-down direction of body frame 2.

Next, left-right relation condition 3 will be described using FIGS. 23A to 23E. FIGS. 23A to 23E are diagrams illustrating arrangement examples of leftward highly-directional light unit 19L and rightward highly-directional light unit 19R in the up-down direction of body frame 2 as viewed from the front of body frame 2 in the front-rear direction. In FIGS. 23A to 23E, suppose that leftward highly-directional light unit 19L is located at the lowermost position in left light group 22L in the up-down direction of body frame 2 as viewed from the front of body frame 2 in the front-rear direction (e.g., see FIG. 6). In FIG. 23A to FIG. 23E, rightward highly-directional light unit 19R is located at the lowermost position in right light group 22R in the up-down direction of body frame 2 as viewed from the front of body frame 2 in the front-rear direction (e.g., see FIG. 6). In this case, leftward highly-directional light unit 19L and rightward highly-directional light unit 19R are arranged as shown in one of FIGS. 23A to 23E.

First, FIG. 23A will be described. In FIG. 23A, virtual line L44 is a line passing through top end TE of optical lens section 20L of leftward highly-directional light unit 19L and top end TE of optical lens section 20R of rightward highly-directional light unit 19R. In FIG. 23A, virtual line L45 is a line passing through bottom end BE of optical lens section 20L of leftward highly-directional light unit 19L and bottom end BE of optical lens section 20R of rightward highly-directional light unit 19R.

In FIG. 23A, length D17 is the length between top end TE and bottom end BE of optical lens section 20L. In other words, length D17 is a maximum lens width of optical lens section 20L in the up-down direction. Length D18 is the length between top end TE and bottom end BE of optical lens section 20R. In other words, length D18 is a maximum lens width of optical lens section 20R in the up-down direction.

As shown in FIG. 23A, top end TE of optical lens section 20L and top end TE of optical lens section 20R, and bottom end BE of optical lens section 20L and bottom end BE of optical lens section 20R are arranged at the same positions in the up-down direction of body frame 2.

Next, FIG. 23B will be described. In FIG. 23B, virtual line L46 is a line passing through top end TE of optical lens section 20L of leftward highly-directional light unit 19L. Virtual line L47 is a line passing through bottom end BE of optical lens section 20L of leftward highly-directional light unit 19L.

As shown in FIG. 23B, at least part of optical lens section 20R (e.g., bottom end BE) is disposed below top end TE of optical lens section 20L in the up-down direction of body frame 2 and above bottom end BE of optical lens section 20L in the up-down direction of body frame 2. That is, optical lens section 20R is disposed within a range of misalignment not greater than length D17 in the up-down direction of body frame 2.

Next, FIG. 23C will be described. As shown in FIG. 23C, at least part of (e.g., top end TE) of optical lens section 20R is disposed below top end TE of optical lens section 20L in the up-down direction of body frame 2 and above bottom end BE of optical lens section 20L in the up-down direction of body frame 2. That is, optical lens section 20R is disposed within a range of misalignment not greater than length D17 in the up-down direction of body frame 2.

Next, FIG. 23D will be described. In FIG. 23D, virtual line L48 is a line passing through top end TE of optical lens section 20R of rightward highly-directional light unit 19R. Virtual line L49 is a line passing through bottom end BE of optical lens section 20R of rightward highly-directional light unit 19L.

As shown in FIG. 23D, at least part of optical lens section 20L (e.g., bottom end BE) is disposed below top end TE of optical lens section 20R in the up-down direction of body frame 2 and above bottom end BE of optical lens section 20R in the up-down direction of body frame 2. That is, optical lens section 20L is disposed within a range of misalignment not greater than length D18 in the up-down direction of body frame 2.

Next, FIG. 23E will be described. As shown in FIG. 23E, at least part of optical lens section 20L (e.g., top end TE) is disposed below top end TE of optical lens section 20R in the up-down direction of body frame 2 and above bottom end BE of optical lens section 20R in the up-down direction of body frame 2. That is, optical lens section 20L is disposed within a range of misalignment not greater than length D18 in the up-down direction of body frame 2.

Under above-described left-right relation condition 3, as viewed from the front of body frame 2 in the front-rear direction, the bottom end of optical lens section 20L of leftward highly-directional light unit 19L located at the lowermost position in the up-down direction of body frame 2 in left light group 22L is never located above, in the up-down direction of body frame 2, the top end of optical lens section 20R of rightward highly-directional light unit 19R located at the lowermost position in right light group 22R in the up-down direction of body frame 2, and as viewed from the front of body frame 2 in the front-rear direction, the top end of optical lens section 20L of leftward highly-directional light unit 19L located at the lowermost position in left light group 22L in the up-down direction of body frame 2 is never located below, in the up-down direction of body frame 2, the bottom end of optical lens section 20R of rightward highly-directional light unit 19R located at the lowermost position in light group 22R in the up-down direction of body frame 2. For this reason, leftward highly-directional light unit 19L located at the lowermost position in left light group 22L in the up-down direction of body frame 2 and rightward highly-directional light unit 19R located at the lowermost position in right light group 22R in the up-down direction of body frame 2 are arranged in a compact form in the up-down direction of body frame 2.

Under above-described left-right relation condition 3, as viewed from the front of body frame 2 in the front-rear direction, the bottom end of optical lens section 20R of rightward highly-directional light unit 19R located at the lowermost position in right light group 22R in the up-down direction of body frame 2 is never located above, in the up-down direction of body frame 2, the top end of optical lens section 20L of leftward highly-directional light unit 19L located at the lowermost position in left light group 22L in the up-down direction of body frame 2, and as viewed from the front of body frame 2 in the front-rear direction, the top end of optical lens section 20R of rightward highly-directional light unit 19R located at the lowermost position in the up-down direction of body frame 2 in right light group 22R is never located below, in the up-down direction of body frame 2, the bottom end of optical lens section 20L of leftward highly-directional light unit 19L located at the lowermost position in the up-down direction of body frame 2 in left light group 22L. For this reason, leftward highly-directional light unit 19L located at the lowermost position in left light group 22L in the up-down direction of body frame 2 and rightward highly-directional light unit 19R located at the lowermost position in right light group 22R in the up-down direction of body frame 2 are arranged in a compact form in the up-down direction of body frame 2.

Therefore, the size of straddled vehicle 1 does not increase in the up-down direction of body frame 2.

[Left-Right Relation Condition 4]

Next, left-right relation condition 4 will be described using FIG. 6. Left-right relation condition 4 is a condition showing what positional relationship in the left-right direction of body frame 2 exists between the left end of the optical lens section of the leftward highly-directional light unit located at the rightmost position in left light group 22L in the left-right direction of body frame 2 and the right end of the optical lens section of the rightward highly-directional light unit located at the leftmost position in the left-right direction of body frame 2 in right light group 22R as viewed from the front of body frame 2.

As shown in FIG. 6, as viewed from the front of body frame 2 in the front-rear direction, left end LE of optical lens section 20L of leftward highly-directional light unit 19L located at the rightmost position in the left-right direction of body frame 2 in left light group 22L is located on the right of right edge B5 of left front-wheel support unit 12L in the left-right direction of body frame 2.

As shown in FIG. 6, as viewed from the front of body frame 2 in the front-rear direction, right end RE of optical lens section 20R of rightward highly-directional light unit 19R located at the leftmost position in the left-right direction of body frame 2 in right light group 22R is located on the left of left edge B4 of right front-wheel support unit 12R in the left-right direction of body frame 2.

Under above-described left-right relation condition 4, as viewed from the front of body frame 2 in the front-rear direction, optical lens section 20L of leftward highly-directional light unit 19L located at the rightmost position in the left-right direction of body frame 2 in left light group 22L and optical lens section 20R of rightward highly-directional light unit 19R located at the leftmost position in the left-right direction of body frame 2 in right light group 22R are arranged between right edge B5 of left front-wheel support unit 12L and left edge B4 of right front-wheel support unit 12R. Thus, leftward highly-directional light unit 19L located the rightmost position in the left-right direction of body frame 2 in left light group 22L and rightward highly-directional light unit 19R located at the leftmost position in the left-right direction of body frame 2 in right light group 22R are arranged in a compact form in the left-right direction of body frame 2, which prevents an increase in the size of straddled vehicle 1 in the left-right direction of body frame 2.

Note that a configuration has been described above using FIG. 6 where a light group includes four highly-directional light units, but also in a configuration where a light group includes six highly-directional light units (e.g., the configurations shown in FIG. 7 and FIG. 10), as viewed from the front of body frame 2 in the front-rear direction, left end LE of the optical lens section of the leftward highly-directional light unit located at the rightmost position in the left-right direction of body frame 2 in left light group 22L is on the right of right edge B5 of left front-wheel support unit 12L in the left-right direction of body frame 2 and right end RE of the optical lens section of the rightward highly-directional light unit located at the leftmost position in the left-right direction of body frame 2 in right light group 22R is located on the left of left edge B4 of right front-wheel support unit 12R in the left-right direction of body frame 2.

[Left-Right Relation Condition 5]

Next, left-right relation condition 5 will be described using FIG. 24. Left-right relation condition 5 is a condition showing, as viewed from the front of body frame 2 in the front-rear direction, how long is the length (aforementioned length D1) in the left-right direction of body frame 2 between the right end of the optical lens section of the leftward highly-directional light unit located at the rightmost position in the left-right direction of body frame 2 in left light group 22L and the left end of the optical lens section of the rightward highly-directional light unit located at the leftmost position in the left-right direction of body frame 2 in right light group 22R compared to the length between the left end of the optical lens section of the leftward highly-directional light unit located at the rightmost position in the left-right direction of body frame 2 in left light group 22L and the right edge of left front-wheel support unit 12L in the left-right direction of body frame 2, and the length between the right end of the optical lens section of the rightward highly-directional light unit located at the leftmost in the left-right direction of body frame 2 in right light group 22R and the left edge of right front-wheel support unit 12R in the left-right direction of body frame 2.

Figure 24:
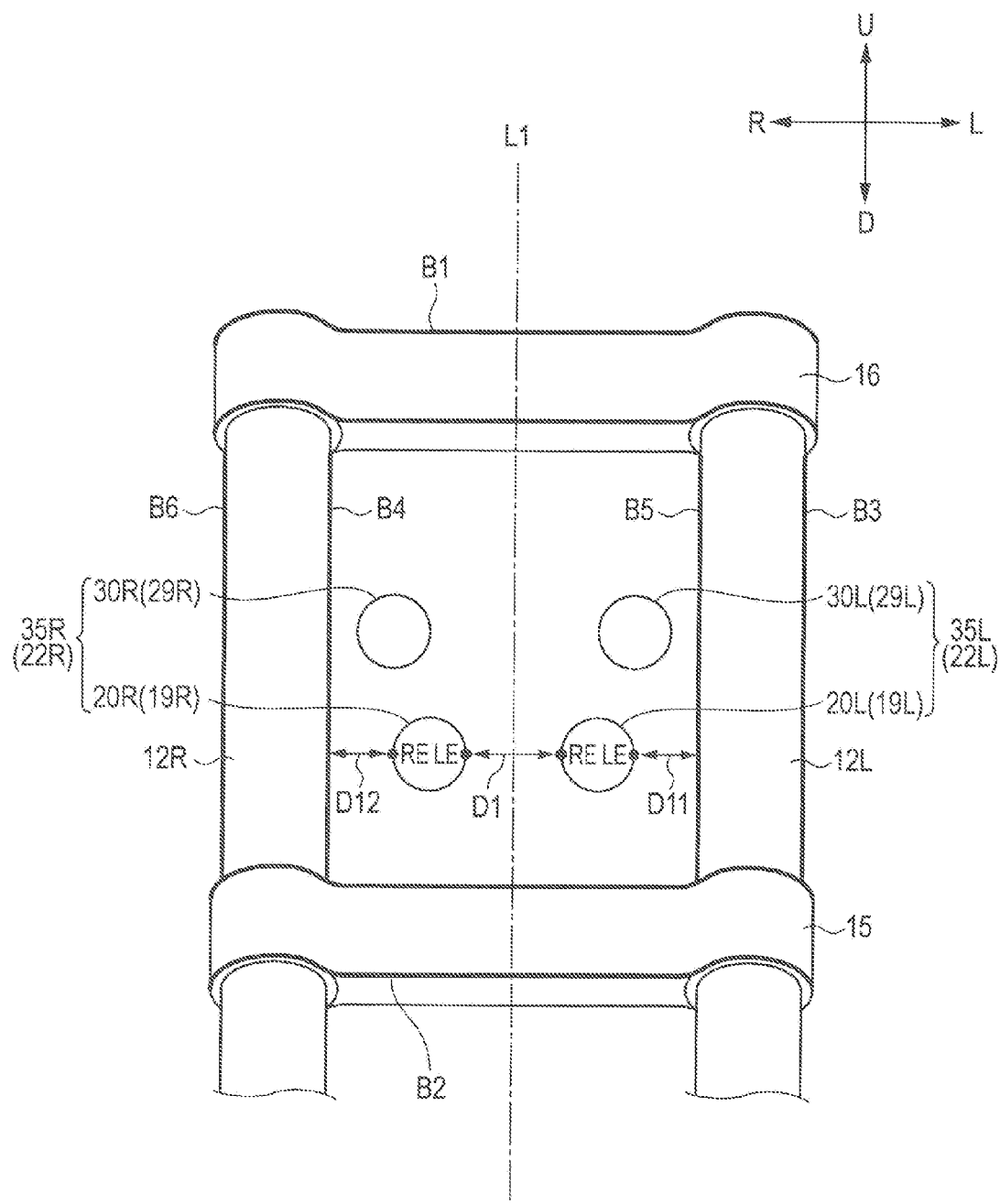
FIG. 24 is a front view illustrating an arrangement example of the highly-directional light units when the light group according to Embodiment 1 of the present invention includes four highly-directional light units.

FIG. 24 is a front view illustrating an arrangement example of highly-directional light units as viewed from the front of body frame 2 in the front-rear direction when a light group includes four highly-directional light units.

The definitions of lengths D11 and D12 shown in FIG. 24 are as follows. Length D11 is the length between left end LE of optical lens section 20L of leftward highly-directional light unit 19L and right edge B5 of left front-wheel support unit 12L in the left-right direction of body frame 2. Length D12 is the length between right end RE of optical lens section 20R of rightward highly-directional light unit 19R and left edge B4 of right front-wheel support unit 12R in the left-right direction of body frame 2.

In the example of FIG. 24, as viewed from the front of body frame 2 in the front-rear direction, leftward highly-directional light unit 19L of left light group 22L is located at the rightmost position in the left-right direction of body frame 2 and rightward highly-directional light unit 19R of right light group 22R is located at the leftmost position in the left-right direction of body frame 2.

In FIG. 24, length D1 is greater than the length obtained by adding up length D11 and length D12. In other words, length D1 between right end RE of optical lens section 20L of leftward highly-directional light unit 19L and left end LE of optical lens section 20R of rightward highly-directional light unit 19R in the left-right direction of body frame 2 is greater than the length obtained by adding up length D11 between left end LE of optical lens section 20L of leftward highly-directional light unit 19L and right edge B5 of left front-wheel support unit 12L in the left-right direction of body frame 2 and length D12 between right end RE of optical lens section 20R of rightward highly-directional light unit 19R and left edge B4 of right front-wheel support unit 12R in the left-right direction of body frame 2.

Under above-described left-right relation condition 4, it is possible to secure a wider space between leftward highly-directional light unit 19L located at the rightmost position in the left-right direction of body frame 2 in left light group 22L and rightward highly-directional light unit 19R located at the leftmost position in the left-right direction of body frame 2 in right light group 22R as viewed from the front of body frame 2 in the front-rear direction.

Note that a case of configuration has been described above using FIG. 24 where a light group includes four highly-directional light units, but even in the configuration where the light group includes six highly-directional light units (e.g., the configurations shown in FIG. 7 and FIG. 10), as viewed from the front of body frame 2 in the front-rear direction, the length in the left-right direction of body frame 2 between the left end of the optical lens section of the leftward highly-directional light unit located at the rightmost position in the left-right direction of body frame 2 in left light group 22L and right end RE of the optical lens section of the rightward highly-directional light unit located at the leftmost position in the left-right direction of body frame 2 in right light group 22R is greater than a length obtained by adding up the length between left end LE of the optical lens section of the leftward highly-directional light unit located at the rightmost position in the left-right direction of body frame 2 in left light group 22L and right edge B5 of left front-wheel support unit 12L in the left-right direction of body frame 2 and the length between right end RE of the optical lens section of the right highly directional located at the leftmost position in the left-right direction of body frame 2 in right light group 22R and left edge B4 of right front-wheel support unit 12R in the left-right direction of body frame 2.

[Left-Right Relation Condition 6]

Next, left-right relation condition 6 will be described FIG. 11. Left-right relation condition 6 is a condition showing how long is the length in the left-right direction of body frame 2 between the right end of the leftward highly-directional light unit and the left end of the rightward highly-directional light unit neighboring in the left-right direction of body frame 2 across center virtual line L1 compared to the length of the maximum lens width of the optical lens section of the leftward highly-directional light unit in the left-right direction and the length of the maximum lens width of the optical lens section of the rightward highly-directional light unit in the left-right direction.

Figure 11:
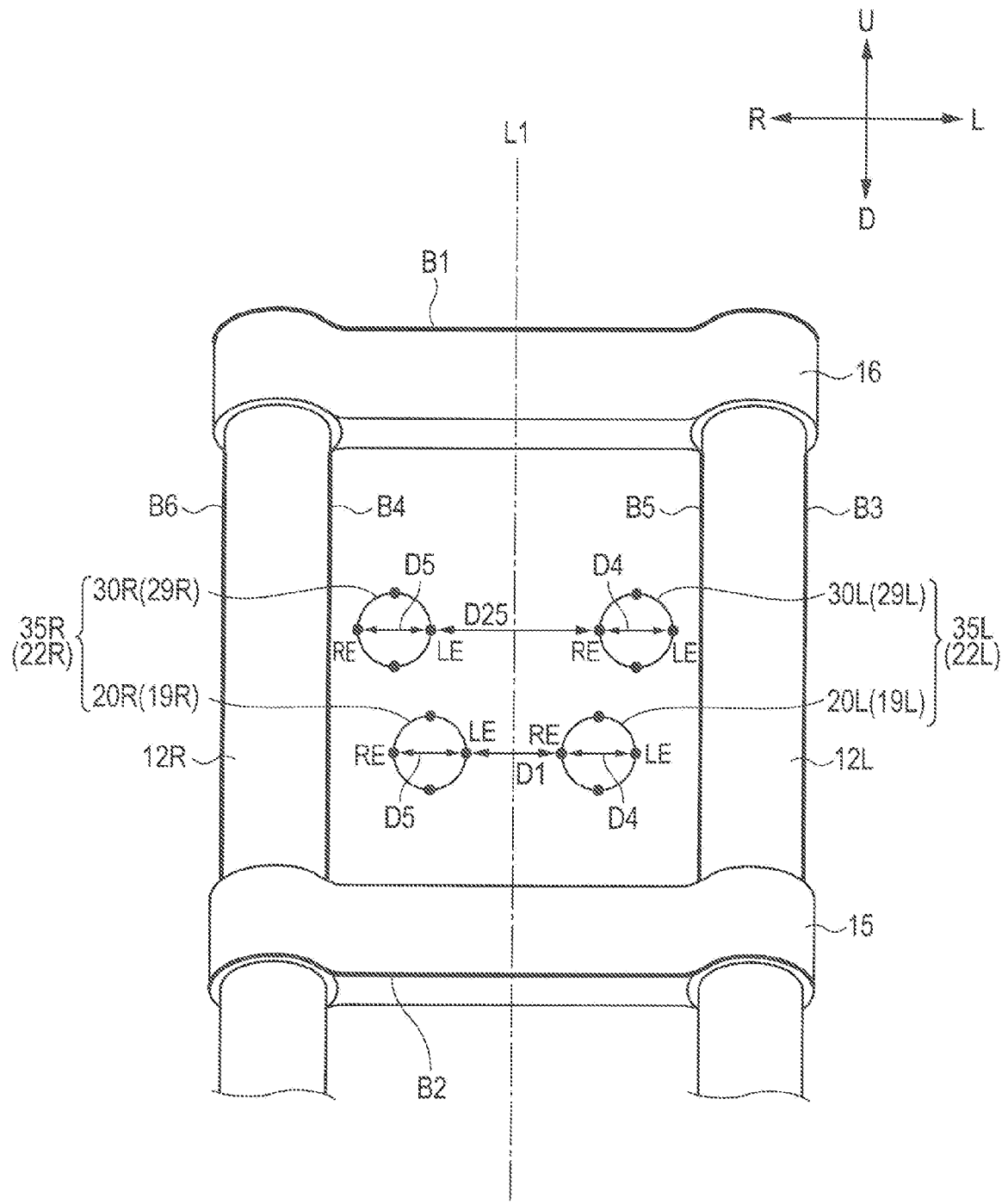
FIG. 11 is a front view illustrating an arrangement example of the highly-directional light units when the light group according to Embodiment 1 of the present invention includes four highly-directional light units.

FIG. 11 is a front view illustrating an arrangement example of highly-directional light units in the case where a light group includes four highly-directional light units as viewed from the front of body frame 2 in the front-rear direction.

The definitions of lengths D4, D5 and D25 shown in FIG. 11 are as follows. Length D4 is the length between left end LE and right end RE of optical lens section 20L of leftward highly-directional light unit 19L. In other words, length D4 is a maximum lens width of optical lens section 20L in the left-right direction. Length D4 is also a maximum lens width of optical lens section 30L of leftward highly-directional light unit 29L in the left-right direction. Length D5 is the length between left end LE and right end RE of optical lens section 20R of rightward highly-directional light unit 19R. In other words, length D5 is a maximum lens width of optical lens section 20R in the left-right direction. Length D5 is also a maximum lens width of optical lens section 30R of rightward highly-directional light unit 29R in the left-right direction.

Length D1 shown in FIG. 11 is the length between right end RE of optical lens section 20L of leftward highly-directional light unit 19L and left end LE of optical lens section 20R of rightward highly-directional light unit 19R in the left-right direction of body frame 2. In other words, length D1 is the length between right end RE of left optical lens body 35L and left end LE of right optical lens body 35R in the left-right direction of body frame 2. Length D25 shown in FIG. 11 is the length between right end RE of optical lens section 30L of leftward highly-directional light unit 29L and left end LE of optical lens section 30R of rightward highly-directional light unit 29R in the left-right direction of body frame 2.

In the example of FIG. 11, leftward highly-directional light unit 19L is located at the rightmost position in the left-right direction of body frame 2 in left light group 22L and rightward highly-directional light unit 19R is located at the leftmost position in the left-right direction of body frame 2 in right light group 22R. In the example of FIG. 11, leftward highly-directional light unit 29L is located at the leftmost position in the left-right direction of body frame 2 in left light group 22L and rightward highly-directional light unit 29R is located at the rightmost position in the left-right direction of body frame 2 in right light group 22R.

As shown in FIG. 11, length D25 is greater than length D1. Length D1 is also greater than length D4 and greater than length D5. Length D25 is greater than length D4 and greater than length D5.

Under above-described left-right relation condition 6, as viewed from the front of body frame 2 in the front-rear direction, it is possible to leave a space greater than the maximum lens width of each optical lens section in the left-right direction between leftward highly-directional light unit 19L and rightward highly-directional light unit 19R in the left-right direction of body frame 2 and between leftward highly-directional light unit 29L and rightward highly-directional light unit 29R in the left-right direction of body frame 2. Thus, as viewed from the front of body frame 2 in the front-rear direction, a wider space forward of steering shaft 8 can be secured.

Note that a configuration has been described above using FIG. 11 where the light group includes four highly-directional light units, but even in a configuration where the light group includes six highly-directional light units (e.g., the configurations shown in FIG. 7 and FIG. 10), as viewed from the front of body frame 2 in the front-rear direction, the length in the left-right direction of body frame 2 between the right end of the leftward highly-directional light unit and the left end of the rightward highly-directional light unit neighboring each other across center virtual line L1 in the left-right direction of body frame 2 is greater than a maximum lens width in the left-right direction of the optical lens section of the leftward highly-directional light unit and the maximum lens width in the left-right direction of the optical lens section of the rightward highly-directional light unit.

[Left-Right Relation Condition 7]

Next, left-right relation condition 7 will be described using FIG. 25. Left-right relation condition 7 is a condition showing how long is the length in the left-right direction of body frame 2 between the left end of the optical lens section of the leftward highly-directional light unit located at the leftmost position in the left-right direction of body frame 2 in left light group 22L as viewed from the front of body frame 2 in the front-rear direction and the right end of the optical lens section of the rightward highly-directional light unit located at the rightmost position in the left-right direction of body frame 2 in right light group 22R compared to the length in the up-down direction of the body frame between the top end of the optical lens section of the highly-directional light unit located at the uppermost position in left light group 22L and right light group 22R in the up-down direction of body frame 2 as viewed from the front of body frame 2 in the front-rear direction and the bottom end of the optical lens section of the highly-directional light unit located at the lowermost position in left light group 22L and right light group 22R in the up-down direction of body frame 2.

Figure 25:
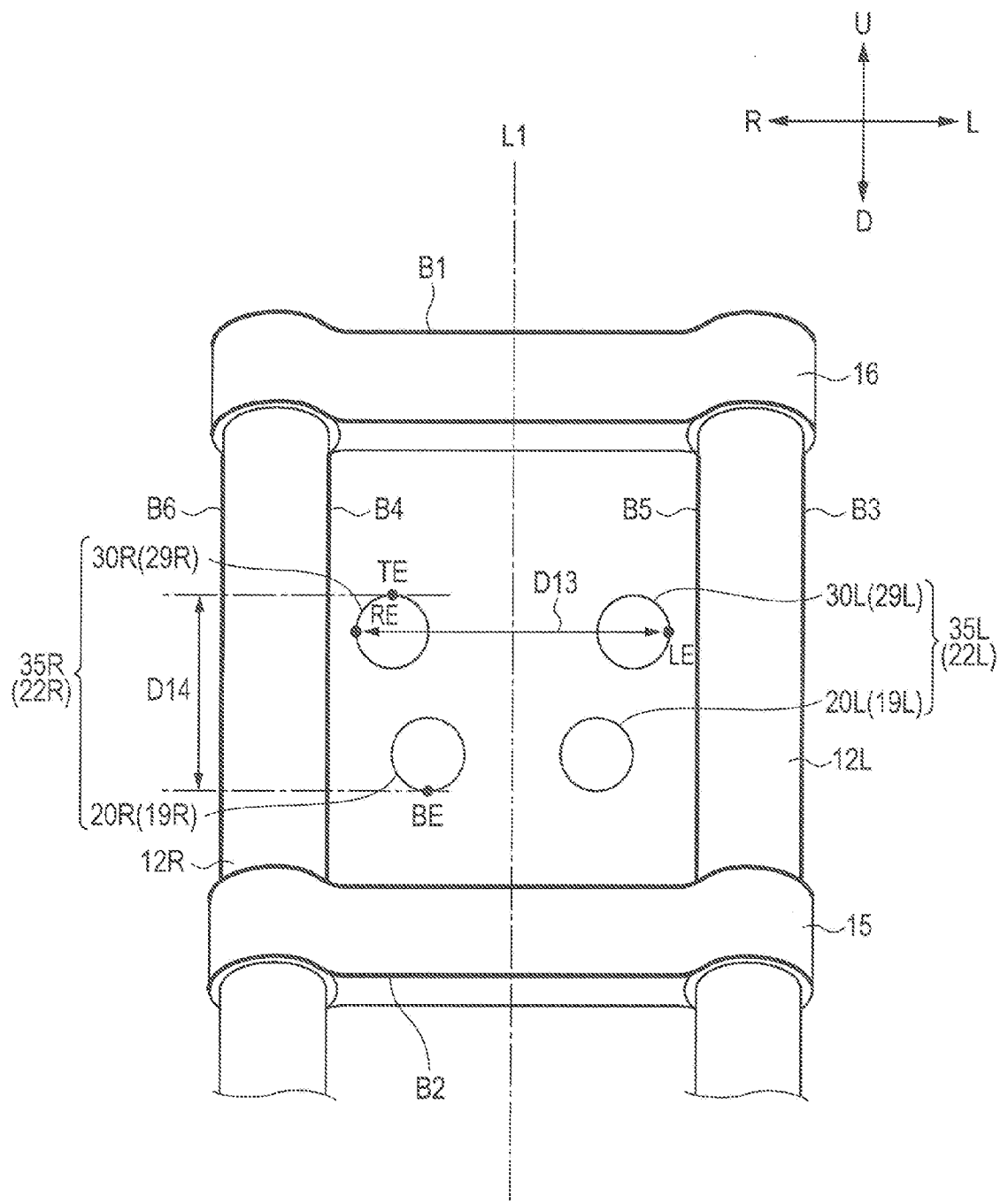
FIG. 25 is a front view illustrating an arrangement example of the highly-directional light units when the light group according to Embodiment 1 of the present invention includes four highly-directional light units.

FIG. 25 is a front view illustrating an arrangement example of the highly-directional light units in the case where the light group includes four highly-directional light units as viewed from the front of body frame 2 in the front-rear direction.

In the example of FIG. 25, leftward highly-directional light unit 29L is located at the leftmost position in the left-right direction of body frame 2 in left light group 22L as viewed from the front of body frame 2 in the front-rear direction and rightward highly-directional light unit 29R is located at the rightmost position in the left-right direction of body frame 2 in right light group 22R as viewed from the front of body frame 2 in the front-rear direction. In the example of FIG. 25, as viewed from the front of body frame 2 in the front-rear direction, leftward highly-directional light unit 29L and rightward highly-directional light unit 29R are located at the uppermost positions in the up-down direction of body frame 2 in left light group 22L and right light group 22R. In the example of FIG. 25, as viewed from the front of body frame 2 in the front-rear direction, leftward highly-directional light unit 19L and rightward highly-directional light unit 19R are located at the lowermost positions of left light group 22L and right light group 22R in the up-down direction of body frame 2.

In FIG. 25, length D13 is the length between left end LE of optical lens section 30L of leftward highly-directional light unit 29L and right end RE of optical lens section 30R of rightward highly-directional light unit 29R in the left-right direction of body frame 2. In other words, length D13 is the length between left end LE of left optical lens body 35L and right end RE of right optical lens body 35R in the left-right direction of body frame 2. In FIG. 25, length D14 is the length between top end TE of optical lens section 30L of leftward highly-directional light unit 29L or top end TE of optical lens section 30R of rightward highly-directional light unit 29R and bottom end BE of optical lens section 20L of leftward highly-directional light unit 19L or bottom end BE of optical lens section 20R of rightward highly-directional light unit 19R in the up-down direction of body frame 2.

As shown in FIG. 25, length D13 is longer than length D14. In other words, as viewed from the front of body frame 2 in the front-rear direction, the length in the left-right direction of body frame 2 between left end LE of optical lens section 30L of leftward highly-directional light unit 29L and right end RE of optical lens section 30R of rightward highly-directional light unit 29R is greater than the length in the up-down direction of body frame 2 between top end TE of optical lens section 30L of leftward highly-directional light unit 29L or top end TE of optical lens section 30R of rightward highly-directional light unit 29R and bottom end BE of optical lens section 20L of leftward highly-directional light unit 19L or bottom end BE of optical lens section 20R of rightward highly-directional light unit 19R.

Under above-described left-right relation condition 7, as viewed from the front of body frame 2 in the front-rear direction, it is possible to secure a wider space in the left-right direction of body frame 2 between leftward highly-directional light unit 29L located at the leftmost position in the left-right direction of body frame 2 in left light group 22L and rightward highly-directional light unit 29R located at the rightmost position in the left-right direction of body frame 2 in right light group 22R.

Furthermore, under above-described left-right relation condition 7, leftward highly-directional light unit 29L and rightward highly-directional light unit 29R located at the uppermost position in left light group 22L and right light group 22R in the up-down direction of body frame 2, and leftward highly-directional light unit 19L and rightward highly-directional light unit 19R located at the lowermost position in left light group 22L and right light group 22R in the up-down direction of body frame 2 are arranged in a compact form in the up-down direction of body frame 2, which prevents an increase in the size of straddled vehicle 1 in the up-down direction of body frame 2.

Figure 26:
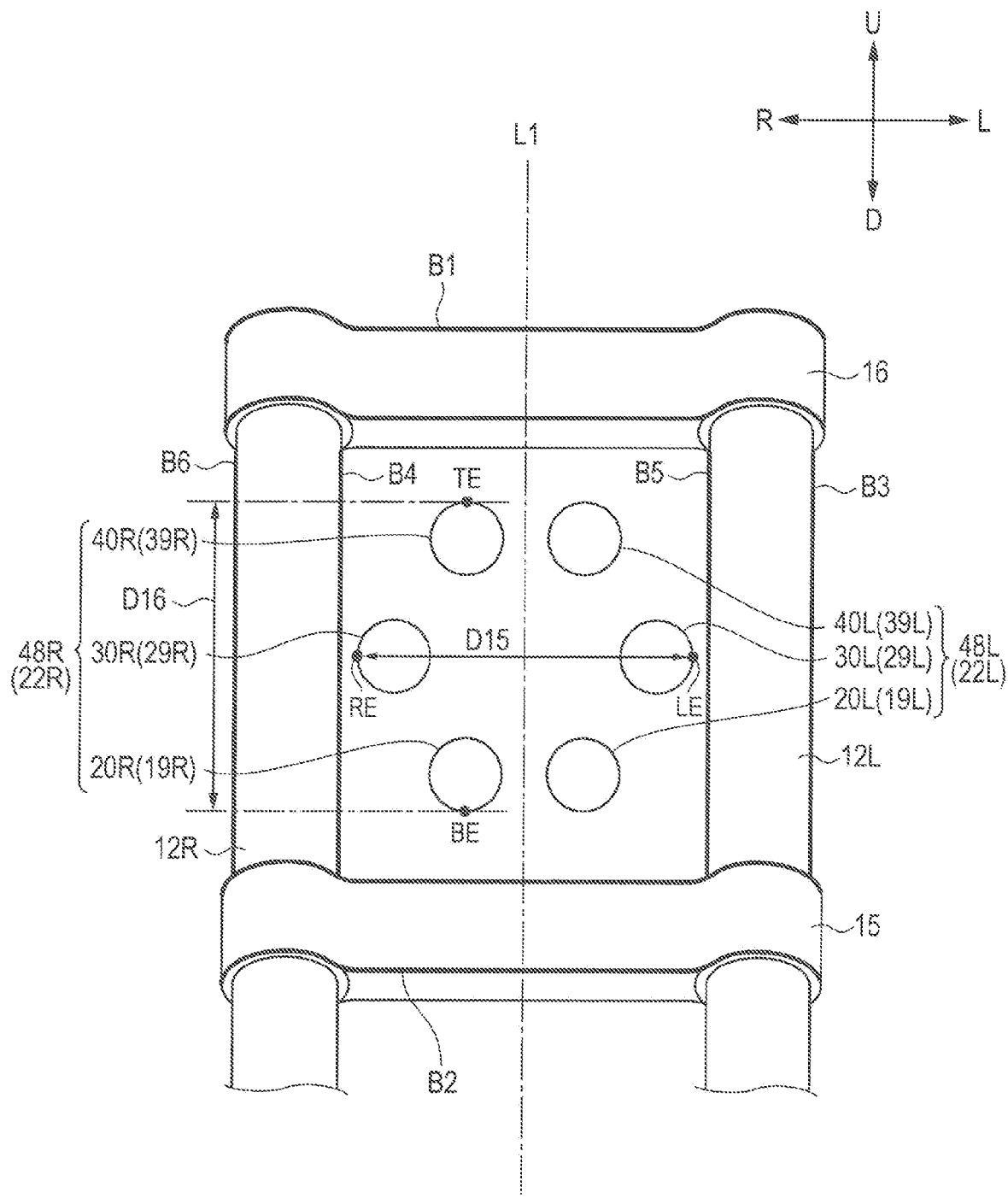
FIG. 26 is a front view illustrating an arrangement example of the highly-directional light units when the light group according to Embodiment 1 of the present invention includes six highly-directional light units.

Next, left-right relation condition 7 will be described using FIG. 26. FIG. 26 is a front view illustrating an arrangement example of the highly-directional light units in the case where the light group includes six highly-directional light units as viewed from the front of body frame 2 in the front-rear direction.

In the example of FIG. 26, as viewed from the front of body frame 2 in the front-rear direction, leftward highly-directional light unit 29L is located at the leftmost position in the left-right direction of body frame 2 in left light group 22L and rightward highly-directional light unit 29R is located at the rightmost position in the left-right direction of body frame 2 in right light group 22R as viewed from the front of body frame 2 in the front-rear direction. Furthermore, in the example of FIG. 26, as viewed from the front of body frame 2 in the front-rear direction, leftward highly-directional light unit 39L and rightward highly-directional light unit 39R are located at the uppermost position in left light group 22L and right light group 22R in the up-down direction of body frame 2. Furthermore, in the example of FIG. 26, as viewed from the front of body frame 2 in the front-rear direction, leftward highly-directional light unit 19L and rightward highly-directional light unit 19R are located at the lowermost position in left light group 22L and right light group 22R in the up-down direction of body frame 2.

In FIG. 26, left optical lens body 48L is made up of optical lens section 20L of leftward highly-directional light unit 19L, optical lens section 30L of leftward highly-directional light unit 29L, and optical lens section 40L of leftward highly-directional light unit 39L. The top end of left optical lens body 48L is top end TE of optical lens section 40L located at the uppermost position in the up-down direction of body frame 2. The bottom end of left optical lens body 48L is bottom end BE of optical lens section 20L located at the lowermost position in the up-down direction of body frame 2. The left end of left optical lens body 48L is left end LE of optical lens section 30L located at the leftmost position in the left-right direction of body frame 2. The right end of left optical lens body 48L is right end RE of either optical lens section 20L or optical lens section 40L located at the rightmost position in the left-right direction of body frame 2.

In FIG. 26, right optical lens body 48R is made up of optical lens section 20R of rightward highly-directional light unit 19R, optical lens section 30R of rightward highly-directional light unit 29R and optical lens section 40R of rightward highly-directional light unit 39R. The top end of right optical lens body 48R is top end TE of optical lens section 40R located at the uppermost position in the up-down direction of body frame 2. The bottom end of right optical lens body 48R is bottom end BE of optical lens section 20R located at the lowermost position in the up-down direction of body frame 2. The left end of right optical lens body 48R is left end LE of either optical lens section 20R or optical lens section 40R located at the leftmost position in the left-right direction of body frame 2. The right end of right optical lens body 48R is right end RE of optical lens section 30R located at the rightmost position in the left-right direction of body frame 2.

In FIG. 26, length D15 is the length between left end LE of optical lens section 30L of leftward highly-directional light unit 29L and right end RE of optical lens section 30R of rightward highly-directional light unit 29R in the left-right direction of body frame 2. In FIG. 26, length D16 is the length between top end TE of optical lens section 40L of leftward highly-directional light unit 39L or top end TE of optical lens section 40R of rightward highly-directional light unit 39R and bottom end BE of optical lens section 20L of leftward highly-directional light unit 19L or bottom end BE of optical lens section 20R of rightward highly-directional light unit 19R in the up-down direction of body frame 2.

In FIG. 26, length D15 is longer than length D16. In other words, as viewed from the front of body frame 2 in the front-rear direction, the length between left end LE of optical lens section 30L of leftward highly-directional light unit 29L and right end RE of optical lens section 30R of rightward highly-directional light unit 29R in the left-right direction of body frame 2 is greater than the length between top end TE of optical lens section 40L of leftward highly-directional light unit 39L or top end TE of optical lens section 40R of rightward highly-directional light unit 39R and bottom end BE of optical lens section 20L of leftward highly-directional light unit 19L or bottom end BE of optical lens section 20R of rightward highly-directional light unit 19R in the up-down direction of body frame 2.

Under above-described left-right relation condition 7, it is possible to secure a wider space in the left-right direction of body frame 2 between leftward highly-directional light unit 29L located at the leftmost position in the left-right direction of body frame 2 in left light group 22L and rightward highly-directional light unit 29R located at the rightmost position in the left-right direction of body frame 2 in right light group 22R as viewed from the front of body frame 2 in the front-rear direction.

Under the above-described up-down/left right maximum length condition, leftward highly-directional light unit 39L and rightward highly-directional light unit 39R located at the uppermost position in the up-down direction of body frame 2 in left light group 22L and right light group 22R, and leftward highly-directional light unit 19L and rightward highly-directional light unit 19R located at the lowermost position in the up-down direction of body frame 2 in left light group 22L and right light group 22R are arranged in a compact form in the up-down direction of body frame 2, preventing an increase in the size of straddled vehicle 1 in the up-down direction of body frame 2.

The additional conditions of the highly-directional light units in the present embodiment have been described so far.

<Layout Example of Highly-Directional Light Units>

Next, a layout of the highly-directional light units in the present embodiment will be described using FIGS. 27A to 27D and FIGS. 28A. 28D.

FIG. 27A to FIG. 27D and FIG. 28A to FIG. 28D are front views illustrating layout examples of the highly-directional light units in the case where a light group includes four highly-directional light units as viewed from the front of body frame 2 in the front-rear direction. Leftward highly-directional light units 19L and 29L, and rightward highly-directional light units 19R and 29R take one of the configurations shown in FIGS. 27A to 27D and FIGS. 28A to 28D.

In FIG. 27A to FIG. 27D and FIG. 28A to FIG. 28D, "H" represents a highly-directional light unit in which a light distribution formed by an optical lens section becomes at least part of a light distribution of a main beam (hereinafter referred to as "main beam highly-directional light unit"). "L" represents a highly-directional light unit in which a light distribution formed by an optical lens section becomes at least part of a light distribution of a dipped beam (hereinafter referred to as "dipped beam highly-directional light unit").

In the examples of FIG. 27A and FIG. 28A, leftward highly-directional light unit 19L and leftward highly-directional light unit 29L are main beam highly-directional light units and rightward highly-directional light unit 19R and rightward highly-directional light unit 29R are dipped beam highly-directional light units.

In the examples of FIG. 27B and FIG. 28B, leftward highly-directional light unit 19L and leftward highly-directional light unit 29L are dipped beam highly-directional light units, and rightward highly-directional light unit 19R and rightward highly-directional light unit 29R are main beam highly-directional light units.

In the examples of FIG. 27C and FIG. 28C, leftward highly-directional light unit 19L and rightward highly-directional light unit 19R are main beam highly-directional light units, and leftward highly-directional light unit 29L and rightward highly-directional light unit 29R are dipped beam highly-directional light units.

In the examples of FIG. 27D and FIG. 28D, leftward highly-directional light unit 19L and rightward highly-directional light unit 19R are dipped beam highly-directional light units, and leftward highly-directional light unit 29L and rightward highly-directional light unit 29R are main beam highly-directional light units.

The above-described layout allows the two main beam highly-directional light units and the two dipped beam highly-directional light units to be arranged divided in the left-right direction of body frame 2. Furthermore, the above-described layout allows one main beam highly-directional light unit and one dipped beam highly-directional light unit to be arranged in the left-right direction of body frame 2.

<Arrangement Pattern of Highly-Directional Light Units>

Next, an arrangement pattern of highly-directional light units in the present embodiment will be described using FIGS. 27A to 27D and FIGS. 28A to 28D.

FIG. 27A to FIG. 27D and FIG. 28A to FIG. 28D are front views illustrating examples of the arrangement pattern of highly-directional light units in the case where a light group includes four highly-directional light units as viewed from the front of body frame 2 in the front-rear direction. Leftward highly-directional light units 19L and 29L, and rightward highly-directional light units 19R and 29R adopt one of the configurations shown in FIG. 27A to FIG. 27D and FIG. 28A to FIG. 28D.

In the examples of FIG. 27A to FIG. 27D, leftward highly-directional light unit 19L located at the rightmost position in the left-right direction of body frame 2 in left light group 22L is located at the lowermost position in left light group 22L in the up-down direction of body frame 2. Rightward highly-directional light unit 19R located at the leftmost position in the left-right direction of body frame 2 in right light group 22R is located at the lowermost position in the up-down direction of body frame 2 in right light group 22R. Leftward highly-directional light unit 29L located at the leftmost position in the left-right direction of body frame 2 in left light group 22L is located at the uppermost position in the up-down direction of body frame 2 in left light group 22L. Rightward highly-directional light unit 29R located at the rightmost position in the left-right direction of body frame 2 in right light group 22R is located at the uppermost position in the up-down direction of body frame 2 in right light group 22R.

In the examples of FIG. 28A to FIG. 28D, leftward highly-directional light unit 29L located at the rightmost position in the left-right direction of body frame 2 in left light group 22L is located at the uppermost position in left light group 22L in the up-down direction of body frame 2. Rightward highly-directional light unit 29R located at the leftmost position in the left-right direction of body frame 2 in right light group 22R is located at the uppermost position in right light group 22R in the up-down direction of body frame 2. Leftward highly-directional light unit 19L located at the leftmost position in the left-right direction of body frame 2 in left light group 22L is located at the lowermost position in the up-down direction of body frame 2 in left light group 22L. Rightward highly-directional light unit 19R located at the rightmost position in the left-right direction of body frame 2 in right light group 22R is located at the lowermost position in the up-down direction of body frame 2 in right light group 22R.

Under the above-described arrangement pattern, as viewed from the front of body frame 2 in the front-rear direction, it is possible to adopt an arrangement in which the distance in the left-right direction of body frame 2 between leftward highly-directional light unit 19L located at the rightmost position in the left-right direction of body frame 2 in left light group 22L and located at the lowermost position in the up-down direction of body frame 2 and rightward highly-directional light unit 19R located at the leftmost position in the left-right direction of body frame 2 in right light group 22R and located at the lowermost position in the up-down direction of body frame 2 is smaller than the distance in the left-right direction of body frame 2 between leftward highly-directional light unit 29L located at the leftmost position in the left-right direction of body frame 2 and located at the uppermost position in the up-down direction of body frame 2 in left light group 22L and rightward highly-directional light unit 29R located at the rightmost position in the left-right direction of body frame 2 and located at the uppermost position in the up-down direction of body frame 2 in right light group 22R.

Under the above-described arrangement pattern, as viewed from the front of body frame 2 in the front-rear direction, it is possible to adopt an arrangement in which the distance in the left-right direction of body frame 2 between leftward highly-directional light unit 29L located at the rightmost position in the left-right direction of body frame 2 in left light group 22L and located at the uppermost position in the up-down direction of body frame 2 and rightward highly-directional light unit 29R located at the leftmost position in the left-right direction of body frame 2 and located at the uppermost position in the up-down direction of body frame 2 in right light group 22R is smaller than the distance in the left-right direction of body frame 2 between leftward highly-directional light unit 19L located at the leftmost position in the left-right direction of body frame 2 and located at the lowermost position in the up-down direction of body frame 2 in left light group 22L and rightward highly-directional light unit 19R located at the leftmost position in the left-right direction of body frame 2 and located at the lowermost position in the up-down direction of body frame 2 in left light group 22R.

<Light Distribution>

Figure 29A:
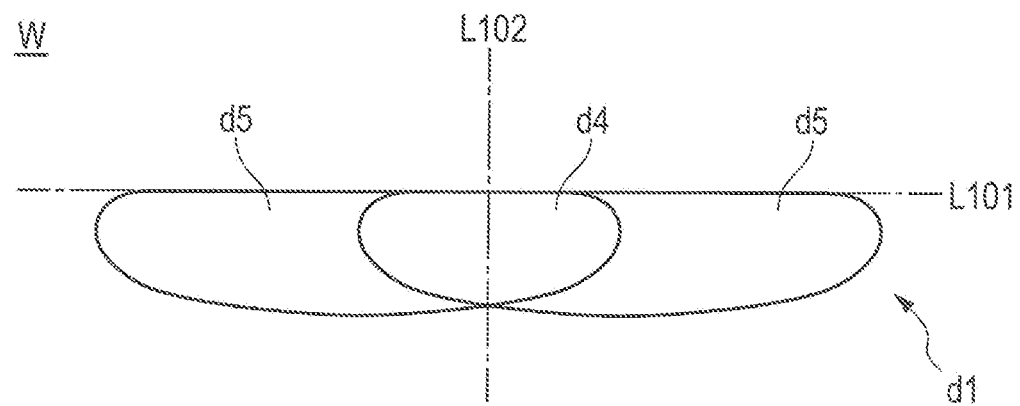
FIGS. 29A to 29C are diagrams illustrating light distributions of the lamp unit of the straddled vehicle according to Embodiment 1 of the present invention.
Figure 29B:
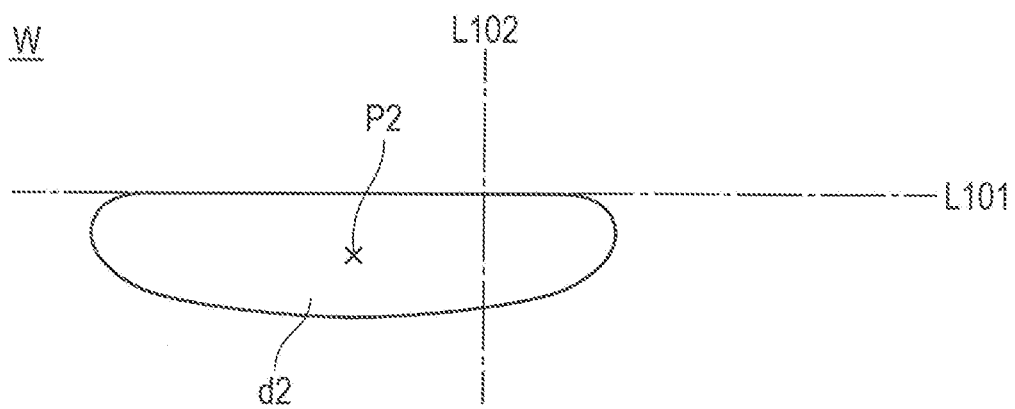
Figure 29C:
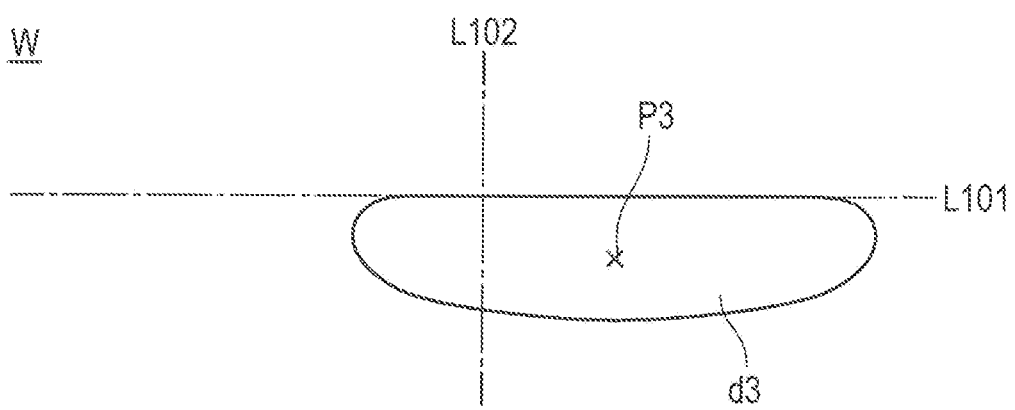

Next, an example of light distributions of the highly-directional light units in the present embodiment will be described using FIG. 29A to FIG. 32C. FIGS. 29A to 29C are diagrams illustrating a light distribution of lamp unit 18a of straddled vehicle 1 according to the present embodiment. FIG. 29A is a diagram illustrating light distributions formed by both optical lens section 20L of leftward highly-directional light unit 19L and optical lens section 20R of highly-directional light unit 19R. Here, as an example, suppose that both leftward highly-directional light unit 19L and rightward highly-directional light unit 19R are main beam highly-directional light units or dipped beam highly-directional light units. FIG. 29B is a diagram illustrating a light distribution formed by optical lens section 20L of leftward highly-directional light unit 19L. FIG. 29C is a diagram illustrating a light distribution formed by optical lens section 20R of rightward highly-directional light unit 19R.

When light is radiated from lamp unit 18a onto wall body W, as shown in FIG. 29A, light distribution d1 of a dipped beam is obtained.

Here, suppose that wall body W is located 10 m forward of body frame 2 in the front-rear direction from the front end in the front-rear direction of body frame 2 of leftward highly-directional light unit 19L and rightward highly-directional light unit 19R and stands upright in front of straddled vehicle 1. In FIG. 29A to FIG. 29C, virtual line L101 represents a line along which a horizontal plane passing through the center of lamp unit 18a crosses wall body W while straddled vehicle 1 is in an upright position (in other words, in a state in which the rear wheel stands upright). Virtual line L102 represents a line that passes through the center of lamp unit 18a, along which the vertical plane that expands in the front-rear direction and the up-down direction of body frame 2 crosses wall body W while straddled vehicle 1 is in an upright position. Wall body W and virtual lines L101 and L102 are the same in FIGS. 30A to 30C, 31A to 31C, and 32A to 32C as well.

Light distribution d1 of a dipped beam includes region d5 below virtual line L101 where light of predetermined intensity spreads in the left-right direction of body frame 2 and region d4 below virtual line L101 which is a central range in the left-right direction of body frame 2 where intensity is higher than that in region d5.

Light distribution d1 of dipped beam is formed of light distribution d2 shown in FIG. 29B formed by optical lens section 20L of leftward highly-directional light unit 19L and light distribution d3 shown in FIG. 29C formed by optical lens section 20R of rightward highly-directional light unit 19R overlapping each other. When one of leftward highly-directional light unit 19L and rightward highly-directional light unit 19R turns on, the other also turns on, and when one turns off, the other also turns off. Thus, when lamp unit 18a turns on, both leftward highly-directional light unit 19L and rightward highly-directional light unit 19R turn on, and light distribution d1 of the dipped beam shown in FIG. 29A is obtained.

Part of light of light distribution d2 by leftward highly-directional light unit 19L overlaps light of light distribution d3 by rightward highly-directional light unit 19R and the remaining part does not overlap the light of light distribution d3 by rightward highly-directional light unit 19R. Part of the light of light distribution d3 by rightward highly-directional light unit 19R overlaps with the light of light distribution d2 by leftward highly-directional light unit 19L and the remaining part does not overlap the light of light distribution d2 by leftward highly-directional light unit 19L. Light distribution d2 by leftward highly-directional light unit 19L and light distribution d3 by rightward highly-directional light unit 19R have the same shape but have different center positions P2 and P3.

Here, having the same light distribution shape means having the same light distribution shape in terms of design concept and does not include any difference due to a design error. Having different light distribution center positions means having different positions in terms of design concept and does not include any difference due to a design error. That part of light distribution overlaps and the remaining part does not overlap means that part of light distribution overlaps and the remaining part does not overlap in terms of design concept, and does not include any overlapping due to a design error.

Note that for the light distribution of lamp unit 18a, following Variation 1 to Variation 3 may be adopted.

<Variation 1 of Light Distribution>

Figure 30A:
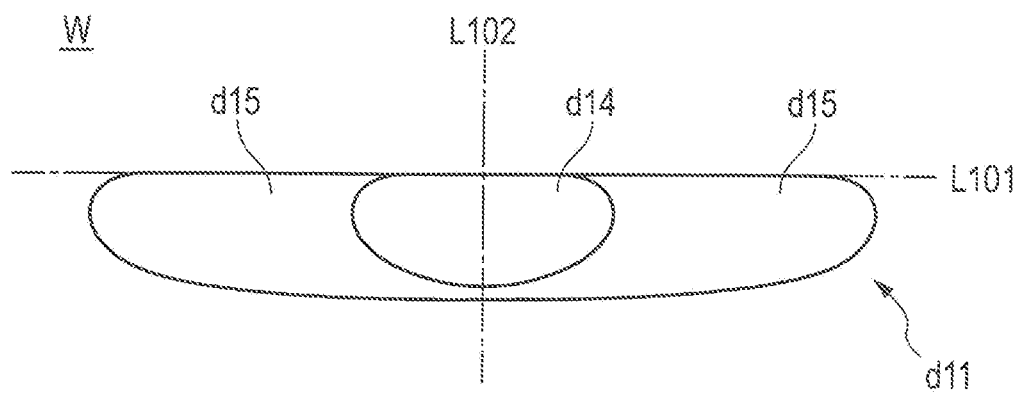
FIGS. 30A to 30C are diagrams illustrating Variation 1 of light distributions of the lamp unit of the straddled vehicle according to Embodiment 1 of the present invention.
Figure 30B:
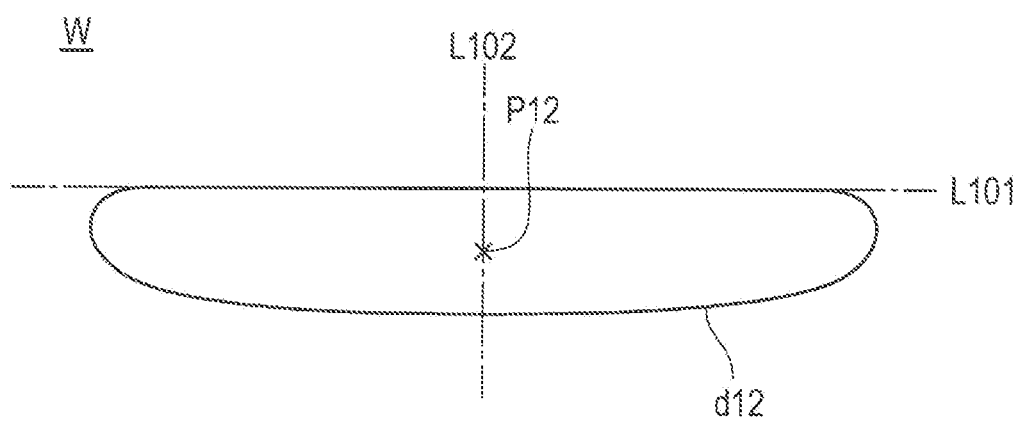
Figure 30C:
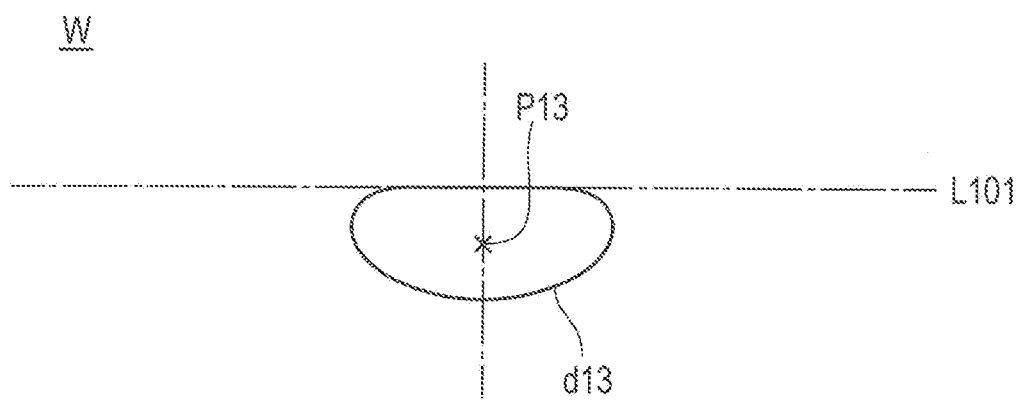

FIGS. 30A to 30C are diagrams illustrating Variation 1 of a light distribution of lamp unit 18a of straddled vehicle 1 according to the present embodiment. FIG. 30A illustrates light distributions formed by both optical lens section 20L of leftward highly-directional light unit 19L and optical lens section 20R of rightward highly-directional light unit 19R. FIG. 30B illustrates a light distribution formed by optical lens section 20L of leftward highly-directional light unit 19L. FIG. 30C illustrates a light distribution formed by optical lens section 20R of rightward highly-directional light unit 19R.

In Variation 1, when light is radiated from lamp unit 18a onto wall body W, light distribution d11 of a dipped beam is obtained as shown in FIG. 30A.

Light distribution d11 of the dipped beam includes region d15 located below virtual line L101 where light of predetermined intensity spreads in the left-right direction of body frame 2 and region d14 located below virtual line L101 where intensity thereof is higher than in region d15 in a range at the center in the left-right direction of body frame 2.

Light distribution d11 of the dipped beam is formed of light distribution d12 shown in FIG. 30B which is formed by optical lens section 20L of leftward highly-directional light unit 19L and light distribution d13 shown in FIG. 30C formed by optical lens section 20R of rightward highly-directional light unit 19R, overlapping each other. Regarding leftward highly-directional light unit 19L and rightward highly-directional light unit 19R, when one turns on, the other also turns on, and when one turns off, the other also turns off. Thus, when lamp unit 18a is on, both leftward highly-directional light unit 19L and rightward highly-directional light unit 19R are on, and light distribution d11 of the dipped beam shown in FIG. 30A is obtained Part of the light of light distribution d12 by leftward highly-directional light unit 19L overlaps the light of light distribution d13 by rightward highly-directional light unit 19R and the remaining part does not overlap the light of light distribution d13 by rightward highly-directional light unit 19R. The whole of light distribution d13 by rightward highly-directional light unit 19R overlaps light distribution d12 by leftward highly-directional light unit 19L. Light distribution d12 by leftward highly-directional light unit 19L and light distribution d13 by rightward highly-directional light unit 19R have different shapes. Different shapes include shapes with different contours and shapes in different sizes. Light distribution d12 by leftward highly-directional light unit 19L and light distribution d13 by rightward highly-directional light unit 19R may have identical center positions P12 and P13.

Here, having different shapes of light distribution means having different shapes of light distribution in terms of design concept and does not include any difference due to a design error. Having an identical position of distribution center means having an identical position in terms of design concept and does not include any difference due to a design error.

<Variation 2 of Light Distribution>

Variation 2 of a light distribution shows a case where lamp unit 18a radiates a main beam required for straddled vehicle 1.

Figure 31A:
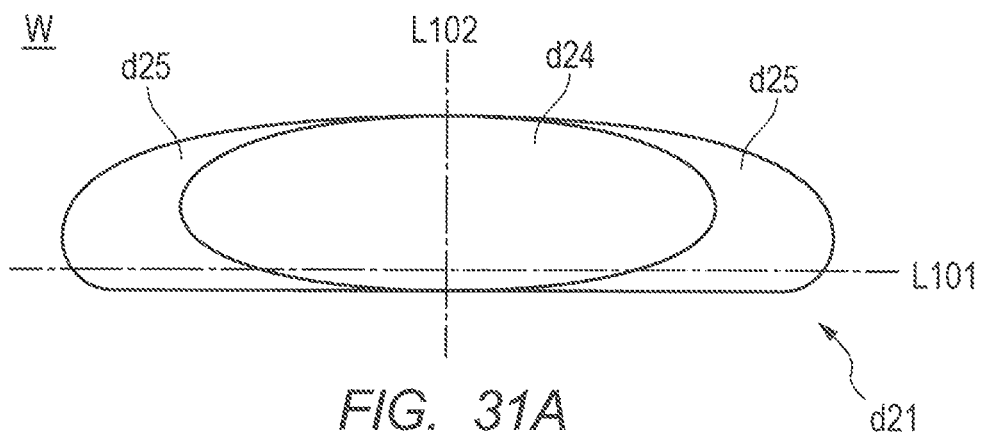
FIGS. 31A to 31C are diagrams illustrating Variation 2 of light distributions of the lamp unit of the straddled vehicle according to Embodiment 1 of the present invention.
Figure 31B:
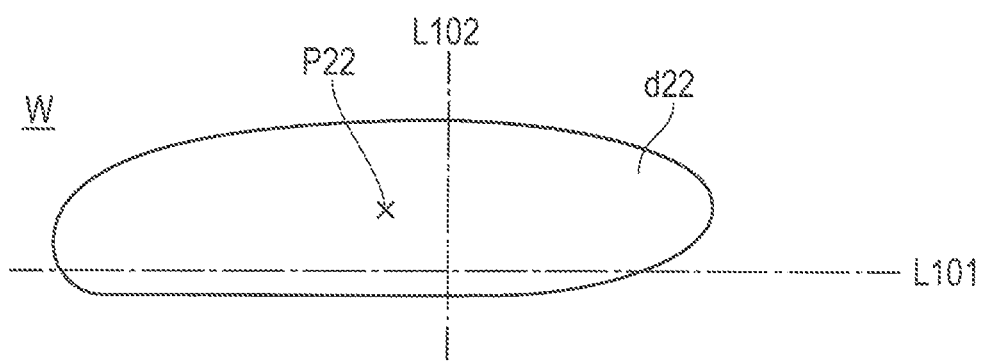
Figure 31C:
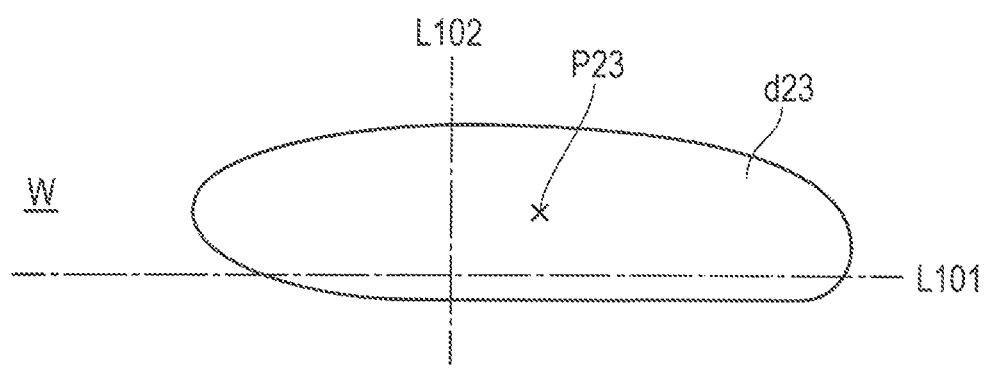

FIGS. 31A to 31C are diagrams illustrating Variation 2 of a light distribution of lamp unit 18a of straddled vehicle 1 according to the present embodiment. FIG. 31A illustrates a light distribution formed by both optical lens section 20L of leftward highly-directional light unit 19L and optical lens section 20R of highly-directional light unit 19R. FIG. 31B illustrates light distribution formed by optical lens section 20L of leftward highly-directional light unit 19L. FIG. 31C illustrates light distribution formed by optical lens section 20R of rightward highly-directional light unit 19R.

In Variation 2, when lamp unit 18a radiates light onto wall body W, light distribution d21 of a main beam is obtained as shown in FIG. 31A.

Light distribution d21 of the main beam includes region d25 in which light of predetermined intensity spreads above and below virtual line L101 in the left-right direction of body frame 2 and region d24 in which intensity is higher than in region d25 in a range at the center above and below virtual line L101 in the left-right direction of body frame 2.

Light distribution d21 of the main beam is formed of light distribution d22 shown in FIG. 31B formed by optical lens section 20L of leftward highly-directional light unit 19L and light distribution d23 shown in FIG. 31C formed by optical lens section 20R of rightward highly-directional light unit 19R, overlapping each other. Regarding highly-directional light unit 19L and highly-directional light unit 19R, when one turns on, the other also turns on, and when one turns off, the other also turns off. Thus, when lamp unit 18a is on, both leftward highly-directional light unit 19L and rightward highly-directional light unit 19R are on and light distribution d21 of the main beam shown in FIG. 31A is obtained.

Part of the light of light distribution d22 by leftward highly-directional light unit 19L overlaps the light of light distribution d23 by rightward highly-directional light unit 19R and the remaining part does not overlap the light of light distribution d23 by rightward highly-directional light unit 19R. Part of the light of light distribution d23 by rightward highly-directional light unit 19R overlaps the light of light distribution d22 by leftward highly-directional light unit 19L and the remaining part does not overlap the light of light distribution d22 by leftward highly-directional light unit 19L. When right and left are reversed, light distribution d22 by leftward highly-directional light unit 19L and light distribution d23 by rightward highly-directional light unit 19R have an identical shape but have different center positions P22 and P23.

Here, having an identical shape of a light distribution means having an identical shape of a light distribution in terms of design concept and does not include any difference due to a design error. Moreover, having different center positions of light distribution means having different positions in terms of design concept, and does not include any difference due to a design error. That part of light distribution overlaps and the remaining part does not overlap means that part of light distribution overlaps and the remaining part does not overlap in terms of design concept, and does not include any overlapping due to a design error.

<Variation 3 of Light Distribution>

Figure 32A:
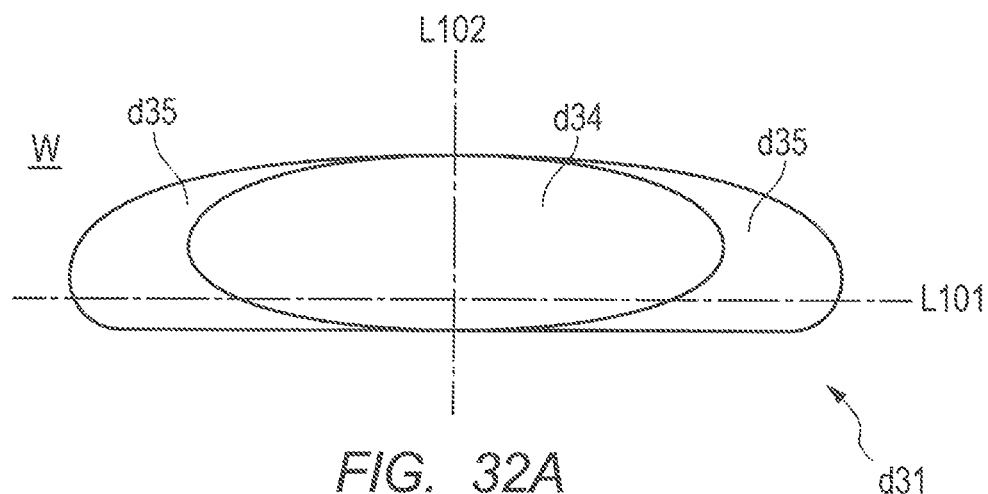
FIGS. 32A to 32C are diagrams illustrating Variation 3 of light distributions of the lamp unit of the straddled vehicle according to Embodiment 1 of the present invention.
Figure 32B:
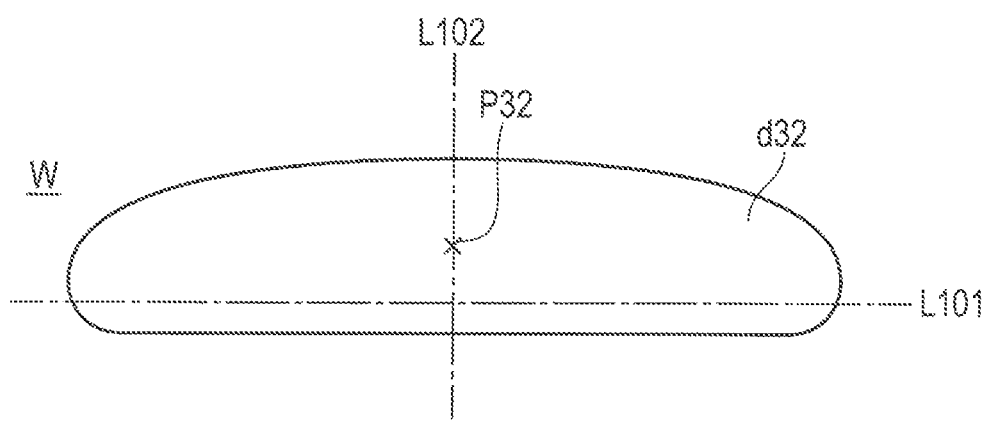
Figure 32C:
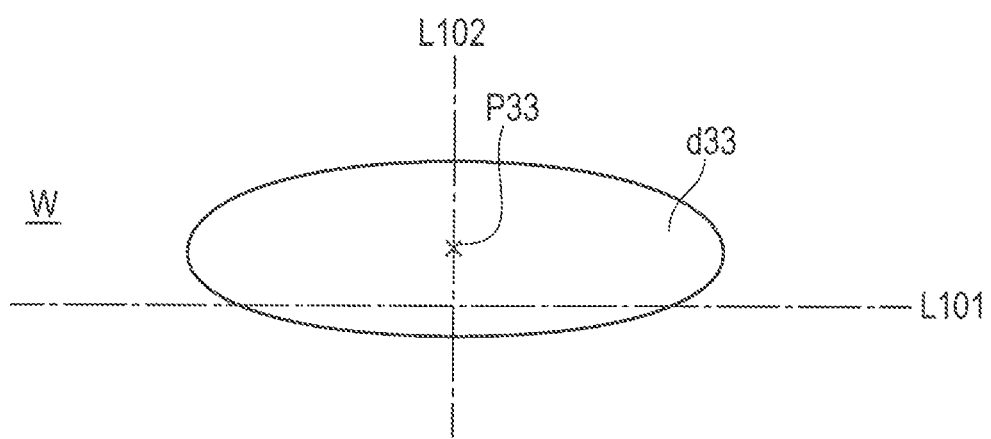

FIGS. 32A to 32C are diagrams illustrating Variation 1 of a light distribution of lamp unit 18a of straddled vehicle 1 according to the present embodiment. FIG. 32A illustrates light distribution formed by both optical lens section 20L of leftward highly-directional light unit 19L and optical lens section 20R of rightward highly-directional light unit 19R. FIG. 32B illustrates a light distribution formed by optical lens section 20L of leftward highly-directional light unit 19L. FIG. 32C illustrates a light distribution formed by optical lens section 20R of rightward highly-directional light unit 19R.

In Variation 3, when lamp unit 18a radiates light onto wall body W, light distribution d31 of a main beam is obtained as shown in FIG. 32A.

Light distribution d31 of the main beam includes region d35 in which light of predetermined intensity spreads above and below virtual line L101 in the left-right direction of body frame 2 and region d34 in which intensity is higher than in region d35 in a range at the center in the left-right direction of the vehicle above and below virtual line L101.

Light distribution d31 of the main beam is formed of light distribution d32 shown in FIG. 32B formed by optical lens section 20L of leftward highly-directional light unit 19L and light distribution d33 shown in FIG. 32C formed by optical lens section 20R of rightward highly-directional light unit 19R, overlapping each other. Regarding leftward highly-directional light unit 19L and rightward highly-directional light unit 19R, when one turns on, the other also turns on, and when one turns off, the other also turns off. Thus, when lamp unit 18a is on, both leftward highly-directional light unit 19L and rightward highly-directional light unit 19R are on and light distribution d31 of the main beam shown in FIG. 32A is obtained.

Part of the light of light distribution d32 by leftward highly-directional light unit 19L overlaps the light of light distribution d33 by rightward highly-directional light unit 19R and the remaining part does not overlap the light of light distribution d33 by rightward highly-directional light unit 19R. Substantially the whole part of light distribution d33 by rightward highly-directional light unit 19R overlaps light distribution d32 by leftward highly-directional light unit 19L. Light distribution d32 by leftward highly-directional light unit 19L and light distribution d33 by rightward highly-directional light unit 19R have different shapes. Different shapes include shapes with different contours and shapes in different sizes. Light distribution d32 by leftward highly-directional light unit 19L and light distribution d33 by rightward highly-directional light unit 19R may have identical center positions P32 and P33.

Here, having different shapes of light distribution means having different shapes of light distribution in terms of design concept and does not include any difference due to a design error. Having identical distribution center positions means having identical positions in terms of design concept and does not include any difference due to a design error.

Note that a case has been described above as an example where both leftward highly-directional light unit 19L and rightward highly-directional light unit 19R are highly-directional light units for main beam or highly-directional light units for dipped beam, but combinations of the two highly-directional light units making up each light distribution described above are not limited to the above-described ones. For example, there can be a combination where both leftward highly-directional light unit 19L and leftward highly-directional light unit 29L are main beam highly-directional light units or dipped beam highly-directional light units, or a combination where both rightward highly-directional light unit 19R and rightward highly-directional light unit 29R are main beam highly-directional light units or dipped beam highly-directional light units. Alternatively, for example, there can be a combination where both leftward highly-directional light unit 29L and rightward highly-directional light unit 29R are main beam highly-directional light units or dipped beam highly-directional light units or a combination where both leftward highly-directional light unit 39L and rightward highly-directional light unit 39R are main beam highly-directional light units or dipped beam highly-directional light units. Alternatively, for example, there can be a combination where both leftward highly-directional light unit 29L and leftward highly-directional light unit 39L are main beam highly-directional light units or dipped beam highly-directional light units, or a combination where both rightward highly-directional light unit 29R and rightward highly-directional light unit 39R are main beam highly-directional light units or dipped beam highly-directional light units.

<Variations of Lamp Unit>

Figure 33:
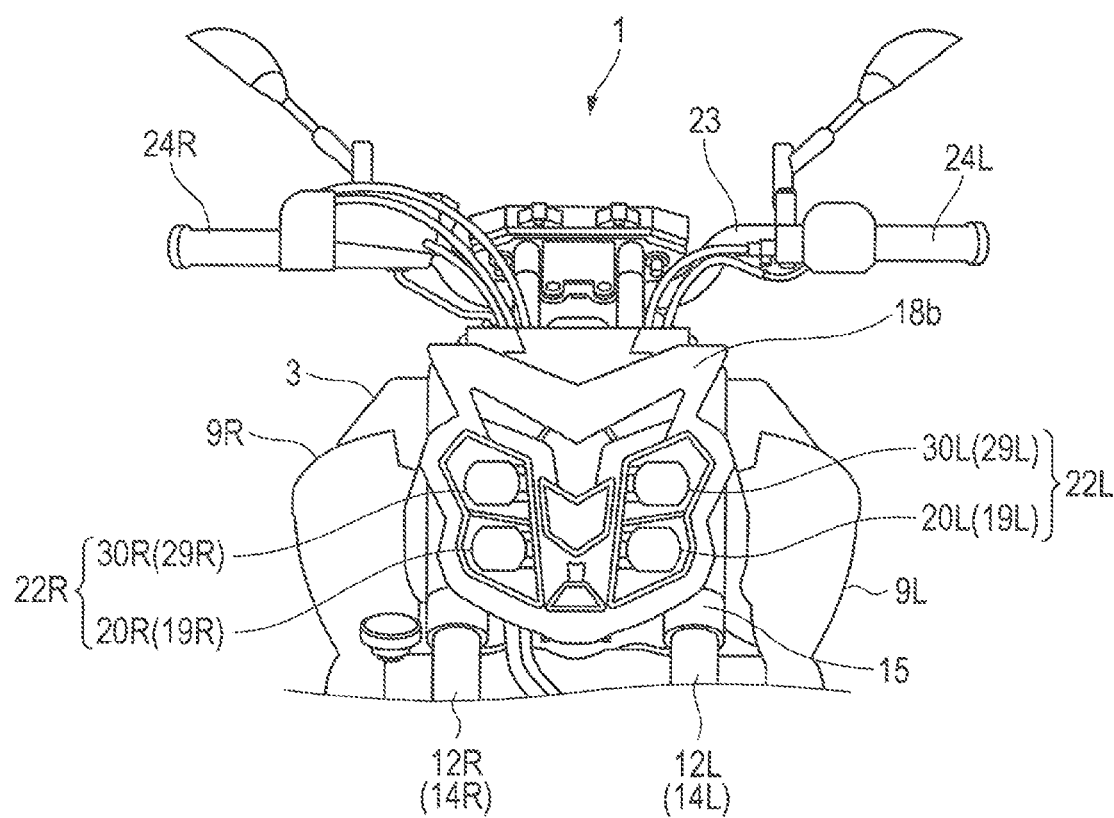
FIG. 33 is a front view illustrating an example of the straddled vehicle according to Embodiment 1 of the present invention mounted with another lamp unit.

Next, variations of the lamp unit of the present embodiment will be described using FIG. 33 to FIG. 37. In the examples of FIG. 1 to FIG. 3, straddled vehicle 1 is provided with lamp unit 18a but straddled vehicle 1 may be provided with a lamp unit of another shape. For example, as shown in FIG. 33, straddled vehicle 1 may be provided with lamp unit 18b. Hereinafter, a detailed structure of lamp unit 18b will be described using FIG. 34 to FIG. 37.

Figure 34:
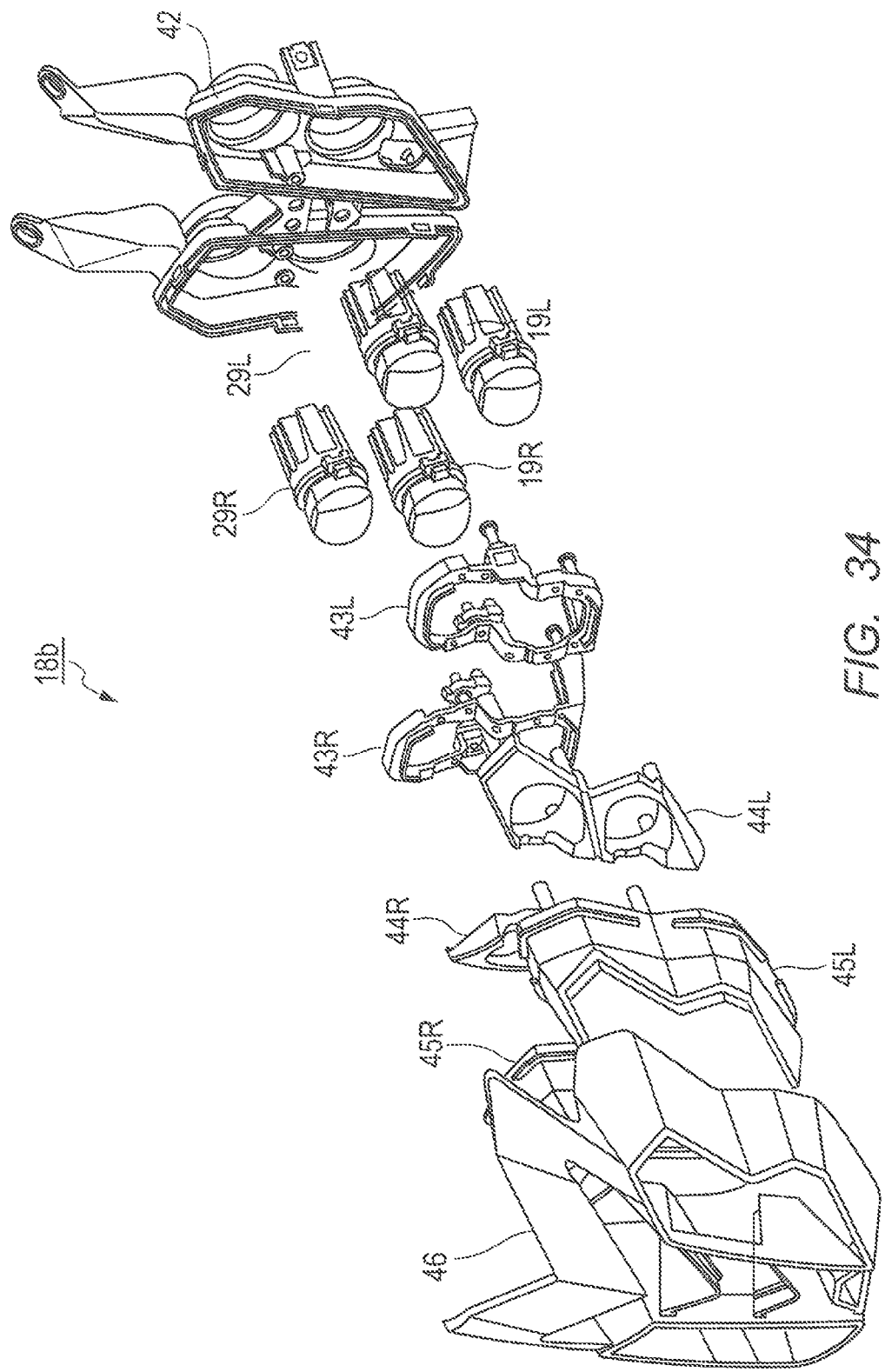
FIG. 34 is an exploded perspective view illustrating the lamp unit in FIG. 33.
Figure 35:
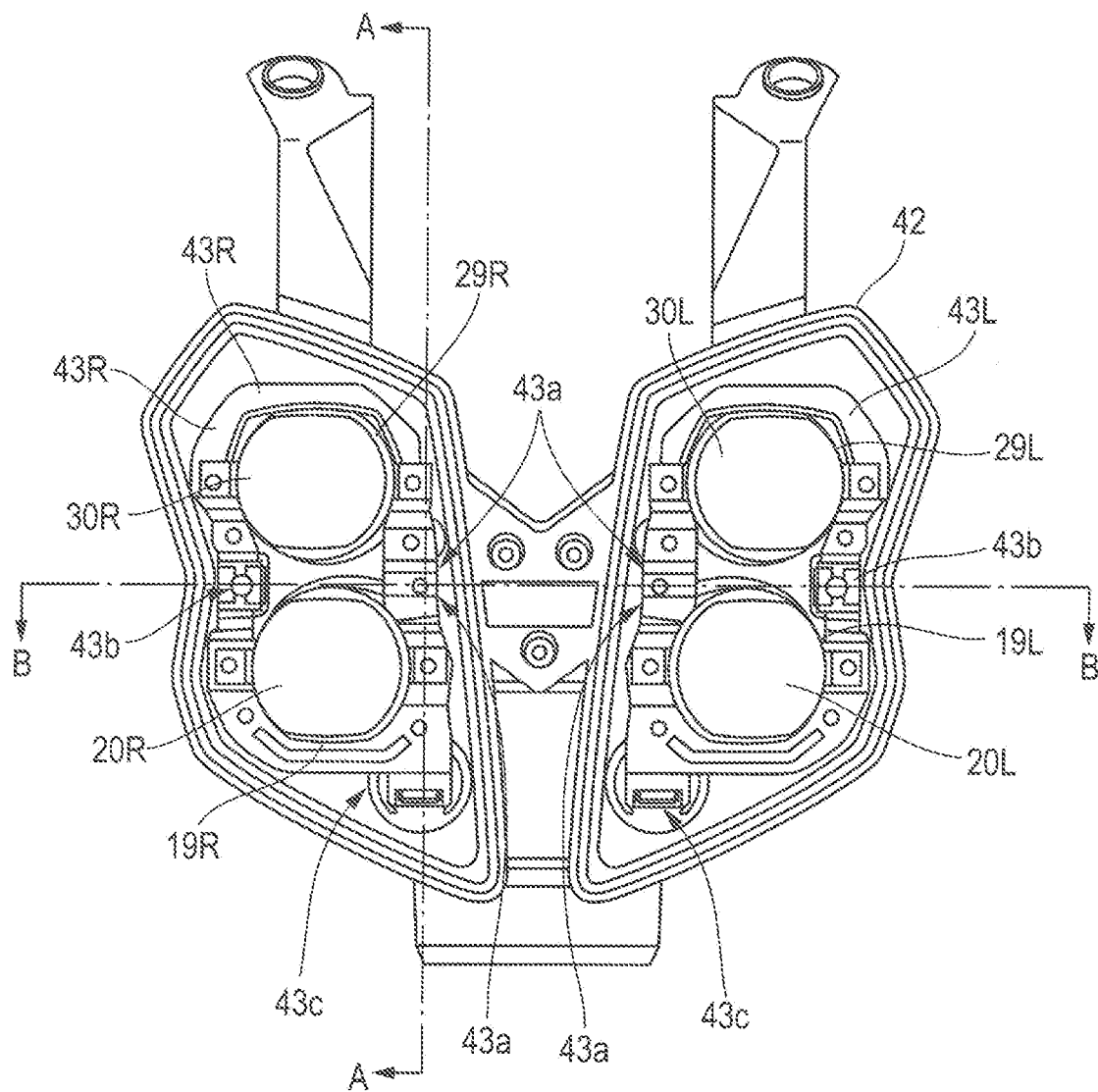
FIG. 35 is a front view illustrating part of the lamp unit in FIG. 33.
Figure 36:
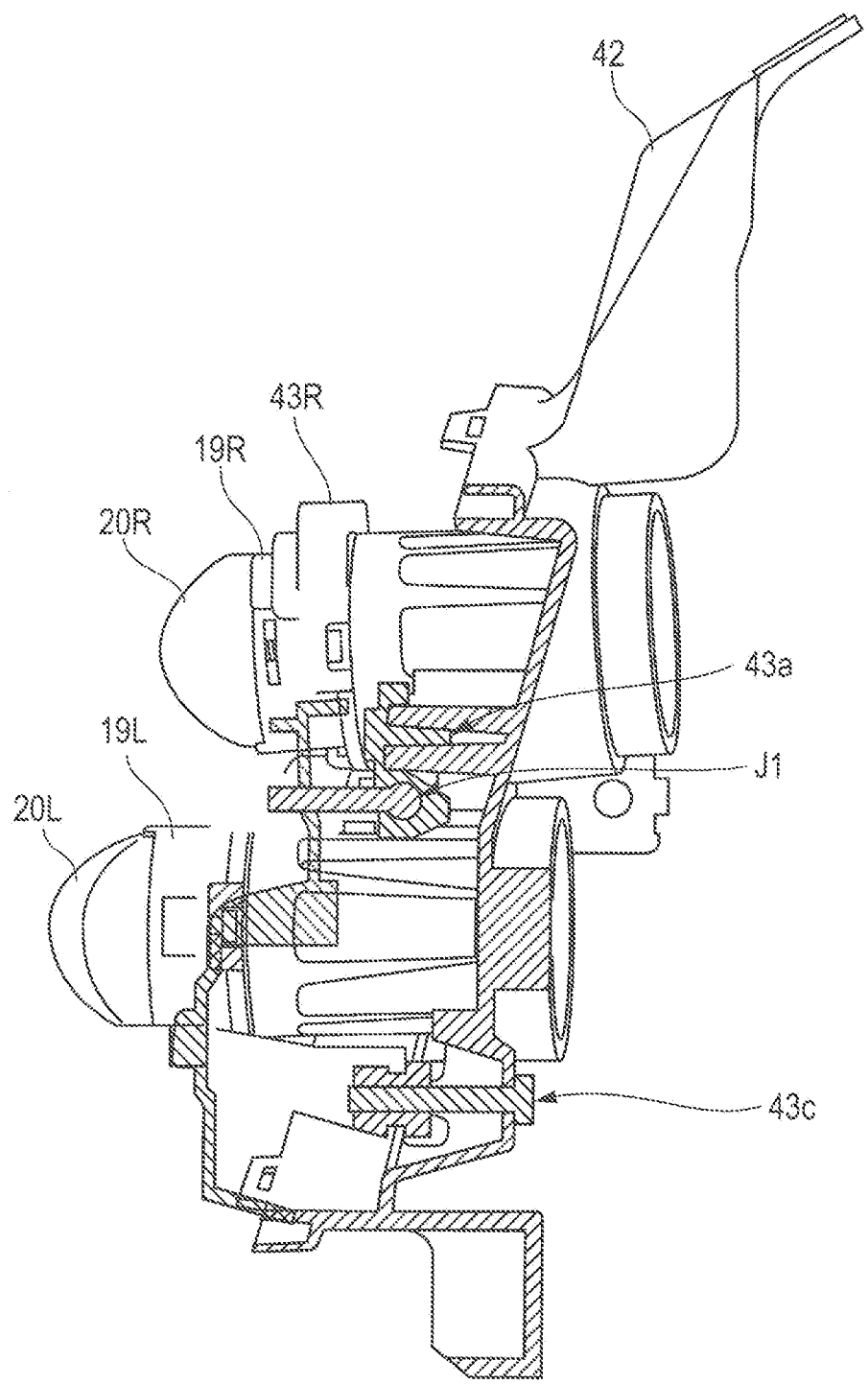
FIG. 36 is a cross-sectional view along line A-A in FIG. 35.
Figure 37:
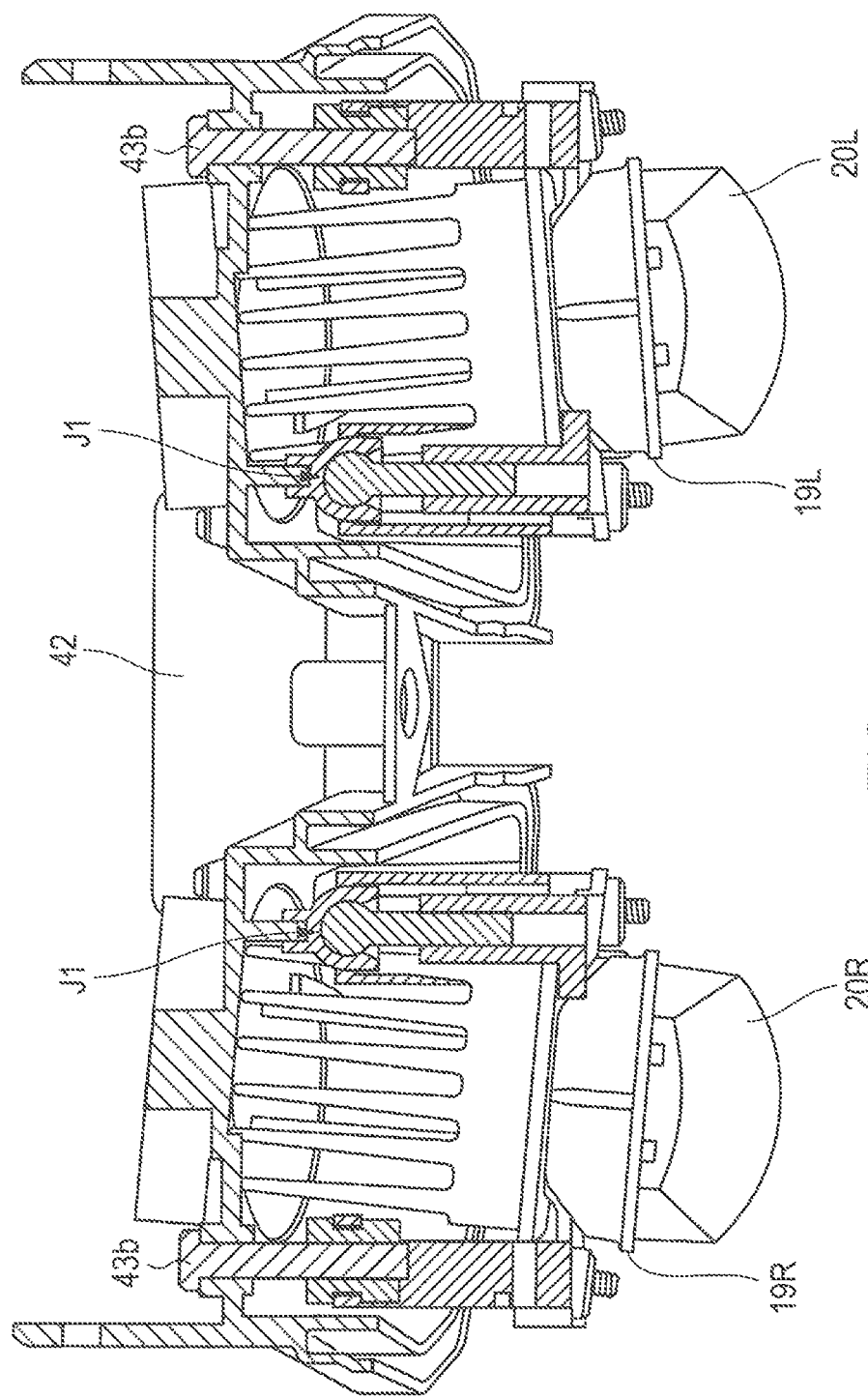
FIG. 37 is a cross-sectional view along line B-B in FIG. 35.

FIG. 34 is an exploded perspective view illustrating lamp unit 18b. FIG. 35 is a front view illustrating part of lamp unit 18b. FIG. 36 is a cross-sectional view along line A-A of FIG. 35. FIG. 37 is a cross-sectional view along line B-B of FIG. 35.

As shown in FIG. 34, lamp unit 18b includes casing 42, leftward highly-directional light unit 29L, leftward highly-directional light unit 19L, rightward highly-directional light unit 29R, rightward highly-directional light unit 19R, first base portion 43L, second base portion 43R, decorative covers 44L and 44R, first outer cover 45L, second outer cover 45R, and front face cover 46 FIG. 35 shows a configuration in which first base portion 43L, second base portion 43R, leftward highly-directional light unit 29L, leftward highly-directional light unit 19L, rightward highly-directional light unit 29R, and rightward highly-directional light unit 19R are assembled into casing 42.

Casing 42 covers at least side faces, upper and lower parts of leftward highly-directional light unit 29L, leftward highly-directional light unit 19L, rightward highly-directional light unit 29R and rightward highly-directional light unit 19R. Casing 42 supports first base portion 43L and second base portion 43R in an angle adjustable manner. Casing 42 is supported directly or indirectly by handlebar 23 or upper bracket 16.

First base portion 43L fixedly supports leftward highly-directional light unit 29L and leftward highly-directional light unit 19L. This fixed supporting prevents leftward highly-directional light unit 29L and leftward highly-directional light unit 19L from relatively moving.

First base portion 43R fixedly supports rightward highly-directional light unit 29R and rightward highly-directional light unit 19R. This fixed supporting prevents rightward highly-directional light unit 29R and rightward highly-directional light unit 19R from relatively moving.

First base portion 43L includes engaging parts 43a, 43b and 43c that engage with casing 42. Second base portion 43R likewise includes engaging parts 43a, 43b and 43c that engage with casing 42. As shown in FIG. 35 to FIG. 37, engaging part 43a engages with casing 42 via universal joint J1. Universal joint J1 is a joint that couples two members in an angle adjustable manner. Engaging part 43b engages with an engaged part of casing 42 at a position in an adjustable manner in the front-rear direction. Engaging part 43b may be provided at a position substantially different from universal joint J1 in the horizontal direction. Engaging part 43c engages with an engaged part of casing 42 at a position in an adjustable manner in the front-rear direction. Engaging part 43c may be provided at a position substantially different from universal joint J1 in the vertical direction.

With the engagement between first base portion 43L and the casing, first base portion 43L is movable relative to casing 42 without changing positions of overlapping between the light distribution of leftward highly-directional light unit 29L and the light distribution of leftward highly-directional light unit 19L. The relative movable direction is a direction of turning around universal joint J1 as a fulcrum. Since casing 42 is fixedly supported by handlebar 23 or upper bracket 16, first base portion 43L is movable relative to handlebar 23 or upper bracket 16 with the above-described engagement. It is thereby possible to adjust the optical axes of leftward highly-directional light unit 29L and leftward highly-directional light unit 19L collectively.

Similarly, with the engagement between second base portion 43R and casing 42, second base portion 43R is movable relative to casing 42 without changing positions of overlapping between the light distribution of rightward highly-directional light unit 29R and the light distribution of rightward highly-directional light unit 19R. The relative movable direction is a direction of turning around universal joint J1 as a fulcrum. Since casing 42 is fixedly supported by handlebar 23 or upper bracket 16, second base portion 43R is movable relative to handlebar 23 or upper bracket 16 with the above-described engagement. It is thereby possible to adjust the optical axes of rightward highly-directional light unit 29R and rightward highly-directional light unit 19R collectively.

First base portion 43L and second base portion 43R are supported by casing 42 without mutual interference. Thus, it is possible to adjust the optical axes of leftward highly-directional light unit 29L and leftward highly-directional light unit 19L and adjust the optical axes of rightward highly-directional light unit 29R and rightward highly-directional light unit 19R independently of each other.

Decorative covers 44L and 44R cover leftward highly-directional light unit 29L, leftward highly-directional light unit 19L, rightward highly-directional light unit 29R, and rightward highly-directional light unit 19R arranged in casing 42 so as to expose four optical lens sections 20L, 20R, 30L and 30R, and hide the other parts. Decorative covers 44L and 44R are fixed to casing 42.

Outer covers 45L and 45R are transparent and cover the fronts of leftward highly-directional light unit 29L, leftward highly-directional light unit 19L, rightward highly-directional light unit 29R, and rightward highly-directional light unit 19R. Outer covers 45L and 45R are fixed to casing 42.

Front face cover 46 exposes the transparent surfaces of outer covers 45L and 45R and covers the front of casing 42.

(Embodiment 2)

Straddled vehicle 1 which is a vehicle of a large naked type has been described in Embodiment 1 described above. Hereinafter, a description will be given of straddled vehicle 100 which is a vehicle of a naked type smaller than straddled vehicle 1.

Figure 38:
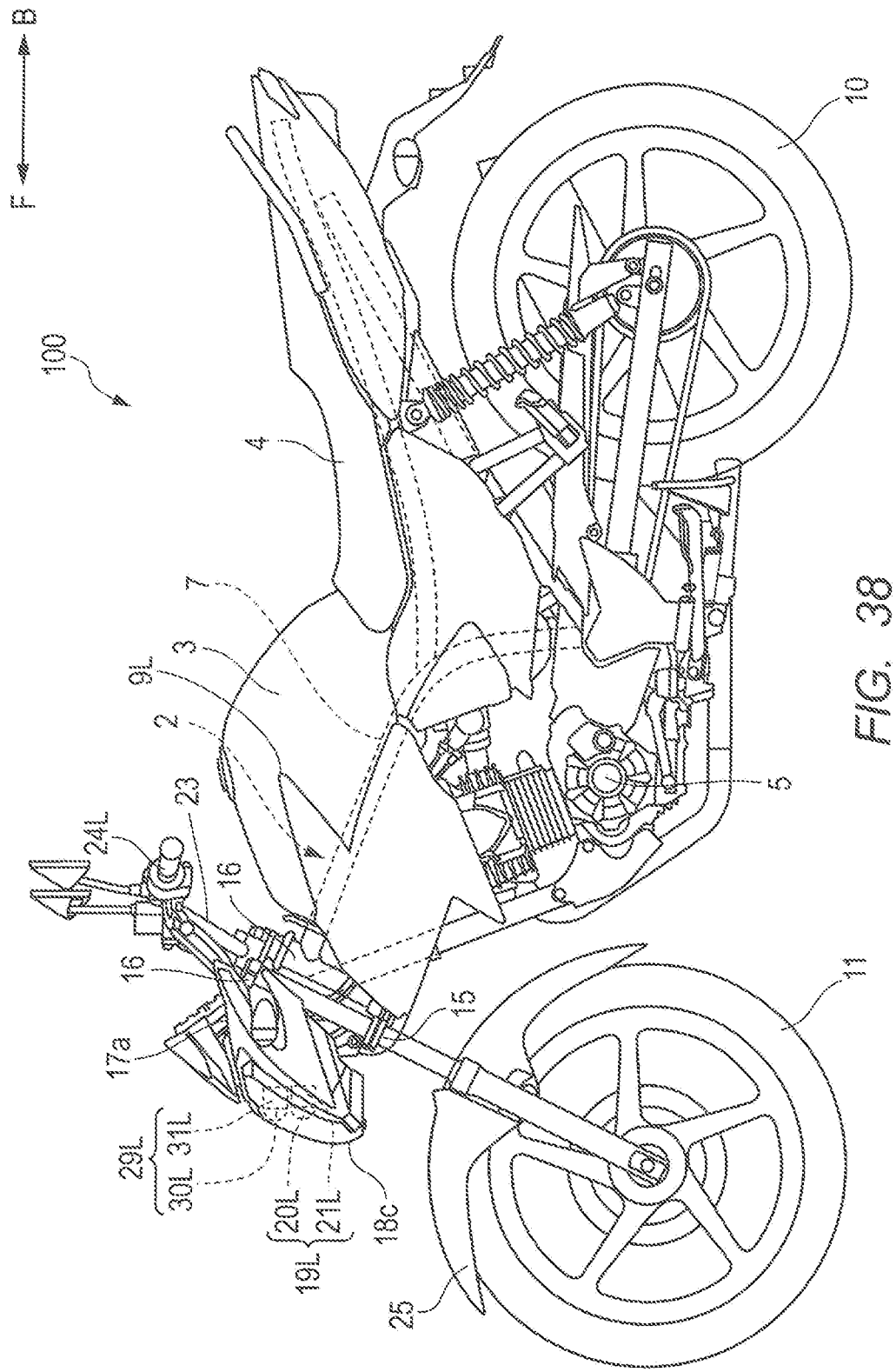
FIG. 38 is a side view illustrating a straddled vehicle according to Embodiment 2 of the present invention.
Figure 39:
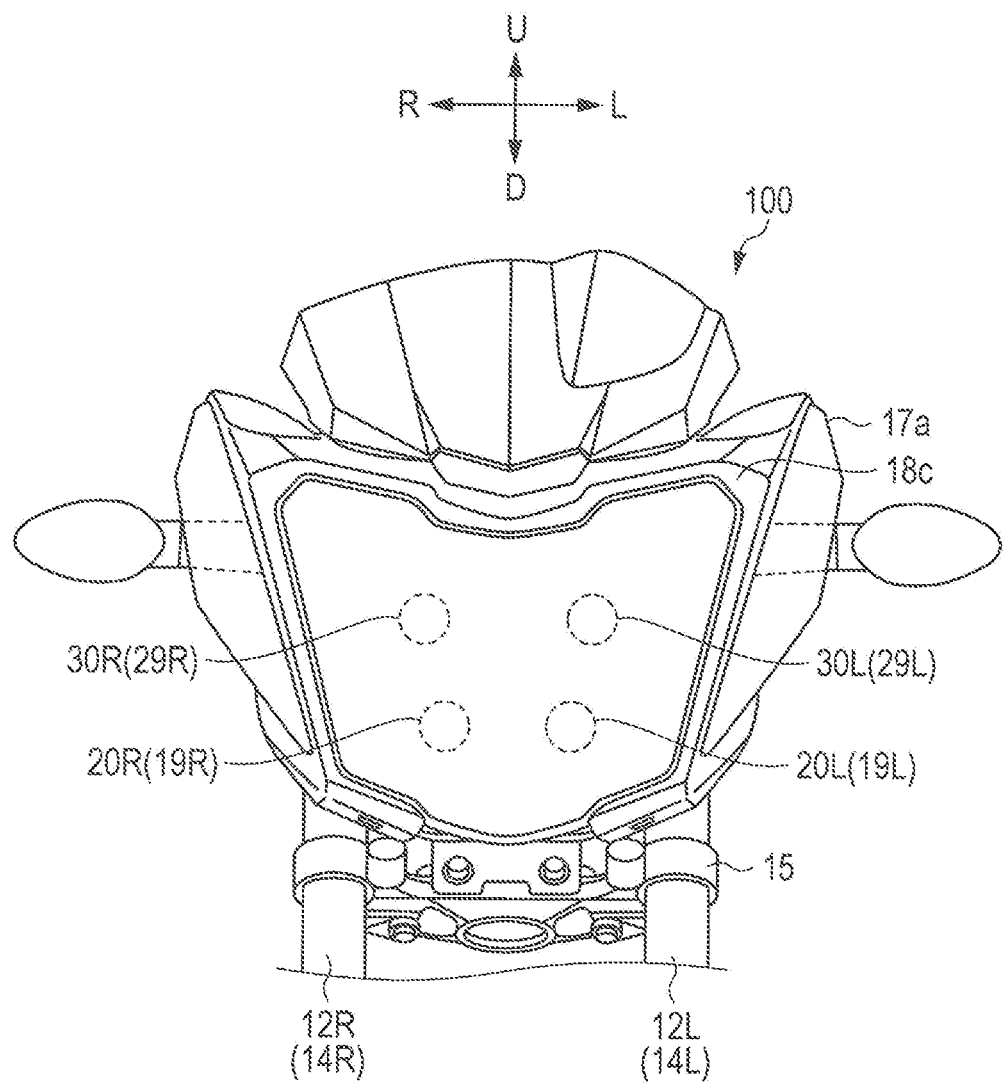
FIG. 39 is a front view of the straddled vehicle according to Embodiment 2 of the present invention.

FIG. 38 is a side view of straddled vehicle 100 according to the present embodiment. FIG. 39 is a front view of straddled vehicle 100 according to the present embodiment. In FIG. 38 and FIG. 39, the same components as the components shown in FIG. 1 to FIG. 3 will be assigned the same reference numerals and description thereof will be omitted.

As shown in FIG. 38 and FIG. 39, straddled vehicle 100 includes body frame 2, fuel tank 3, seat 4, power unit 5, steering shaft 8, left cover section 9L, right cover section 9R, rear wheel 10, front wheel 11, left front-wheel support unit 12L, right front-wheel support unit 12R, lower bracket 15, upper bracket 16, front cover 17a, lamp unit 18c, and handlebar 23.

As shown in FIG. 38 and FIG. 39, lamp unit 18c is provided with leftward highly-directional light units 19L and 29L and rightward highly-directional light units 19R and 29R. Note that since the configurations of leftward highly-directional light unit 19L and rightward highly-directional light unit 19R have already been described in Embodiment 1, description thereof is omitted here.

Note that lamp unit 18c may also include three or more leftward highly-directional light units and three or more rightward highly-directional light units.

<Conditions of Highly-Directional Light Units>

Leftward highly-directional light units 19L and 29L and rightward highly-directional light units 19R and 29R provided for lamp unit 18c are arranged by satisfying up-down and left-right arrangement conditions, up-down relation condition 1 and left-right relation condition 1 as the necessary conditions described in Embodiment 1. In the present embodiment, as in the case of Embodiment 1, it is possible to secure a space forward of steering shaft 8 while limiting an increase in the size of the body portion of straddled vehicle 100 forward of steering shaft 8 in the left-right direction and front-rear direction of body frame 2.

In addition to satisfying the above-described necessary conditions, leftward highly-directional light units 19L and 29L and rightward highly-directional light units 19R and 29R provided for lamp unit 18c may also be arranged by satisfying at least one of the plurality of additional conditions (up-down relation conditions 2 to 4, front-rear relation conditions 1 to 3, and left-right relation conditions 2 to 7) described in Embodiment 1.

(Embodiment 3)

Naked type straddled vehicles 1 and 100 have been described in above-described Embodiments 1 and 2. Hereinafter, straddled vehicle 200 with a cowl will be described.

Figure 40:
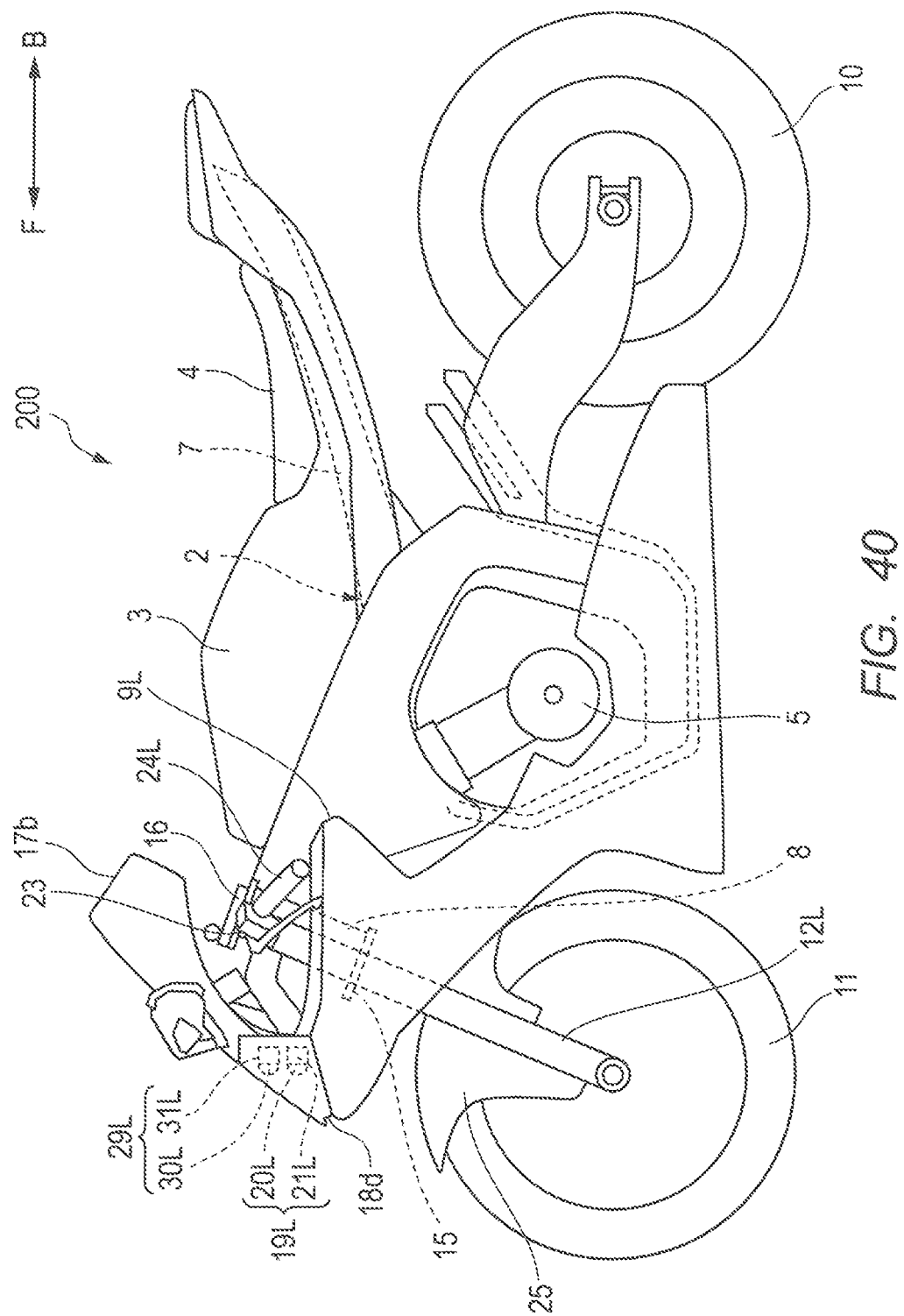
FIG. 40 is a side view illustrating a straddled vehicle according to Embodiment 3 of the present invention.
Figure 41:
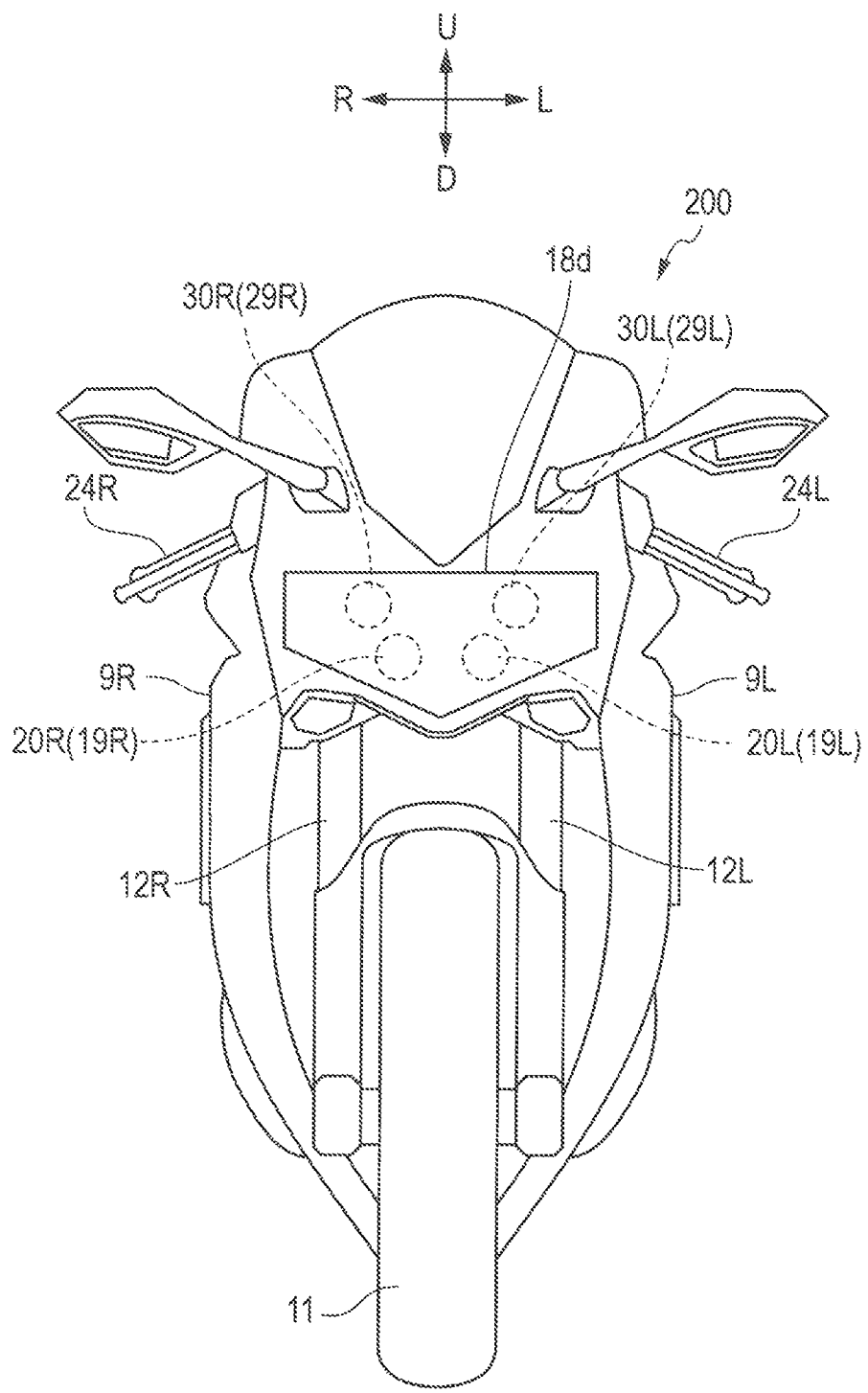
FIG. 41 is a front view of the straddled vehicle according to Embodiment 3 of the present invention.

FIG. 40 is a side view of straddled vehicle 200 according to the present embodiment. FIG. 41 is a front view of straddled vehicle 200 according to the present embodiment. In FIG. 40 and FIG. 41, the same components as the components shown in FIG. 1 to FIG. 3 are assigned the same reference numerals and description thereof will be omitted.

As shown in FIG. 40 and FIG. 41, straddled vehicle 200 includes body frame 2, fuel tank 3, seat 4, power unit 5, steering shaft 8, left cover section 9L, right cover section 9R, rear wheel 10, front wheel 11, left front-wheel support unit 12L, right front-wheel support unit 12R, lower bracket 15, upper bracket 16, cowl 17b, lamp unit 18d, and handlebar 23.

As shown in FIG. 40 and FIG. 41, lamp unit 18d includes leftward highly-directional light units 19L and 29L and rightward highly-directional light units 19R and 29R. Note that since the configurations of leftward highly-directional light unit 19L and rightward highly-directional light unit 19R have already been described in Embodiment 1, description thereof will be omitted here.

Note that lamp unit 18d may include three or more leftward highly-directional light units and three or more rightward highly-directional light units.

<Conditions of Highly-Directional Light Units>

Leftward highly-directional light units 19L and 29L and rightward highly-directional light units 19R and 29R provided for lamp unit 18d are arranged by satisfying up-down/left-right arrangement conditions, up-down relation condition 1 and left-right relation condition 1 as the necessary conditions described in Embodiment 1. In the present embodiment, as in the case of Embodiment 1, it is possible to secure a space forward of steering shaft 8 while limiting an increase in the size of the body portion of straddled vehicle 100 forward of steering shaft 8 in the left-right direction and front-rear direction of body frame 2.

In addition to satisfying the above-described necessary conditions, leftward highly-directional light units 19L and 29L and rightward highly-directional light units 19R and 29R provided for lamp unit 18d may also be arranged by satisfying at least one of the plurality of additional conditions (up-down relation conditions 2 to 4, front-rear relation conditions 1 to 3, and left-right relation conditions 2 to 7) described in Embodiment 1.

The embodiments of the present invention have been described so far.

Note that the present invention is not limited to the embodiments. For example, as the left front-wheel support unit and the right front-wheel support unit of the present invention, more specifically, left front-wheel support unit 12L and right front-wheel support unit 12R in FIG. 4 have been presented. However, the left front-wheel support unit of the present invention may include a left upper member supported by the body frame and a lower member which supports the front wheel and is displaceable in the up-down direction with respect to the left upper member and may be located on the left of the steering shaft in the left-right direction of the body frame. Furthermore, the right front-wheel support unit of the present invention may include a right upper member supported by the body frame and a lower member which supports the front wheel and is displaceable in the up-down direction with respect to the right upper member and may be located on the right of the steering shaft in the left-right direction of the body frame. For example, both the left front-wheel support unit and the right front-wheel support unit may include a spring and a damper or include neither a spring nor a damper. One of the left front-wheel support unit and the right front-wheel support unit may include a spring and the other may include a damper. Alternatively, one of the left front-wheel support unit and the right front-wheel support unit may include a spring and a damper and the other may include neither a spring nor a damper.

The configurations of the highly-directional light units of the present invention are not limited to the configurations shown in FIG. 5A to FIG. 5C, but may include a light-emitting section that emits highly-directional light and an optical lens section that refracts light from the light-emitting section and generates light distribution, and the light distribution formed by the optical lens section may be at least part of a light distribution of a main beam or dipped beam. For example, the highly-directional light units shown in FIG. 5A to FIG. 5C are each a module in which an optical lens section and a light-emitting section are integrated as a unit. However, in the highly-directional light units of the present invention, the optical lens section and the light-emitting section may not be integrated as a unit. Furthermore, the configurations of the highly-directional light units of the present invention are not limited to the configurations shown in FIG. 5A to FIG. 5C, but parts of the configurations shown in FIG. 5A to FIG. 5C may be combined.

Note that the above embodiments have shown a bar-shaped handlebar which is long in the left-right direction of body frame 2 as an example of the handlebar, but, for example, a separate handlebar may be adopted which includes a left handlebar and a right handlebar, the left handlebar being fixed to the left part of the upper bracket and the right handlebar being fixed to the right part of the upper bracket. That is, the handlebar of the present invention can take any mode as long as it is long in the left-right direction of the body frame and integrally turns with the steering shaft by steering of the rider.

As the configuration of the lamp unit of the present invention, more specifically, lamp unit 18a shown in FIG. 1 to FIG. 3, lamp unit 18b shown in FIG. 33 to FIG. 37, lamp unit 18c shown in FIG. 38 and FIG. 39 and lamp unit 18d shown in FIG. 40 and FIG. 41 have been presented. However, the lamp unit of the present invention may have any configuration including at least four highly-directional light units and a light group forming main beams and dipped beams from light radiated outward from the at least four highly-directional light units.

The straddled vehicle of the present invention may also include highly-directional light units apart from a light group if the light group (left light group and right light group) alone can radiate main beams and dipped beams required for the straddled vehicle. However, the light group preferably includes all the highly-directional light units.

The optical lens section of the highly-directional light unit of the present invention can have any configuration including a light-emitting section that emits highly-directional light and an optical lens section that refracts light of the light-emitting section and forms at least part of light distribution of main beam or dipped beam, and the shape as viewed from the front of the body frame in the front-rear direction is not limited. The shape as viewed from the front of the body frame of the optical lens section of the highly-directional light unit of the present invention may be the shape shown in FIG. 2 or FIG. 33 or may be other shapes.

The number of leftward highly-directional light units of the present invention may be four or more or the number of rightward highly-directional light units of the present invention may be four or more. In that case, the four or more leftward highly-directional light units and four or more rightward highly-directional light units are arranged so as to satisfy up-down and left-right arrangement conditions, up-down relation condition 1 and left-right relation condition 1, as necessary conditions. The four or more leftward highly-directional light units and four or more rightward highly-directional light units may also be arranged so as to satisfy at least one of the plurality of additional conditions (up-down relation conditions 2 to 4, front-rear relation conditions 1 to 3, left-right relation conditions 2 to 7) in addition to the above-described necessary conditions. The four or more leftward highly-directional light units and four or more rightward highly-directional light units preferably include at least two main beam highly-directional light units in which a light distribution formed by the optical lens sections becomes at least part of a light distribution of main beam and at least two dipped beam highly-directional light units in which a light distribution formed by the optical lens sections becomes at least part of a light distribution of dipped beam.

The space secured by the straddled vehicle of the present invention is not limited to the ranges shown in FIG. 17 to FIG. 19 and FIG. 21. The range of space is, as viewed from the front of the body frame in the front-rear direction, preferably between the left virtual line passing through right end portion of the optical lens section of each leftward highly-directional light unit of the left light group and the right virtual line passing through the left end portion of the optical lens section of each rightward highly-directional light unit of the right light group, and between, as viewed from above in up-down direction of the body frame, the front end of the highly-directional light unit whose front end is located at the foremost position in the front-rear direction of the body frame of the left light group and the right light group and the rear end of the highly-directional light unit whose rear end is located at the rearmost position in the front-rear direction of the body frame of the left light group and the right light group in the front-rear direction of the body frame.

The highly-directional light units included in the light group of the present invention are not limited to the arrangement examples shown in FIG. 1, FIG. 6 to FIG. 8. That is, in the present invention, as viewed from the front of the body frame in the front-rear direction, the top end portion of the left optical lens body made up of the optical lens sections of the highly-directional light units included in the left light group may be disposed below the top edge of the upper bracket in the up-down direction of the body frame, the bottom end portion of the left optical lens body may be disposed above the bottom edge of the lower bracket in the up-down direction of the body frame, the left end portion of the left optical lens body may be disposed on the right of the left edge of the left front-wheel support unit in the left-right direction of the body frame, and the right end portion of the left optical lens body may be disposed on the right of the right edge of the left front-wheel support unit in the left-right direction of the body frame. In the present invention, as viewed from the front of the body frame in the front-rear direction, the top end portion of the right optical lens body made up of the optical lens sections of the highly-directional light units included in the right light group may be disposed below the top edge of the upper bracket in the up-down direction of the body frame, the bottom end portion of the right optical lens body may be disposed above the bottom edge of the lower bracket in the up-down direction of the body frame, the right end portion of the right optical lens body may be disposed on the left of the right edge of the right front-wheel support unit in the left-right direction of the body frame, the left end portion of the right optical lens body may be disposed on the left of the left edge of the right front-wheel support unit in the left-right direction of the body frame. In the present invention, as viewed from the front of the body frame in the front-rear direction, a plurality of optical lens sections of the left light group may be provided at positions overlapping each other in the up-down direction of the body frame and a plurality of highly-directional light units of the left light group may be provided at positions overlapping each other in the up-down direction of the body frame as viewed from the left side in the left-right direction of the body frame. In the present invention, a plurality of optical lens sections of the right light group may be provided at positions overlapping each other in the up-down direction of the body frame as viewed from the front of the body frame in the front-rear direction, and a plurality of highly-directional light units of the right light group may be provided at positions overlapping in the up-down direction of the body frame as viewed from the right side of the body frame in the left-right direction. Further, in the present invention, the length between the right end portion of the left optical lens body and the left end portion of the right optical lens body in the left-right direction of the body frame may be formed to be greater than the length in the left-right direction of the optical lens sections neighboring up and down in the left light group and the length by which the optical lens sections neighboring up and down in the right light group overlap each other.

The present invention can be implemented in many different modes. This disclosure should be considered to provide embodiments of the principles of the present invention. Many illustrated embodiments are described here under the understanding that those embodiments are not intended to limit the present invention to the embodiments described and/or illustrated herein.

Several illustrated embodiments of the present invention have been described here. The present invention is not limited to the various preferred embodiments described herein. The present invention includes all embodiments including uniform elements, corrections, deletions, combinations (e.g., combinations of features that span various embodiments), improvements and/or variations that can be recognized by those skilled in the art based on this disclosure. Limitations of the claims should be broadly interpreted based on the terms used in the claims and should not be limited to the embodiments described in the present specification or prosecution of the present application. Such embodiments should be interpreted to be non-exclusive. For example, the terms such as "preferably" or "may be" are nonexclusive and mean "preferable but not limited to this" or "may be so but not limited to this."

The disclosures of Japanese Patent Applications No. 2014-120235 and No. 2014-120236 both filled on Jun. 11, 2014, and No. 2014-256382 filled on Dec. 18, 2014, including the specifications, drawings, and abstracts are incorporated herein by reference in their entireties.

INDUSTRIAL APPLICABILITY

The present invention is suitable for use in a straddled vehicle.

REFERENCE SIGNS LIST 1, 100, 200 straddled vehicle
2 body frame
3 fuel tank
4 seat
5 power unit
6 head pipe
7 body frame
8 steering shaft
9L left cover
9R right cover
10 rear wheel
11 front wheel
12L left front-wheel support unit
12R right front-wheel support unit
13L left lower member
13R right lower member
14L left upper member
14R right upper member
15 lower bracket
16 upper bracket
17a front cover
17b cowl
18a, 18b, 18c, 18d lamp units
19L, 29L, 39L leftward highly-directional light units
19R, 29R, 39R rightward highly-directional light units
20L, 30L, 40L optical lens section of leftward highly-directional light units
20R, 30R, 40R optical lens section of rightward highly-directional light units
21L, 31L, 41L case of leftward highly-directional light units
21R, 31R, 41R case of rightward highly-directional light units
22L left light group
22R right light group
23 handlebar
24L left grip
24R right grip
25 fender
27 handlebar holder
33 air
34 other highly-directional light unit
35L, 36L, 37L, 47L, 48L left optical lens bodies
35R, 36R, 37R, 47R, 48R right optical lens bodies
42 casing
43a, 43b, 43c engaging parts
43L first base portion
43R second base portion
44L, 44R decorative covers
45L first outer cover
45R second outer cover
46 front face cover
50 substrate
51 light-emitting section
52 heat sink
53 optical fiber
54 light source
55 reflector
60, 61, 62, 63 parts

The invention claimed is:

1. A straddled vehicle comprising:
a body frame;
a front wheel portion;
a steering shaft turnably supported by the body frame;
an upper bracket having a central portion that is disposed at an upper portion of the steering shaft;
a lower bracket having a central portion that is disposed at a lower portion of the steering shaft;
a left front-wheel support unit disposed on a left of the steering shaft in a left-right direction of the body frame, the left front-wheel support unit connected to the steering shaft to turn integrally with the steering shaft, the left front-wheel support unit including
  a left upper member supported by a left portion of the upper bracket and a left portion of the lower bracket, and
  a left lower member that supports the front wheel portion and that is displaceable in an up-down direction with respect to the left upper member;
a right front-wheel support unit disposed on a right of the steering shaft in the left-right direction of the body frame, the right front-wheel support unit connected to the steering shaft to turn integrally with the steering shaft, the right front-wheel support unit including
  a right upper member supported by a right portion of the upper bracket and a right portion of the lower bracket, and
  a right lower member that supports the front wheel portion and that is displaceable in an up-down direction with respect to the right upper member;
a left light group that forms a left light distribution that forms at least one of a main beam or a dipped beam, the left light group being disposed on the left of the steering shaft in the left-right direction of the body frame, the left light group including a plurality of left highly-directional light units each including
  a left light-emitting section that emits highly-directional left light, and
  a left optical lens section that refracts the left light to form at least part of a light distribution forming the left light distribution; and
a right light group forming a right light distribution forming at least one of the main beam and the dipped beam, the right light group being disposed on the right of the steering shaft in the left-right direction of the body frame, the right light group including a plurality of right highly-directional light units each having
  a right light-emitting section that emits highly-directional right light, and
  a right optical lens section that refracts the right light to form at least part of a light distribution of the right light distribution, wherein
in the left light group,
  a top end portion of a left optical lens body, which is composed of the left optical lens sections, is disposed below a top edge of the upper bracket in the up-down direction of the body frame as viewed from a front of the body frame in a front-rear direction,
  a bottom end portion of the left optical lens body is disposed above a bottom edge of the lower bracket in the up-down direction of the body frame as viewed from the front of the body frame in the front-rear direction,
  a left end portion of the left optical lens body is disposed on the right of a left edge of the left front-wheel support unit in the left-right direction of the body frame as viewed from the front of the body frame in the front-rear direction,
  a right end portion of the left optical lens body is disposed on the right of a right edge of the left front-wheel support unit in the left-right direction of the body frame as viewed from the front of the body frame in the front-rear direction,
the left optical lens sections are disposed at positions overlapping each other in the up-down direction of the body frame as viewed from the front of the body frame in the front-rear direction,
the plurality of left highly-directional light units is disposed at positions overlapping each other in the up-down direction of the body frame as viewed from the left of the body frame in the left-right direction,
in the right light group,
  a top end portion of a right optical lens body, which is composed of the right optical lens sections, is disposed below the top edge of the upper bracket in the up-down direction of the body frame as viewed from the front of the body frame in the front-rear direction,
  a bottom end portion of the right optical lens body is disposed above the bottom edge of the lower bracket in the up-down direction of the body frame as viewed from the front of the body frame in the front-rear direction,
  a right end portion of the right optical lens body is disposed on the left of a right edge of the right front-wheel support unit in the left-right direction of the body frame as viewed from the front of the body frame in the front-rear direction,
  a left end portion of the right optical lens body is disposed on the left of a left edge of the right front-wheel support unit in the left-right direction of the body frame as viewed from the front of the body frame in the front-rear direction,
the right optical lens sections are disposed at positions overlapping each other in the up-down direction of the body frame as viewed from the front of the body frame in the front-rear direction,
the plurality of right highly-directional light units are disposed at positions overlapping each other in the up-down direction of the body frame as viewed from the right of the body frame in the left-right direction, wherein
a left overlapping portion is an area where neighboring ones of the left optical lens sections, which neighbor each other in the up-down direction, overlap each other in the left-right direction,
a right overlapping portion is an area where neighboring ones of the right optical lens sections, which neighbor each other in the up-down direction, overlap each other in the left-right direction,
the left light group and the right light group are further formed so that a length between the right end portion of the left optical lens body and the left end portion of the right optical lens body in the left-right direction of the body frame is greater than each of
  a length of the left overlapping portion in the left-right direction of the body frame, and
  a length of the right overlapping portion in the left-right direction of the body frame.

2. The straddled vehicle according to claim 1, wherein each of the left optical lens sections has a left-right direction length in the left-right direction, each of the right optical lens sections has a left-right direction length in the left-right direction, and the left light group and the right light group are formed so that the length between the right end portion of the left optical lens body and the left end portion of the right optical lens body is greater than each of the left-right direction lengths of the left optical lens sections and each of the left-right direction lengths of the right optical lens sections.

3. The straddled vehicle according to claim 1, wherein the left light group and the right light group are formed so that a length, measured in the up-down direction, between the neighboring optical left lens sections and a length, measured in the up-down direction, between the neighboring right optical lens sections of the body frame are each smaller than a length, measured in the left-right direction of the body frame, between a right end portion of the left optical lens sections and a left end portion of the right optical lens sections.

4. The straddled vehicle according to claim 1, wherein as viewed from the front of the body frame in the front-rear direction, at least part of the left optical lens body is located below the top end portion of the right optical lens body in the up-down direction of the body frame and above the bottom end portion of the right optical lens body in the up-down direction of the body frame.

5. The straddled vehicle according to claim 1, wherein
as viewed from the front of the body frame in the front-rear direction, at least part of the left optical lens sections, located at an uppermost position in the left light group in the up-down direction of the body frame, is located both
below a top end portion of the an uppermost one of the right optical lens sections located at an uppermost position in the right light group in the up-down direction of the body frame, and
above a bottom end portion of the uppermost right optical lens section, and
as viewed from the front of the body frame in the front-rear direction, at least part of the left optical lens sections, located at a lowermost position in the left light group in the up-down direction of the body frame, is located both
below a top end portion of a lowermost one of the right optical lens sections located at a lowermost position in the right light group in the up-down direction of the body frame, and
above a bottom end portion of the lowermost right optical lens section.

6. The straddled vehicle according to claim 1, wherein
as viewed from the front of the body frame in the front-rear direction, a left end portion of a rightmost one of the left optical lens sections, which is located at a rightmost position in the left-right direction of the body frame in the left light group, is located on the right of the right edge of the left front-wheel support unit in the left-right direction of the body frame, and
as viewed from the front of the body frame in the front-rear direction, a right end portion of the a leftmost one of the right optical lens sections, which is located at a leftmost position in the left-right direction of the body frame in the right light group, is located on the left of the left edge of the right front-wheel support unit in the left-right direction of the body frame.

7. The straddled vehicle according to claim 1, wherein as viewed from the front of the body frame in the front-rear direction, the length between the right end portion of the left optical lens body and the left end portion of the right optical lens body in the left-right direction of the body frame is greater than a length obtained by adding up
a length between a left end portion of a rightmost one of the left optical lens sections, located at a rightmost position in the left-right direction of the body frame in the left light group, and the right edge of the left front-wheel support unit in the left-right direction of the body frame, and
a length between the right end portion of a leftmost one of the right optical lens sections, located at a leftmost position in the left-right direction of the body frame in the right light group, and the left edge in the right front-wheel support unit in the left-right direction of the body frame.

8. The straddled vehicle according to claim 1, wherein as viewed from the front of the body frame in the front-rear direction, a length between the left end portion of the left optical lens body and the right end portion of the right optical lens body in the left-right direction of the body frame is greater than a length between
a top end portion of an uppermost one of the left and right optical lens sections located at an uppermost position in the left light group and the right light group in the up-down direction of the body frame as viewed from the front of the body frame in the front-rear direction, and
a bottom end portion of a lowermost one of the left and right optical lens sections located at a lowermost position in the left light group and the right light group in the up-down direction of the body frame as viewed from the front of the body frame in the front-rear direction.

9. The straddled vehicle according to claim 1, further comprising another highly-directional light unit disposed so as to overlap a center virtual line passing through the body frame vertically as viewed from the front of the body frame in the front-rear direction.

10. The straddled vehicle according to claim 1, further comprising a light radiating section that forms light radiated outward, as a beam other than the main beam and the dipped beam, wherein
at least part of the light radiating section is disposed, as viewed from the front of the body frame in the front-rear direction, between a left virtual line passing through right end portions of ones of the left optical lens sections of the left light group located in the up-down direction of the body frame relative to each other, and a right virtual line passing through left end portions of ones of the right optical lens sections of the right light group located in the up-down direction of the body frame relative to each other.

11. The straddled vehicle according to claim 1, further comprising a lamp unit in which the left light group and the right light group are integrated as a unit, wherein
the lamp unit includes a through-passage that penetrates in the front-rear direction of the body frame between a left virtual line passing through right end portions of ones of the left optical lens sections located in the up-down direction of the body frame relative to each other in the left light group, and a right virtual line passing through left end portions of ones of the right optical lens sections located in the up-down direction of the body frame relative to each other in the right light group as viewed from the front of the body frame in the front-rear direction.

12. The straddled vehicle according to claim 1, wherein at least part of an electric and electronic part, other than the left and right highly-directional light units, includes a throttle wire, a brake wire, a brake hose, a clutch wire, a wire harness and a key cylinder and is disposed between
- a left virtual line passing through right end portions of ones of the left optical lens sections located in the up-down direction of the body frame relative to each other in the left light group as viewed from the front of the body frame in the front-rear direction, and
- a right virtual line passing through left end portions of ones of the right optical lens sections located in the up-down direction of the body frame relative to each other in the right light group as viewed from the front of the body frame in the front-rear direction, and
- the part of the electric and electronic part being behind a front end of the left light group and the right light group in the front-rear direction of the body frame and forward of a rear end of the left light group and the right light group in the front-rear direction of the body frame as viewed from above the up-down direction of the body frame.

13. The straddled vehicle according to claim 1, wherein a rightmost one of the left highly-directional light units located at a rightmost position in the left-right direction of the body frame in the left light group, and a leftmost one of the right highly-directional light units located at a leftmost position in the left-right direction of the body frame in the right light group are fixed to an identical base portion so as to be relatively immovable to one another and configured to allow optical axes of the rightmost one of the left highly-directional light units and the leftmost one of the right highly-directional light units to be adjusted collectively.

14. The straddled vehicle according to claim 1, wherein each of the left and right highly-directional light units is a module including a respective one of the left and right light-emitting sections and a respective one of the left and right optical lens sections.

15. The straddled vehicle according to claim 1, further comprising an outer cover that integrally covers at least a front area of two or more of the left and right highly-directional light units.

16. The straddled vehicle according to claim 1, wherein
- the light distributions of two of the left highly-directional light units form at least part of a light distribution of the main beam, and the light distributions of two of the right highly-directional light units form at least part of a light distribution of the dipped beam, or
- the light distributions of two of the left highly-directional light units form at least part of a light distribution of the dipped beam, and the light distributions of two of the right highly-directional light units form at least part of a light distribution of the main beam.

17. The straddled vehicle according to claim 1, wherein
- the light distribution of one of the left highly-directional light units forms at least part of a light distribution of the main beam, and the light distribution of another of the left highly-directional light units forms at least part of a light distribution of the dipped beam, and
- the light distribution of one of the right highly-directional light units forms at least part of a light distribution of the main beam, and the light distribution of another of the right highly-directional light units forms at least part of a light distribution of the dipped beam.

18. The straddled vehicle according to claim 1, wherein
- a rightmost one of the left highly-directional light units, which is located at a rightmost position in the left-right direction of the body frame in the left light group, is located at an uppermost position in the up-down direction of the body frame in the left light group,
- a leftmost one of the right highly-directional light units, which is located at a leftmost position in the left-right direction of the body frame in the right light group, is located at an uppermost position in the up-down direction of the body frame in the right light group,
- a leftmost one of the left highly-directional light units, which is located at a leftmost position in the left-right direction of the body frame in the left light group, is located at a lowermost position in the up-down direction of the body frame in the left light group, and
- a rightmost one of the right highly-directional light units, which is located at a rightmost position in the left-right direction of the body frame in the right light group, is located at a lowermost position in the up-down direction of the body frame in the right light group.

19. The straddled vehicle according to claim 1, wherein
- a rightmost one of the left highly-directional light units, which is located at a rightmost position in the left-right direction of the body frame in the left light group, is located at a lowermost position in the up-down direction of the body frame in the left light group,
- a leftmost one of the right highly-directional light units, which is located at a leftmost position in the left-right direction of the body frame in the right light group, is located at a lowermost position in the up-down direction of the body frame in the right light group,
- a leftmost one of the left highly-directional light units, which is located at a leftmost position in the left-right direction of the body frame in the left light group, is located at an uppermost position in the up-down direction of the body frame in the left light group, and
- a rightmost one of the right highly-directional light units, which is located at a rightmost position in the left-right direction of the body frame in the right light group, is located at an uppermost position in the up-down direction of the body frame in the right light group.

* * * * *